(12) United States Patent
De Kosnik et al.

(10) Patent No.: US 10,911,337 B1
(45) Date of Patent: Feb. 2, 2021

(54) NETWORK ACTIVITY MONITORING SERVICE

(71) Applicants: Benjamin Thaddeus De Kosnik, San Francisco, CA (US); Abigail Tycho De Kosnik, San Francisco, CA (US)

(72) Inventors: Benjamin Thaddeus De Kosnik, San Francisco, CA (US); Abigail Tycho De Kosnik, San Francisco, CA (US)

( * ) Notice: Subject to any disclaimer, the term of this patent is extended or adjusted under 35 U.S.C. 154(b) by 0 days.

(21) Appl. No.: 16/598,983

(22) Filed: Oct. 10, 2019

Related U.S. Application Data

(60) Provisional application No. 62/743,971, filed on Oct. 10, 2018.

(51) Int. Cl.
*H04L 12/26* (2006.01)
*H04L 29/08* (2006.01)

(52) U.S. Cl.
CPC ........ *H04L 43/045* (2013.01); *H04L 67/1046* (2013.01); *H04L 67/1051* (2013.01); *H04L 67/1074* (2013.01); *H04L 67/18* (2013.01); *H04L 67/2857* (2013.01)

(58) Field of Classification Search
CPC ....... H04L 43/00; H04L 43/045; H04L 67/18; H04L 67/1074; H04L 67/1051; H04L 67/1046; H04L 67/2857
See application file for complete search history.

(56) References Cited

U.S. PATENT DOCUMENTS

| | | | | |
|---|---|---|---|---|
| 7,617,178 B2* | 11/2009 | Chavez | ................. | H04L 67/104 |
| 7,814,146 B2* | 10/2010 | Chavez | ................. | H04L 67/06 |
| | | | | 709/203 |
| 8,204,915 B2* | 6/2012 | Dolganow | .......... | G06F 16/1837 |
| | | | | 707/803 |
| 8,719,430 B2* | 5/2014 | Van Ackere | ........ | H04L 67/1063 |
| | | | | 709/228 |
| 8,775,562 B2* | 7/2014 | Chavez | ................. | H04L 67/104 |
| | | | | 709/218 |
| 8,838,968 B2* | 9/2014 | Mankovski, Jr. | ..... | H04L 9/0894 |
| | | | | 713/168 |
| 9,106,668 B2* | 8/2015 | Chalouhi | .............. | H04L 67/104 |
| 9,154,517 B2* | 10/2015 | Gostev | ................. | H04L 63/145 |
| 9,386,056 B1* | 7/2016 | Atzmon | ............. | H04L 65/4084 |
| 9,432,273 B2* | 8/2016 | Chopra | ............... | H04L 67/1061 |
| 9,531,802 B2* | 12/2016 | Aoyagi | ................ | H04L 67/104 |
| 10,148,748 B2* | 12/2018 | Hunt | ................... | H04L 67/1072 |
| 10,412,180 B2* | 9/2019 | Geis | ........................ | H04L 67/30 |
| 10,616,308 B2* | 4/2020 | Martin-Bale | ......... | H04L 67/104 |
| 10,728,349 B2* | 7/2020 | Geis | ................... | H04L 67/1063 |
| 2005/0203851 A1* | 9/2005 | King | ................... | H04L 67/1082 |
| | | | | 705/51 |
| 2006/0029093 A1* | 2/2006 | Van Rossum | .......... | H04N 21/84 |
| | | | | 370/432 |

(Continued)

FOREIGN PATENT DOCUMENTS

| | | | |
|---|---|---|---|
| CN | 101567811 A | * | 10/2009 |
| CN | 101719907 A | * | 6/2010 |

(Continued)

*Primary Examiner* — Kostas J Katsikis
(74) *Attorney, Agent, or Firm* — Van Court & Aldridge LLP

(57) ABSTRACT

Systems, methods, and computer-readable media for facilitating a network activity monitoring service or swarm processing service for a peer-to-peer network are provided.

20 Claims, 20 Drawing Sheets

(56) References Cited

U.S. PATENT DOCUMENTS

| | | | |
|---|---|---|---|
| 2006/0123010 A1* | 6/2006 | Landry | G06F 16/25 |
| 2006/0167855 A1* | 7/2006 | Ishikawa | G06F 21/10 |
| 2006/0168318 A1* | 7/2006 | Twiss | H04L 67/1093 |
| | | | 709/238 |
| 2006/0179143 A1* | 8/2006 | Walker | G06F 15/173 |
| | | | 709/226 |
| 2006/0190715 A1* | 8/2006 | Miller | H04L 63/0428 |
| | | | 713/150 |
| 2006/0265436 A1* | 11/2006 | Edmond | H04N 21/47202 |
| 2007/0088703 A1* | 4/2007 | Kasiolas | G06Q 40/04 |
| 2007/0180079 A1* | 8/2007 | Wei | H04L 29/12254 |
| | | | 709/223 |
| 2007/0208748 A1* | 9/2007 | Li | G06F 16/1834 |
| 2007/0250571 A1* | 10/2007 | Griffin, Jr. | H04L 63/10 |
| | | | 709/204 |
| 2007/0297417 A1* | 12/2007 | Cohen | H04L 67/06 |
| | | | 370/395.42 |
| 2008/0005195 A1* | 1/2008 | Li | G06F 16/1837 |
| 2008/0016194 A1* | 1/2008 | Chetuparambil | H04L 67/02 |
| | | | 709/223 |
| 2008/0133538 A1* | 6/2008 | Chavez | H04L 67/06 |
| 2008/0133666 A1* | 6/2008 | Chavez | H04L 67/06 |
| | | | 709/205 |
| 2008/0133706 A1* | 6/2008 | Chavez | H04L 67/108 |
| | | | 709/218 |
| 2009/0106425 A1* | 4/2009 | Zuckerman | G06F 16/70 |
| | | | 709/226 |
| 2009/0138714 A1* | 5/2009 | Matsushita | H04L 9/083 |
| | | | 713/171 |
| 2009/0248872 A1* | 10/2009 | Luzzatti | H04N 21/8456 |
| | | | 709/226 |
| 2009/0276522 A1 | 11/2009 | Seidel | |
| 2009/0319502 A1* | 12/2009 | Chalouhi | H04L 67/1046 |
| 2010/0008509 A1* | 1/2010 | Matsushita | H04L 63/061 |
| | | | 380/279 |
| 2010/0138382 A1* | 6/2010 | Nagoya | H04L 63/1408 |
| | | | 707/609 |
| 2011/0078230 A1* | 3/2011 | Sepulveda | H04L 67/1004 |
| | | | 709/203 |
| 2011/0307538 A1* | 12/2011 | Rimac | H04L 29/08846 |
| | | | 709/202 |
| 2012/0209911 A1 | 8/2012 | Siganos et al. | |
| 2012/0331073 A1* | 12/2012 | Williams | G06Q 30/0251 |
| | | | 709/206 |
| 2013/0073727 A1* | 3/2013 | Souza | H04L 45/44 |
| | | | 709/224 |
| 2013/0226865 A1* | 8/2013 | Munemann | G06F 3/0482 |
| | | | 707/609 |
| 2014/0025728 A1* | 1/2014 | Chopra | H04L 67/108 |
| | | | 709/203 |
| 2014/0059216 A1 | 2/2014 | Jerrim | |
| 2014/0129624 A1* | 5/2014 | Liu | H04L 67/325 |
| | | | 709/203 |
| 2014/0195652 A1* | 7/2014 | Yerkes | H04L 67/104 |
| | | | 709/219 |
| 2014/0289862 A1* | 9/2014 | Gorfein | G06F 21/16 |
| | | | 726/26 |
| 2017/0034020 A1* | 2/2017 | Chopra | H04L 67/108 |
| 2017/0163605 A1* | 6/2017 | Martin-Bale | H04L 67/104 |
| 2017/0264682 A1* | 9/2017 | Eagle | H04L 67/1097 |
| 2018/0158322 A1* | 6/2018 | McDonnell | H04W 4/025 |
| 2019/0312927 A1* | 10/2019 | Shalunov | H04L 67/1091 |

FOREIGN PATENT DOCUMENTS

| | | | | |
|---|---|---|---|---|
| CN | 101741867 A | * | 6/2010 | |
| CN | 101567811 B | * | 9/2011 | |
| CN | 101741867 B | * | 7/2012 | |
| CN | 101719907 B | * | 8/2012 | |
| CN | 102664938 A | * | 9/2012 | |
| CN | 103533048 A | * | 1/2014 | |
| CN | 107147731 A | * | 9/2017 | |
| CN | 103533048 B | * | 1/2018 | |
| EP | 2077524 A3 | | 9/2009 | H04L 67/2852 |
| EP | 2359564 A4 | * | 5/2012 | H04L 67/1002 |
| EP | 2514172 A1 | * | 10/2012 | H04L 67/1093 |
| KR | 101328351 B1 | * | 11/2013 | |
| KR | 101570828 B1 | * | 12/2015 | |
| WO | WO-2011006531 A1 | * | 1/2011 | H04L 67/1095 |
| WO | WO-2011144245 A1 | * | 11/2011 | H04L 67/1059 |
| WO | 2012/009740 A1 | | 1/2012 | |
| WO | WO-2012009740 A1 | * | 1/2012 | H04L 67/108 |
| WO | WO-2015172020 A1 | * | 11/2015 | H04L 67/30 |
| WO | WO-2016155772 A1 | * | 10/2016 | H04L 43/08 |

* cited by examiner

1100

| | | |
|---|---|---|
| 001 | (148076) | [ Russian Federation, Moscow, 48 ] |
| 002 | (084072) | [ United States of America, Ashburn, VA ] |
| 003 | (065104) | [ United States of America ] |
| 004 | (059999) | [ Russian Federation, Saint Petersburg, 66 ] |
| 005 | (052840) | [ Brazil, Sao Paulo, 27 ] |
| 006 | (050543) | [ Greece, Athens, 35 ] |
| 007 | (047087) | [ ] |
| 008 | (045116) | [ India, Mumbai, 16 ] |
| 009 | (045095) | [ India, Bangalore, 19 ] |
| 010 | (045068) | [ India, Kolkata, 28 ] |
| 011 | (043640) | [ Algeria ] |
| 012 | (040697) | [ India, Delhi, 07 ] |
| 013 | (036825) | [ Egypt, Cairo, 11 ] |
| 014 | (035108) | [ Saudi Arabia, Riyadh, 10 ] |
| 015 | (033805) | [ Korea ( Republic of ), Seoul, 11 ] |
| 016 | (032179) | [ Netherlands ] |
| 017 | (031086) | [ India, Chennai, 25 ] |
| 018 | (029505) | [ Brazil, Rio De Janeiro, 21 ] |
| 019 | (028291) | [ Pakistan, Lahore, 04 ] |
| 020 | (027981) | [ Saudi Arabia, Jeddah, 14 ] |
| 021 | (027265) | [ France, Paris, A8 ] |
| 022 | (026886) | [ India, Pune, 16 ] |
| 023 | (026758) | [ Russian Federation, Krasnodar, 38 ] |
| 024 | (026361) | [ Philippines,Quezon City, F2 ] |
| 025 | (023228) | [ Philippines, 07 ] |
| 026 | (023031) | [ Morocco, Casablanca, 45 ] |
| 027 | (021909) | [ Russian Federation, Samara, 65 ] |
| 028 | (021866) | [ Ireland, Dublin, 07 ] |
| 029 | (020953) | [ Korea ( Republic of ) ] |
| 030 | (020641) | [ Malaysia, Kuala Lumpur, 14 ] |
| 031 | (020638) | [ Serbia, Belgrade, 00 ] |
| 032 | (020600) | [ Sri Lanka, Colombo, 36 ] |
| 033 | (020293) | [ France ] |
| 034 | (019671) | [ Indonesia, Jakarta, 04 ] |
| 035 | (019511) | [ India, Hyderabad, 02 ] |
| 036 | (019253) | [ Israel, Tel Aviv, 05 ] |
| 037 | (019158) | [ Singapore, Singapore, 00 ] |
| 038 | (019144) | [ Israel ] |
| 039 | (019136) | [ Chile, Santiago, 12 ] |
| 040 | (019079) | [ Croatia, Zagreb, 21 ] |

FIG. 11

NETWORK ACTIVITY MONITORING SERVICE

CROSS-REFERENCE TO RELATED APPLICATION(S)

This application claims the benefit of prior filed U.S. Provisional Patent Application No. 62/743,971, filed Oct. 10, 2018, which is hereby incorporated by reference herein in its entirety.

COPYRIGHT NOTICE

At least a portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD

This disclosure relates to a network activity monitoring service and, more particularly, to a swarm processing service for a peer-to-peer network.

BACKGROUND OF THE DISCLOSURE

The BitTorrent protocol is utilized to transfer files reliably, where users search for torrent files, which are then used to download content of interest or media objects from a "swarm" of computers over a network, such as by searching indexing sites/tracker sites, by searching peer-to-peer ("P2P") networks, by joining Rich Site Summary ("RSS") feeds, and/or by utilizing other types of BitTorrent management pages, which may create inefficiencies for monitoring network activity with respect to shared content.

SUMMARY OF THE DISCLOSURE

This document describes systems, methods, and computer-readable media for providing a network activity monitoring service or swarm processing service for a peer-to-peer network.

For example, a method for visualizing swarm activity for a media object may include populating a BitTorrent protocol info hash array ("BTIHA") with a plurality of BitTorrent protocol info hash ("BTIH") elements for the media object, sampling, from a swarm, sample data for each BTIH element of the BTIHA during each minimum sampling interval of a sampling duration, quantizing the sampled sample data for each BTIH element of the BTIHA for each normalization duration of a plurality of normalization durations of the sampling duration, caching the quantized sample data for each BTIH element of the BTIHA for each normalization duration of the plurality of normalization durations of the sampling duration, analyzing the cached sample data for each BTIH element of the BTIHA for each normalization duration of the plurality of normalization durations of the sampling duration, and presenting a visualization based on the analyzed sample data for every BTIH element of the BTIHA for at least one normalization duration of the plurality of normalization durations of the sampling duration.

As yet another example, a method for visualizing swarm activity for a media object may include populating a BitTorrent protocol info hash array ("BTIHA") with a plurality of BitTorrent protocol info hash ("BTIH") elements for the media object, sampling, from a swarm, sample data for each BTIH element of the BTIHA during each minimum sampling interval of a sampling duration, wherein the sampled sample data for each particular BTIH element of the BTIHA for each particular minimum sampling interval of the sampling duration includes identification of each node of the swarm acting as a peer for the particular BTIH element during the particular minimum sampling interval and identification of each node of the swarm acting as a seed for the particular BTIH element during the particular minimum sampling interval, analyzing the sampled sample data for each BTIH element of the BTIHA for each normalization duration of a plurality of normalization durations of the sampling duration, wherein the analyzed sample data for each BTIH element of the BTIHA for a particular normalization duration of the plurality of normalization durations of the sampling duration includes at least one of the following: identification of each geolocation associated with the unique nodes of the swarm acting as peers for the particular BTIH element during the particular normalization duration, identification of each geolocation associated with the unique nodes of the swarm acting as seeds for the particular BTIH element during the particular normalization duration, identification of each geolocation associated with the fresh unique nodes of the swarm acting as peers for the particular BTIH element during the particular normalization duration that were not acting as peers for the particular BTIH element during the normalization duration immediately preceding the particular normalization duration, or identification of each geolocation associated with the fresh unique nodes of the swarm acting as seeds for the particular BTIH element during the particular normalization duration that were not acting as seeds for the particular BTIH element during the normalization duration immediately preceding the particular normalization duration, and presenting a visualization based on the analyzed sample data for at least one BTIH element of the BTIHA for at least one normalization duration of the plurality of normalization durations of the sampling duration.

This Summary is provided to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIGS. 10-13E are exemplary visualizations of a swarm processing service of the disclosure.

DETAILED DESCRIPTION OF THE DISCLOSURE

Figure 1:
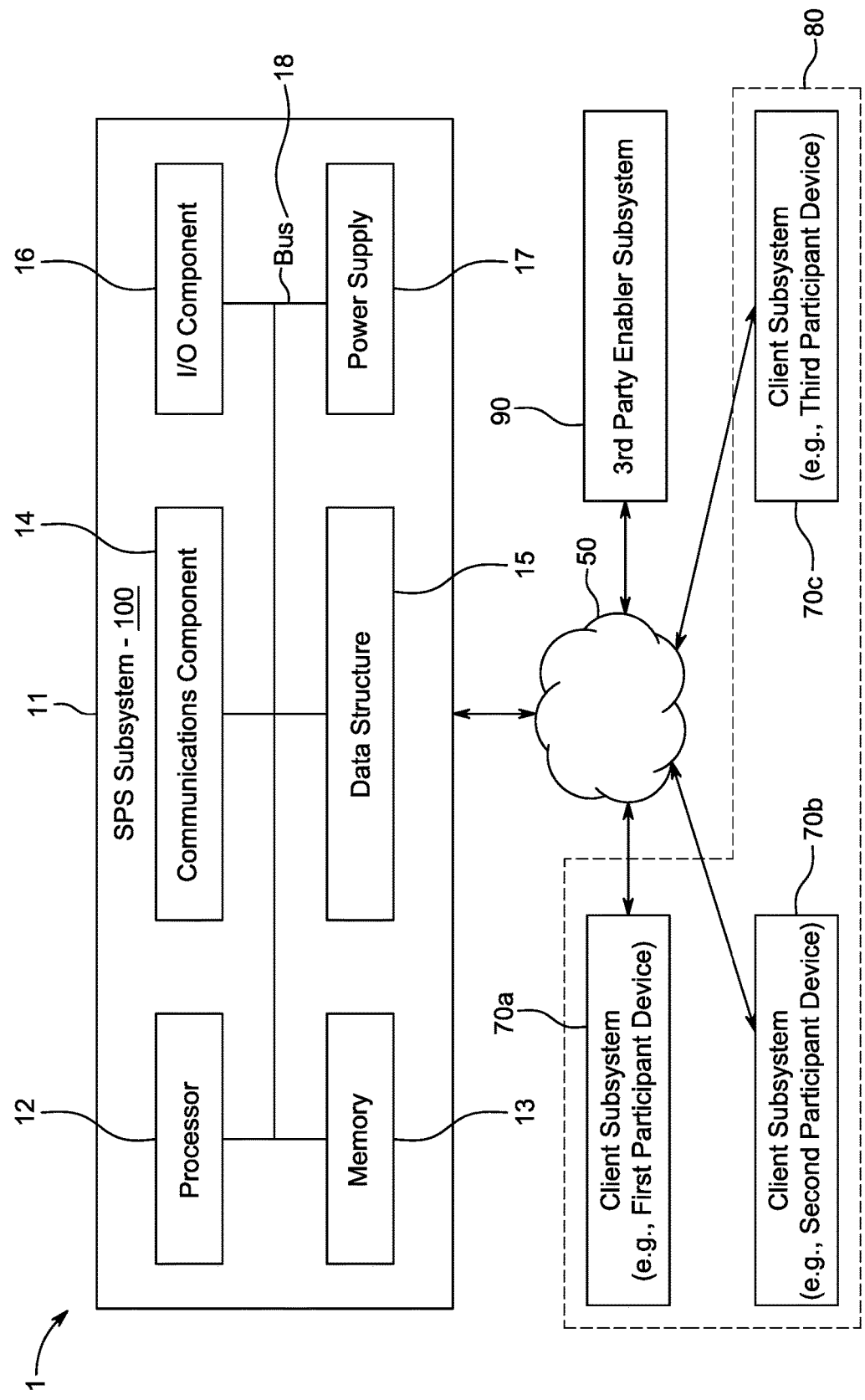
FIG. 1 is a schematic view of an illustrative system for providing a swarm processing service of the disclosure.

Peer-to-peer network activity may be monitored by a swarm processing service ("SPS") of an SPS platform ("SPSP") to detect and assess and represent (e.g., present one or more visualizations of) regional and global distribution for individual media objects over time. The SPSP may be configured to produce any suitable analysis of the monitored activity, including, but not limited to, analysis that may be operative to compare the distribution of multiple media objects to each other and/or to previous objects, analysis that may be operative to represent peer-to-peer network activity for a given media object over time, analysis that may be operative to synthesize aggregate swarm behavior, analysis that may be operative to model the swarm with any suitable visualization(s), and/or the like. For example, the SPSP may be configured to aggregate individual torrent files into a single multi-torrent collection for a specified media object, which may be defined as a BitTorrent Protocol Info Hash Array ("BTIHA"), and/or to update such a BTIHA and index swarms via individual BitTorrent Info Hash ("BTIH"). Additionally or alternatively, the SPSP may be configured to use a BTIHA for sampling sample swarm activity, to use standardized observation and archive methods for converting node (e.g., peer and/or seed) activity to persistent data files (e.g., JavaScript Object Notation ("JSON") files) and/or to provide support for sampling over extended time durations. Additionally or alternatively, the SPSP may be configured to quantize, cache, remove duplicates, and/or carry out any other suitable transformations on saved data files (e.g., JSON data files), and/or the SPSP may be configured to rewrite such transformed data and metadata (e.g., to disk as optimized JSON data files) for each suitable duration, such as hour, day, week, and cumulative over the length of the sampling. The SPSP may be configured to create optimized intermediate metadata representations and/or to sort and analyze cached swarm metadata by any suitable characteristics, including, but not limited to, geographic distribution, time, urban/rural breakdown, top 100 sub-swarms, and/or the like. Various sortable metadata types may be used, including, but not limited to, top 100 swarms by aggregated country-city-region, top 100 swarms by country, top 10 1080p swarms by country, top 100 swarms using the x265 (HEVC) encoder. Urban rural breakdown may be done using the geographic data from the IP address of a node and combining it with another $3^{rd}$ party enabler, like a demographic database (e.g., a database provided by demographica, or Natural Earth that provides demographic data tied to map information). Top 100 sub-swarms in the USA may represent whichever states and cities have the highest number of peers (or seeds). Usually these are population centers (e.g., cities like Houston or Los Angeles) or datacenters (e.g., Ashburn, Va.). Intermediate data representations may be the various kinds of JSON files, such as sample files, cache files, and summary files, where cache files may be computed from sample files and/or summary files may be computed from cache files and/or the like, so as to transform the data in some way (e.g., by finding unique and/or fresh nodes (seeds/peers)), by doing geo-tagging and/or filtering, etc.). The SPSP may be configured to create visual forms of swarm models that may render various types of swarm phenomena in electronic, print, and/or video media for use in any suitable manner. Therefore, the SPSP may be operative to aggregate BitTorrent files into aggregated media objects, quantize these media objects into a unique node set (e.g., unique peer set and unique seed set), and/or generate multi-duration studies or reports with geolocation, freshness, network transfer, and/or the like. Network transfer may be a "transfer-size" field in a JSON file (e.g., an examples-cumulative-summary.json file), which may be the size of the file on-disk, which may be the same as the number of bytes transferred when downloading the file. Therefore, if 1 peer downloaded a 10 GB file, network transfer size would be 10 GB, and if 2 2 peers downloaded a 10 GB file, the network transfer size would be 20 GB. This may be used to price network bandwidth for peer to peer traffic "as if" it were a commercial content delivery network ("CDN").

In some embodiments, the SPSP may be configured and operated to quantify and visualize global BitTorrent activity for specific media properties (e.g., television series or films or 3D printing files for guns or other illicit content), which may include counting and mapping the (e.g., unauthorized) peer-to-peer file sharing (e.g., piracy) of copyrighted content or illicit content all over the world. Alternatively or additionally, at least some of the network sharing of the media properties monitored by the SPSP may be legal. The SPSP may utilize a unique methodology to sample BitTorrent swarms, to tally unique peers and seeds, and to create outputs that may include rankings and geo-visualizations from the collected data that may effectively and efficiently generate understanding of the use of certain content (e.g., one media property or set of thematically linked media properties). Systems and methods for representing peer to peer network activity for a given media object over time, and use of peer to peer activity to assess regional and global distribution for individual media objects over time, are provided.

As used herein, the term "media object" may refer to any unique identifier corresponding to a specific media (e.g., content in the expanded field), where exemplary media may include, but not limited to, television media individual episodes (e.g., "The Walking Dead, Season 8, Episode 10"), television media whole seasons (e.g., "Stranger Things, Season 2"), film media (e.g., "Blade Runner 2049"), book media (e.g., "Fire and Fury"), software media (e.g., "Centos 7 Operating System for x86_64"), digital file media (e.g., a 3D-printed gun file (e.g., "Defense Distributed AR15 3D file")), photograph media (e.g., "AP Photograph of Tiananmen Square"), audio file ("Janelle Monáe—Dirty Computer"), and/or the like.

As used herein, the terms "BitTorrent," "BitTorrent Protocol," and/or "BitTorrent Network" may refer to a peer-to-peer network protocol for sharing media objects on the internet or any other suitable network from autonomous node (e.g., any active electronic device that is communicatively coupled or attached to the network) to autonomous node. As used herein, the terms "torrent" and "torrent file" may refer to a text file that may associate a media object to a specific BitTorrent address. As used herein, the terms "swarm" and "swarm phenomena" may refer to the sum activity of network activity for all nodes on a peer-to-peer network for a given torrent or collection of torrents. As used herein, the terms "peer" and "peer activity" may refer to an individual accessing the BitTorrent protocol through a specific node and torrent to download content (e.g., a media object) from the swarm (e.g., a node that is pinging a swarm with an info hash for a particular media object). As used herein, the term "seed" and "seed activity" may refer to an individual accessing the BitTorrent protocol through a specific node and torrent with a complete copy of the contents (e.g., a media object), and/or with the ability to upload the content to the swarm and/or the ability to download content from the swarm (e.g., a node that is pinging a swarm with an info hash for a particular media object and allowing upload of that entire media object). BitTorrent may refer to both a content distribution technology and a set of user practices (e.g., through BitTorrent, users who have already downloaded pieces of a digital file can upload, or "seed," those pieces so that others can download them). Ideally, every user who wants to download a file can assemble a complete version of that file because multiple peers (e.g., fellow users who have downloaded the file) have "shared" or "seeded" (e.g., uploaded) pieces of the file. The BitTorrent protocol may facilitate unauthorized access to copyrighted media content, such as published books, films, television series, games, and software. The copyright industries generally call this type of access "piracy."

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, the terms "computer," "personal computer," and "computing device" may refer to any programmable computer system that is known or that will be developed in the future. In certain embodiments, a computer will be coupled to a network, such as described herein. A computer system may be configured with processor-executable software instructions to perform the processes described herein. Such computing devices may be mobile devices, such as a mobile telephone, data assistant, tablet computer, or other such mobile device. Alternatively, such computing devices may not be mobile (e.g., in at least certain use cases), such as in the case of server computers, desktop computing systems, or systems integrated with non-mobile components.

As used herein, the terms "component," "module," and "system," are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

Figure 1A:
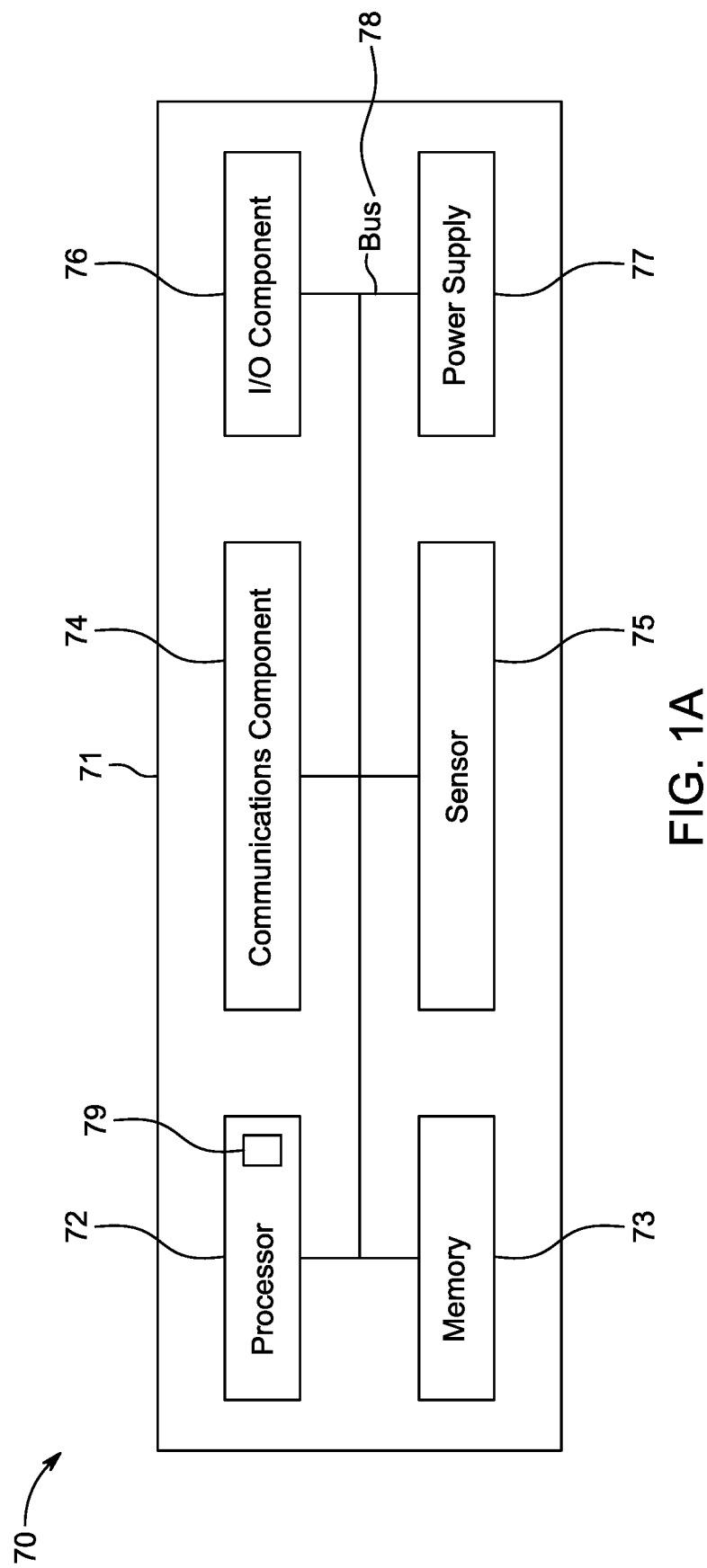
FIG. 1A is a more detailed schematic view of a client subsystem of the system of FIG. 1.
Figure 1B:
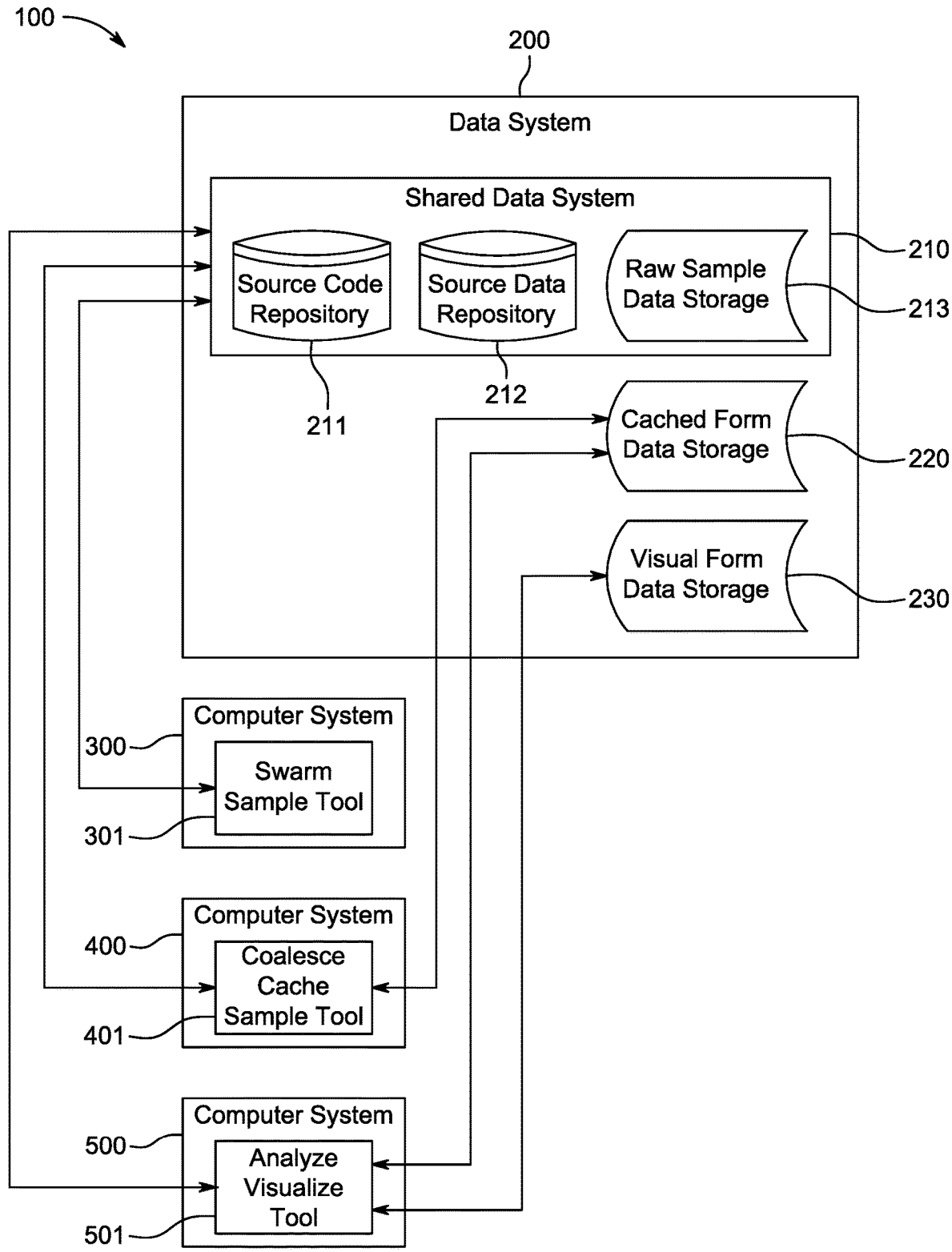
FIG. 1B is a more detailed schematic view of a swarm processing service subsystem of the system of FIG. 1.
Figure 1C:
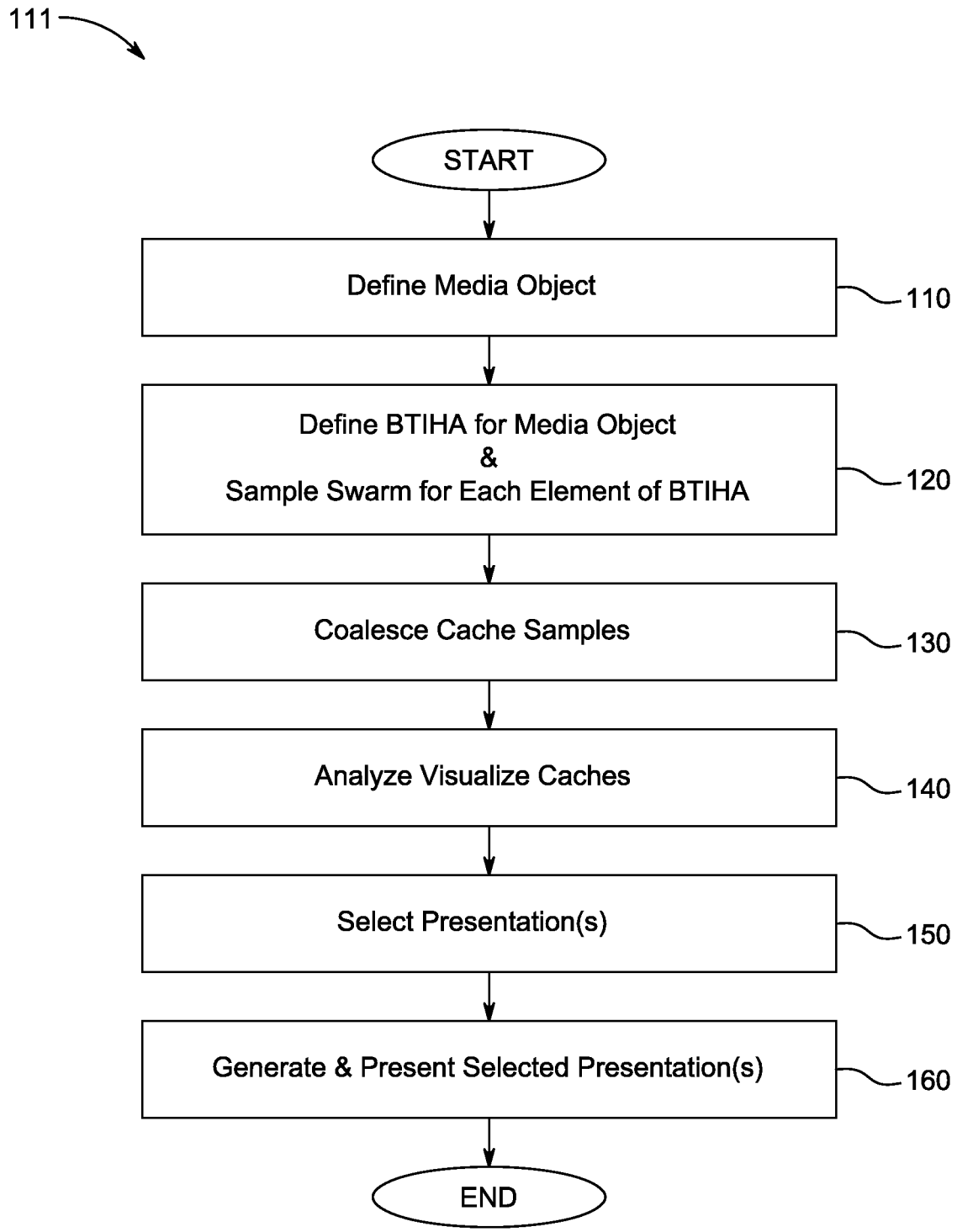
FIG. 1C is a flowchart of an illustrative process for swarm activity monitoring for a particular media object.
Figure 2:
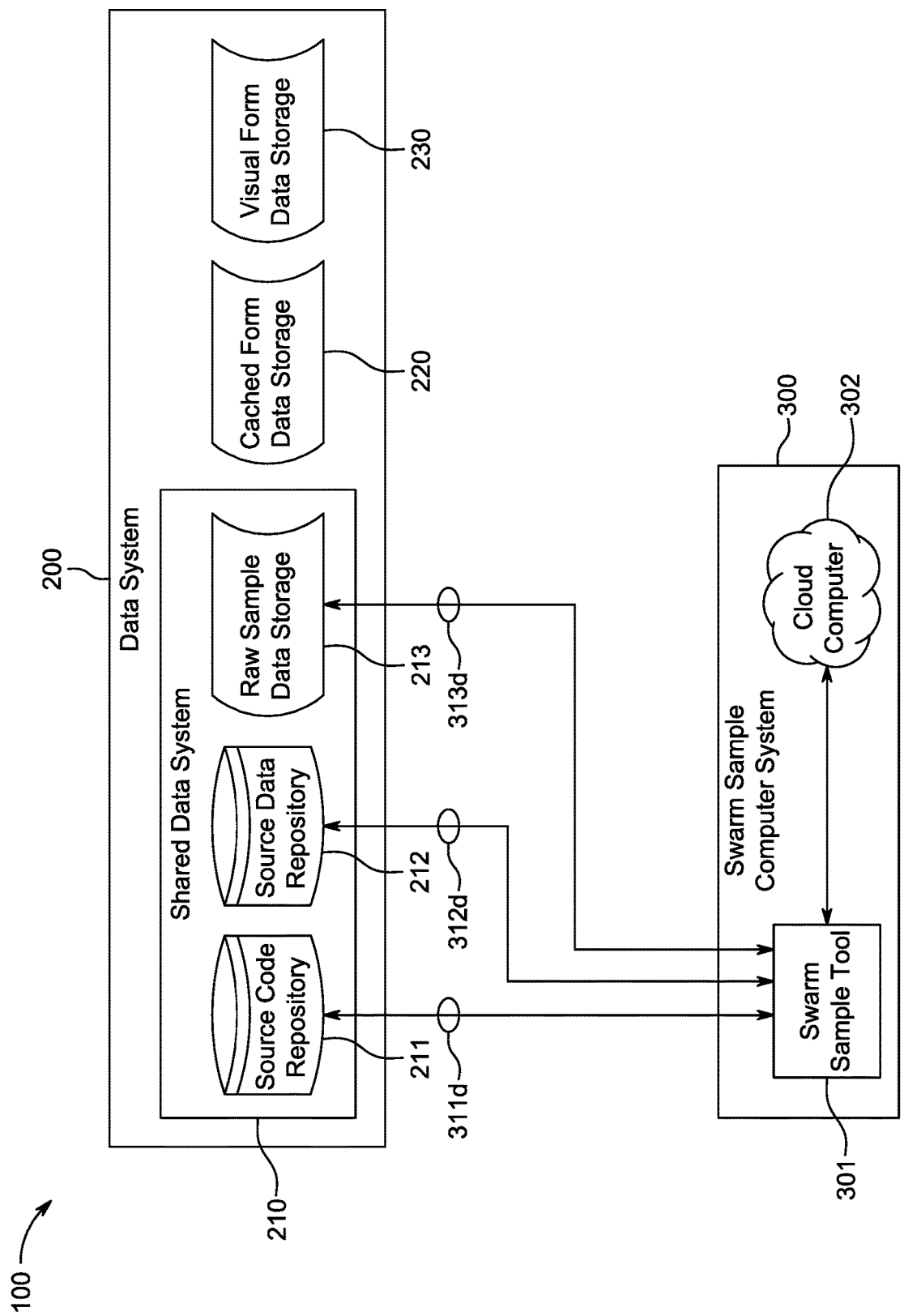
FIG. 2 is a more detailed schematic view of a portion of the swarm processing service subsystem of FIGS. 1 and 1B.
Figure 3:
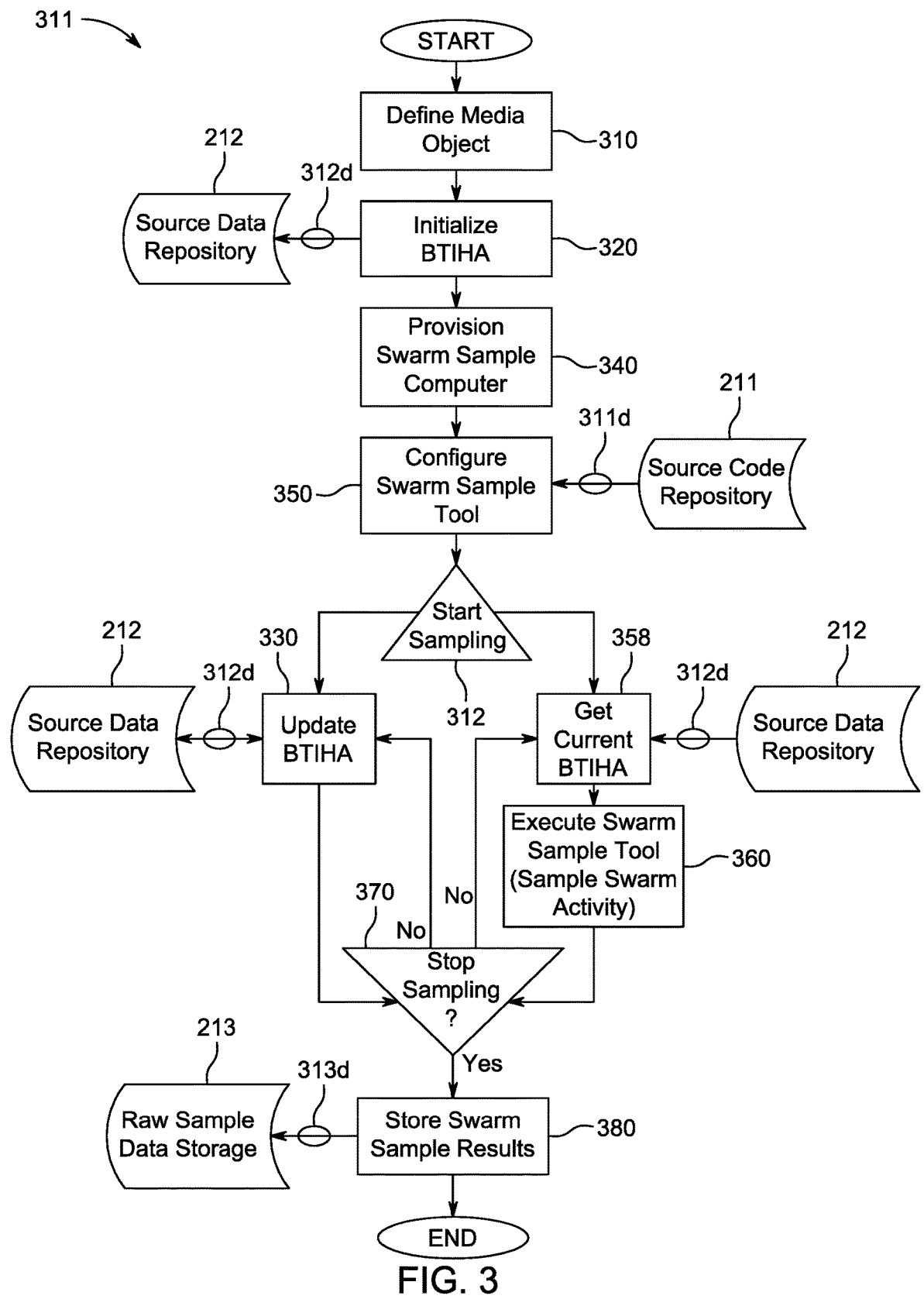
FIG. 3 is a flowchart of an illustrative process for sampling a swarm for a particular media object.
Figure 4:
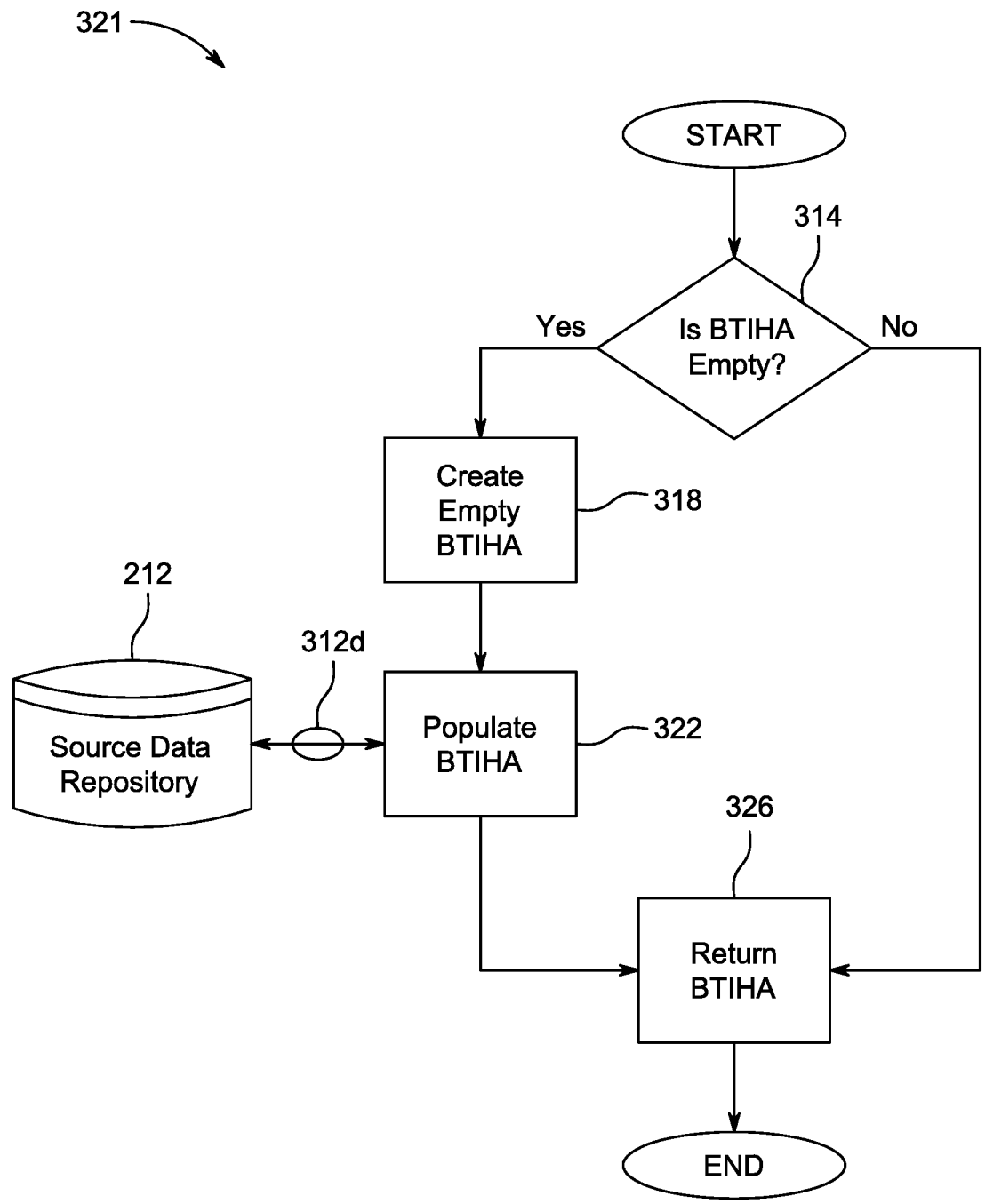
FIG. 4 is a flowchart of an illustrative process for initializing a BitTorrent Protocol Info Hash Array ("BTIHA")
Figure 5:
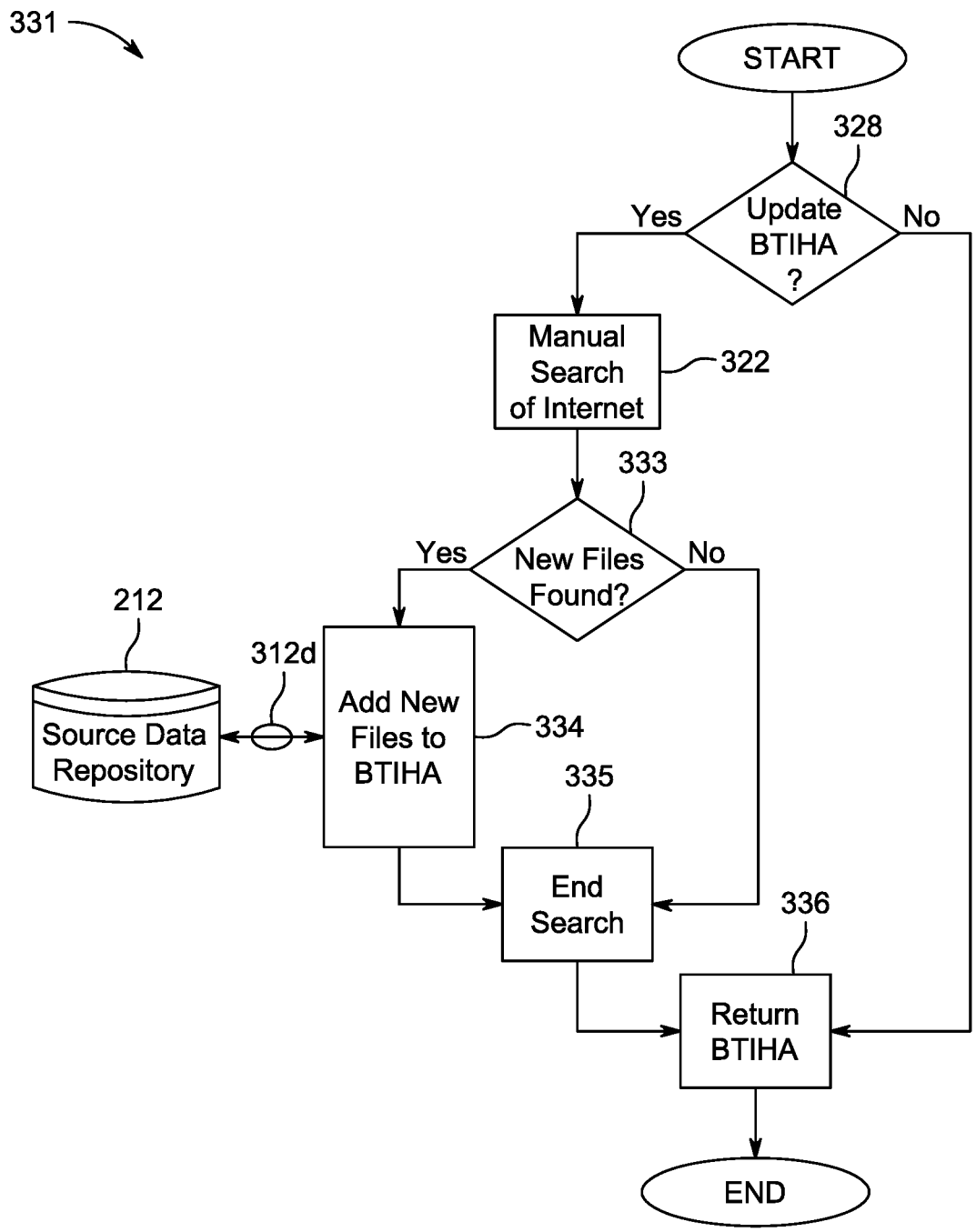
FIG. 5 is a flowchart of an illustrative process for updating a BTIHA.
Figure 6:
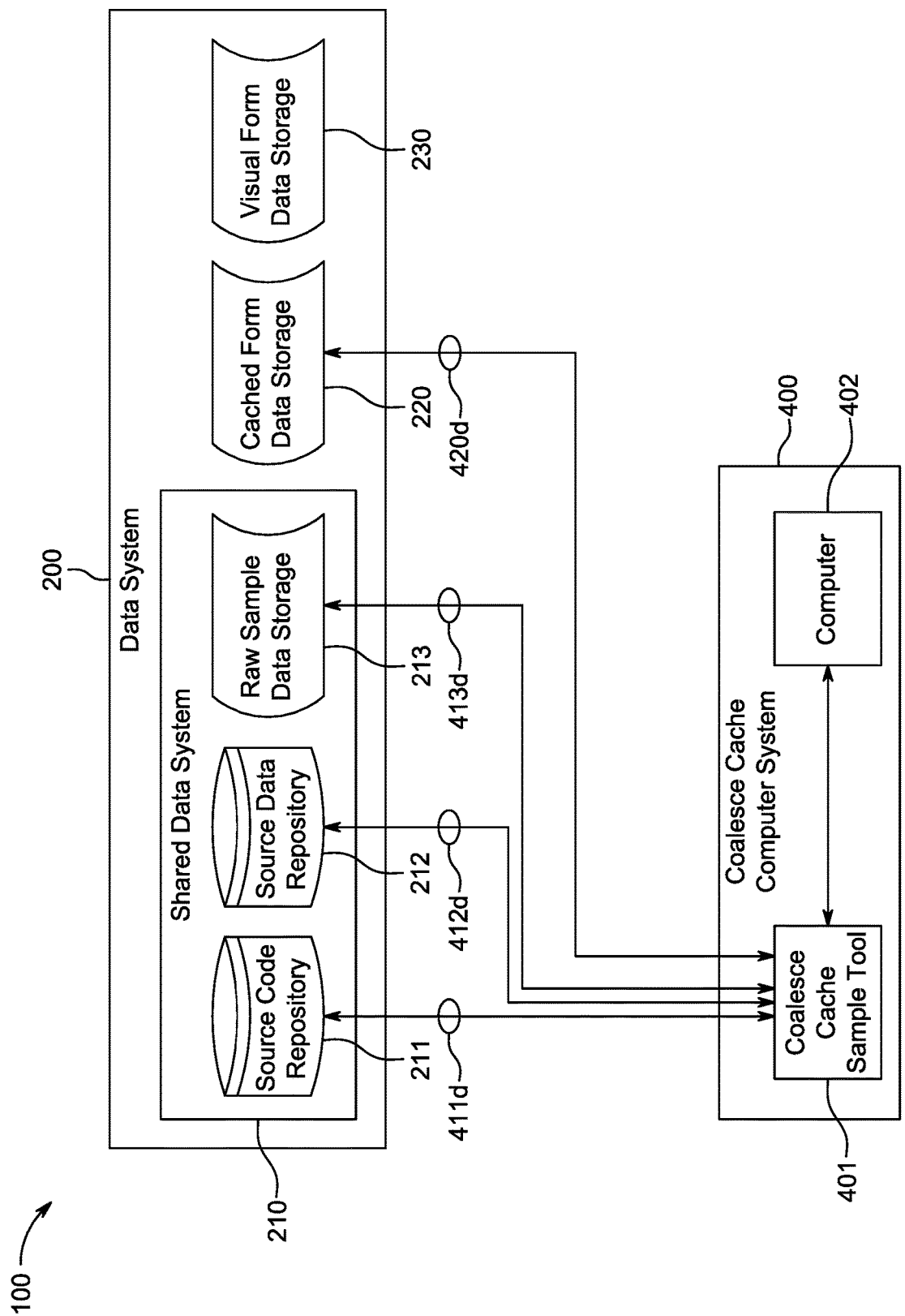
FIG. 6 is a more detailed schematic view of another portion of the swarm processing service subsystem of FIGS. 1 and 1B.
Figure 7:
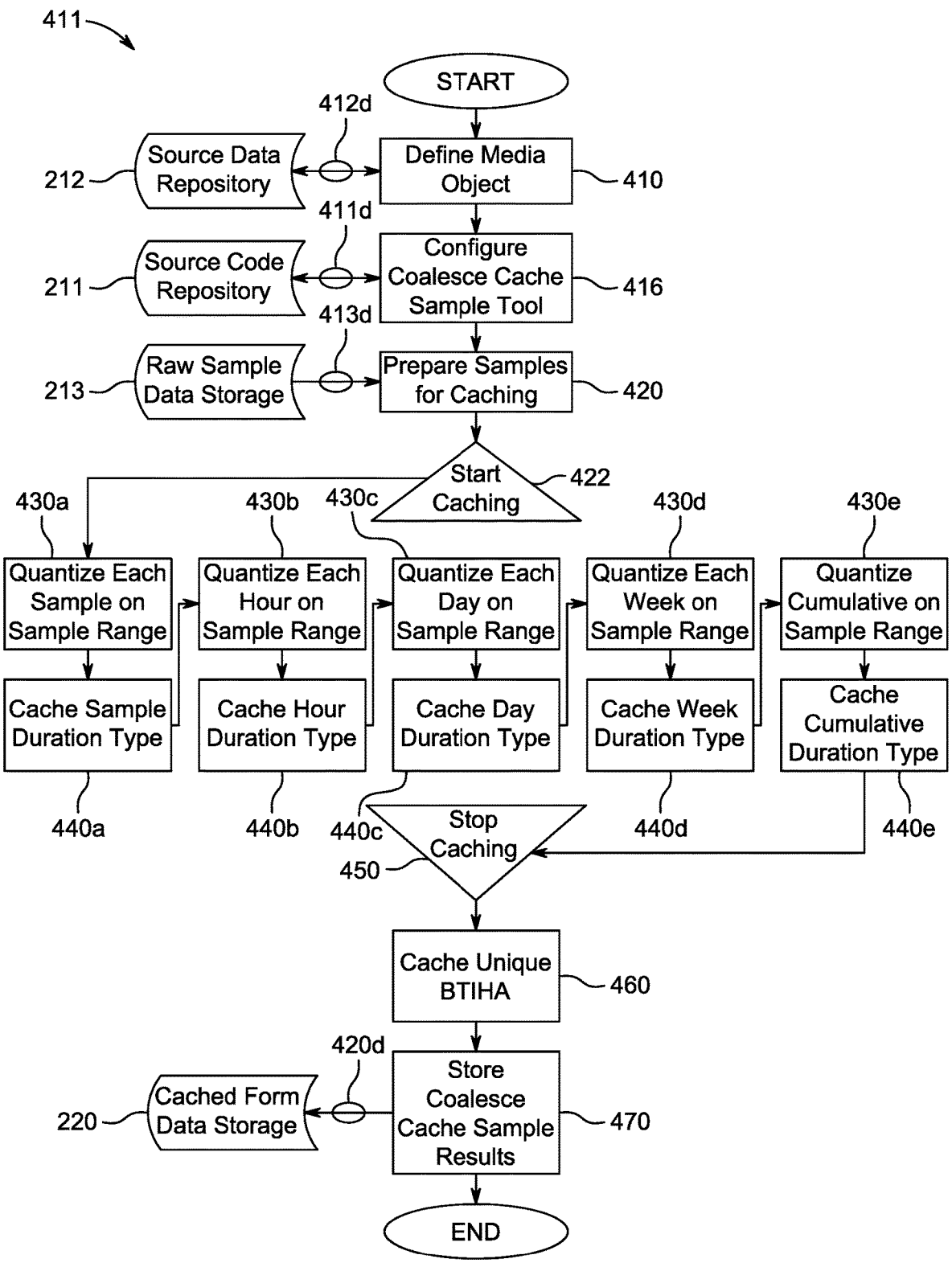
FIG. 7 is a flowchart of an illustrative process for coalesce caching swarm samples for a particular media object.
Figure 8:
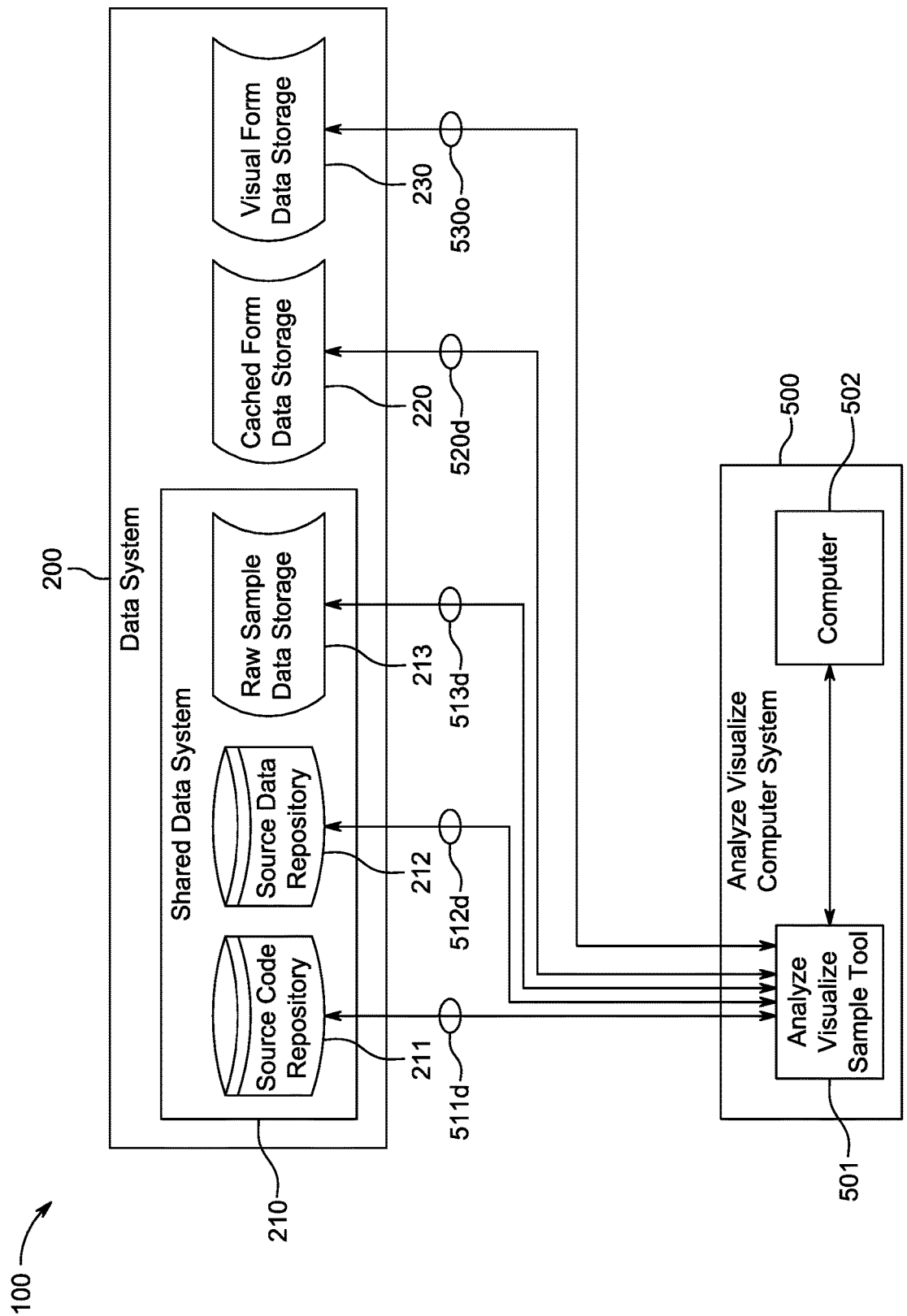
FIG. 8 is a more detailed schematic view of yet another portion of the swarm processing service subsystem of FIGS. 1 and 1B.
Figure 9:
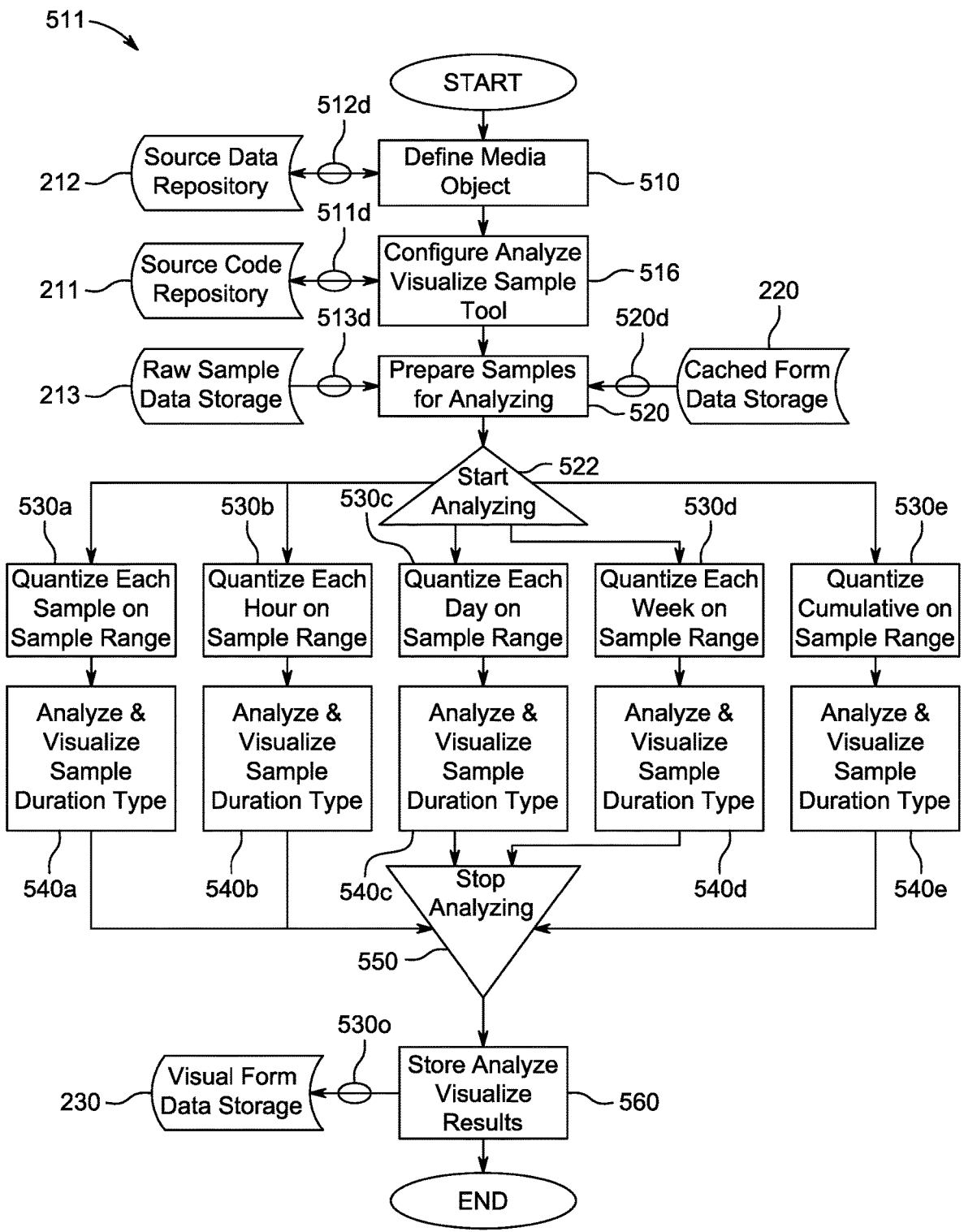
FIG. 9 is a flowchart of an illustrative process for analyzing coalesced cached samples for a particular media object.
Figure 10:
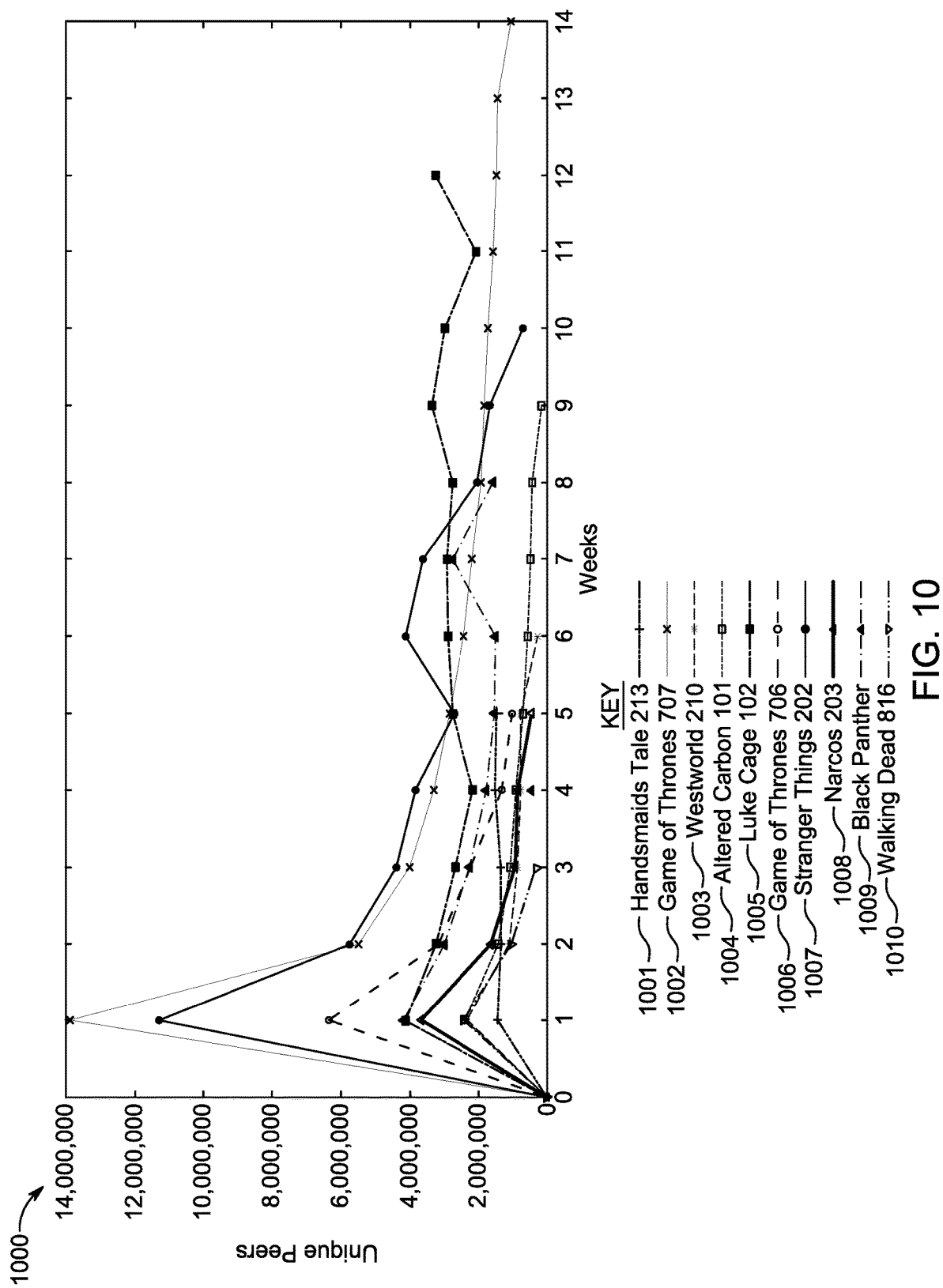
Figure 12:
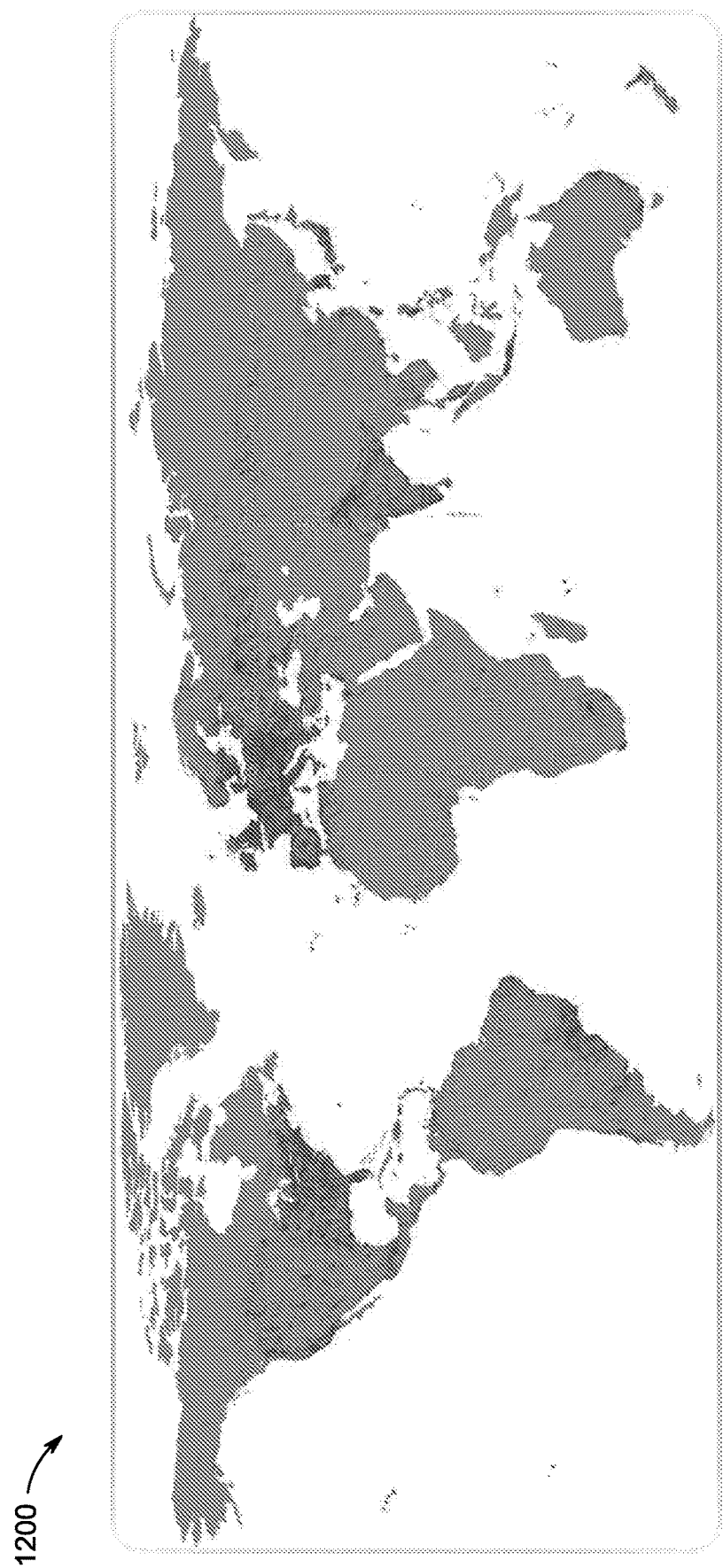
Figure 13A:
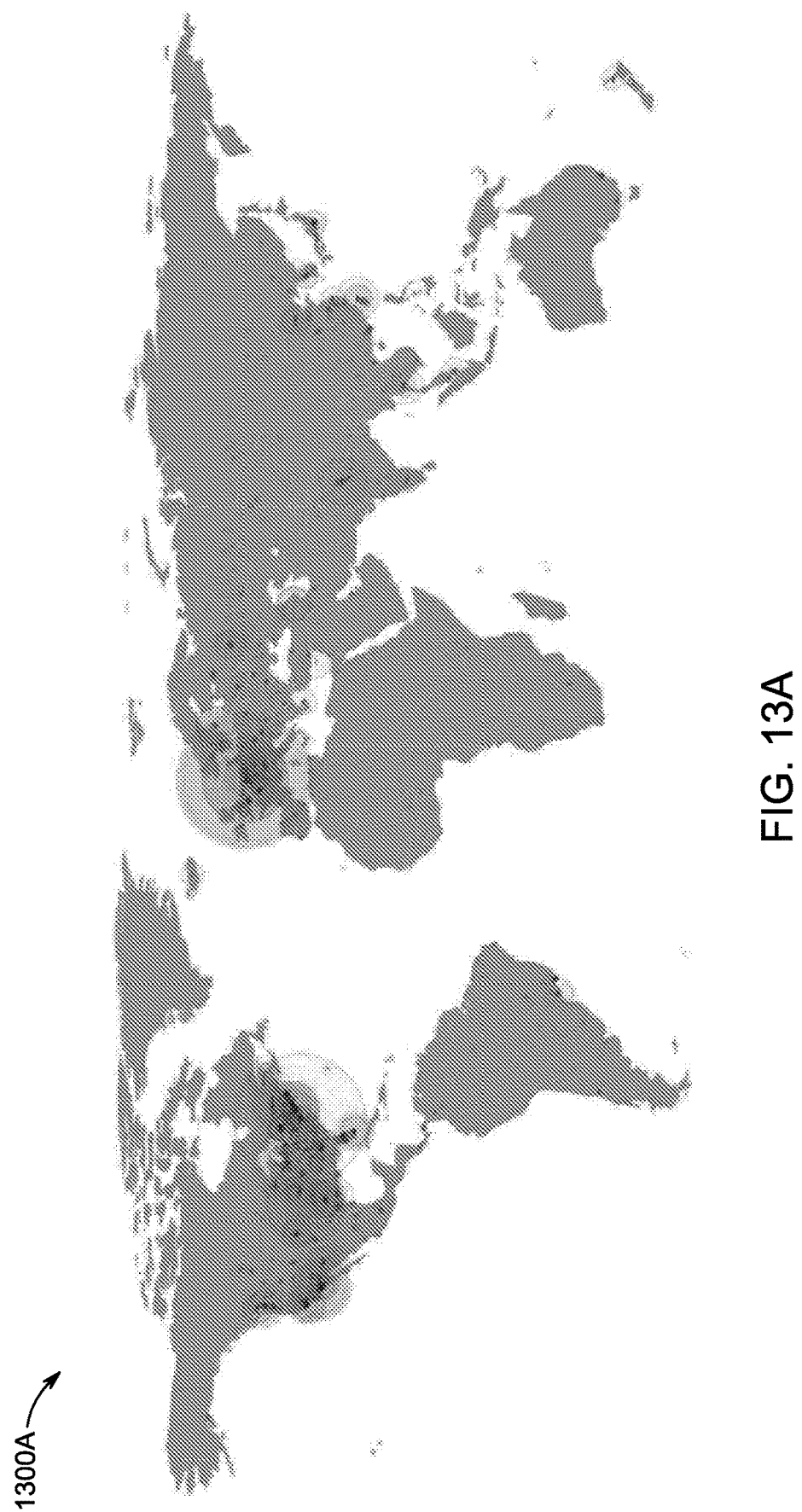
Figure 13B:
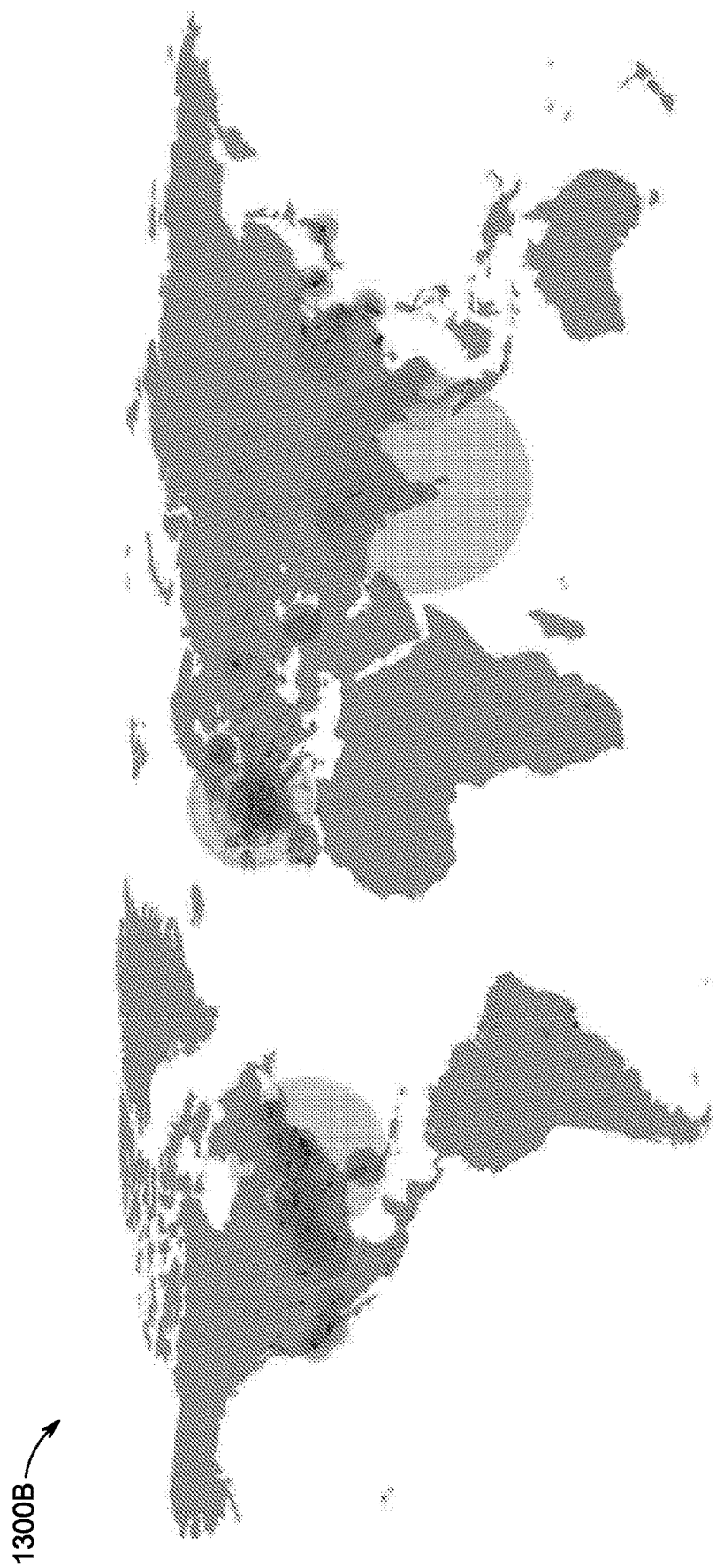
Figure 13C:
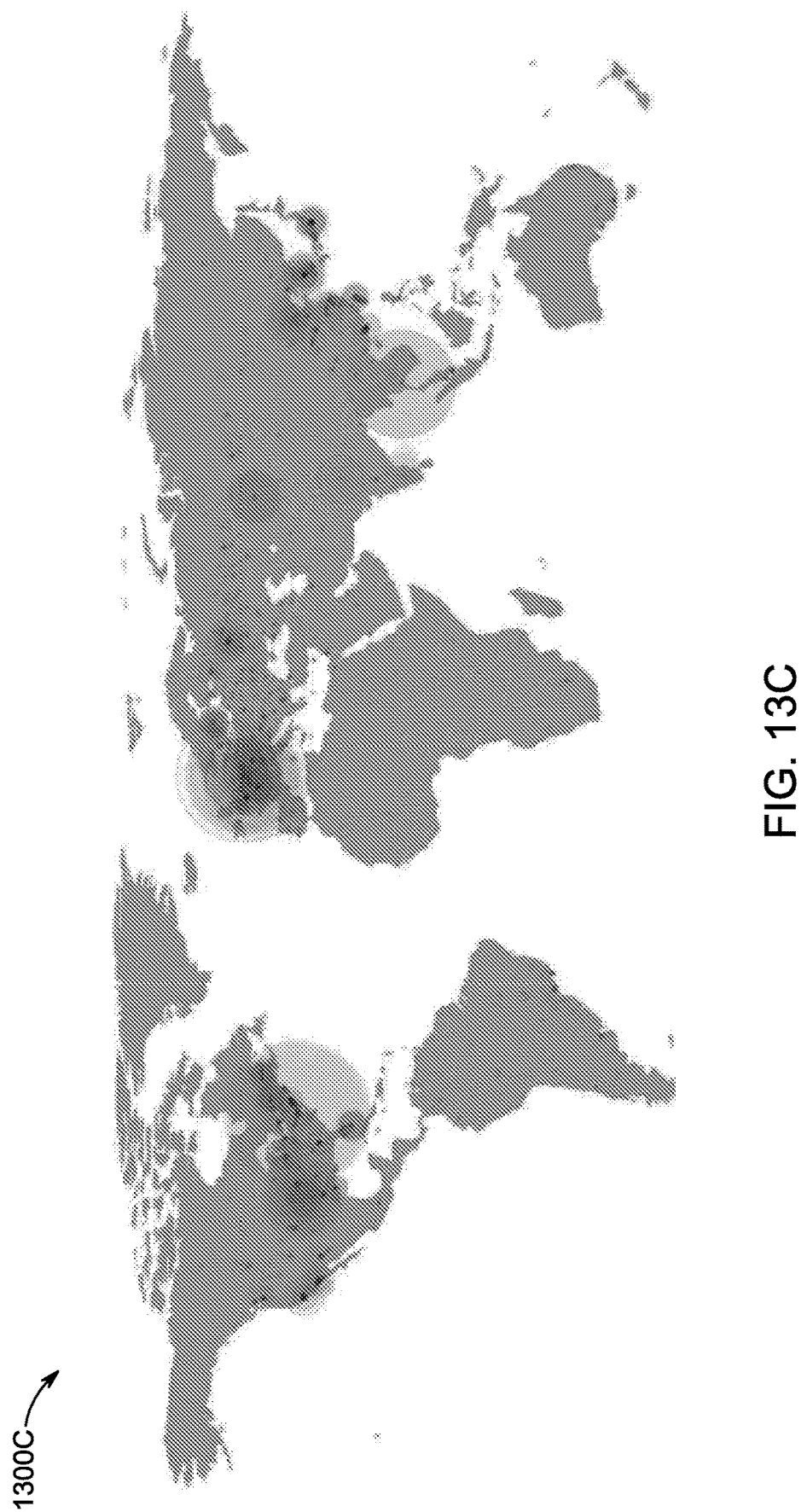
Figure 13D:
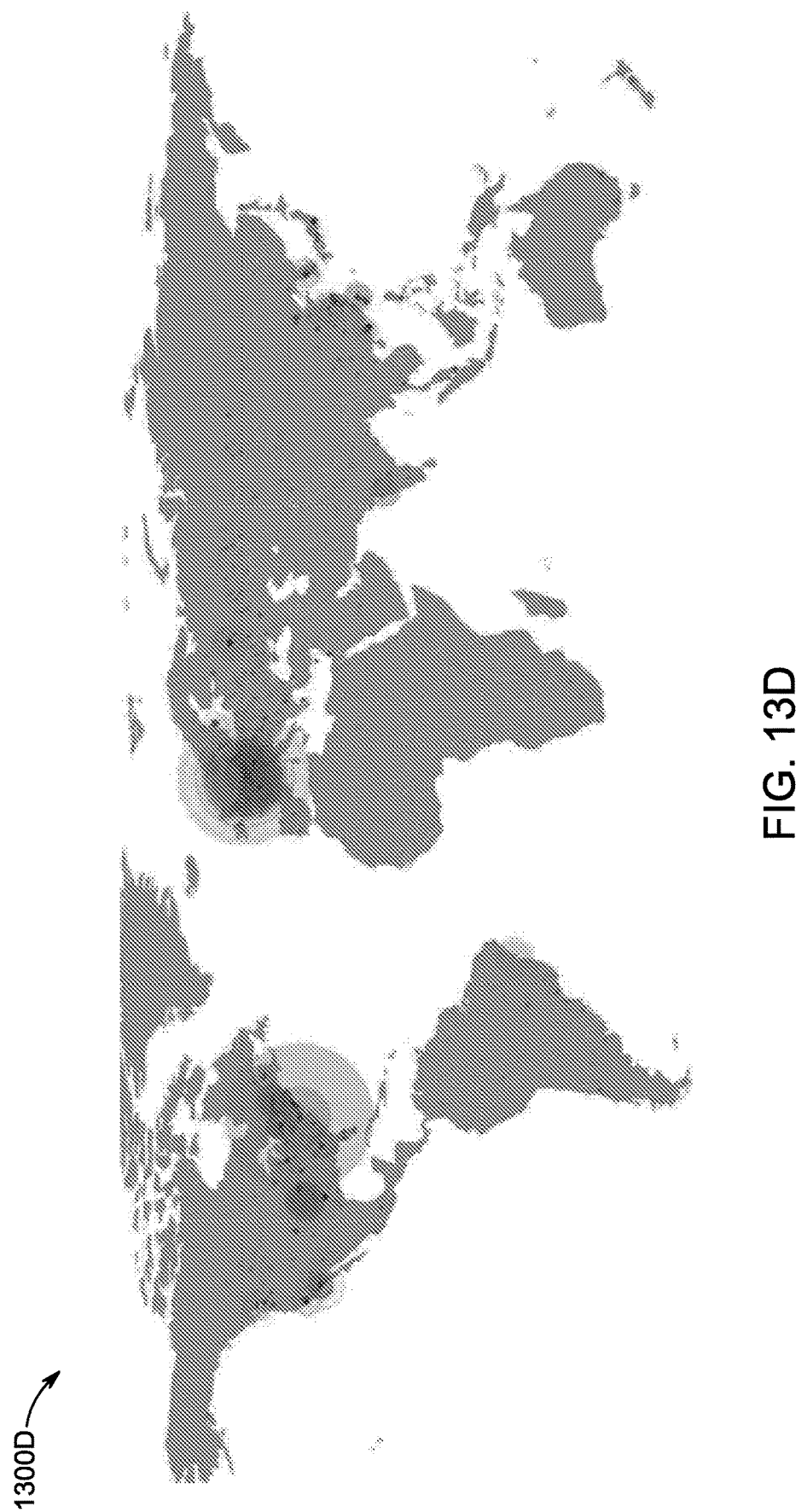
Figure 13E:
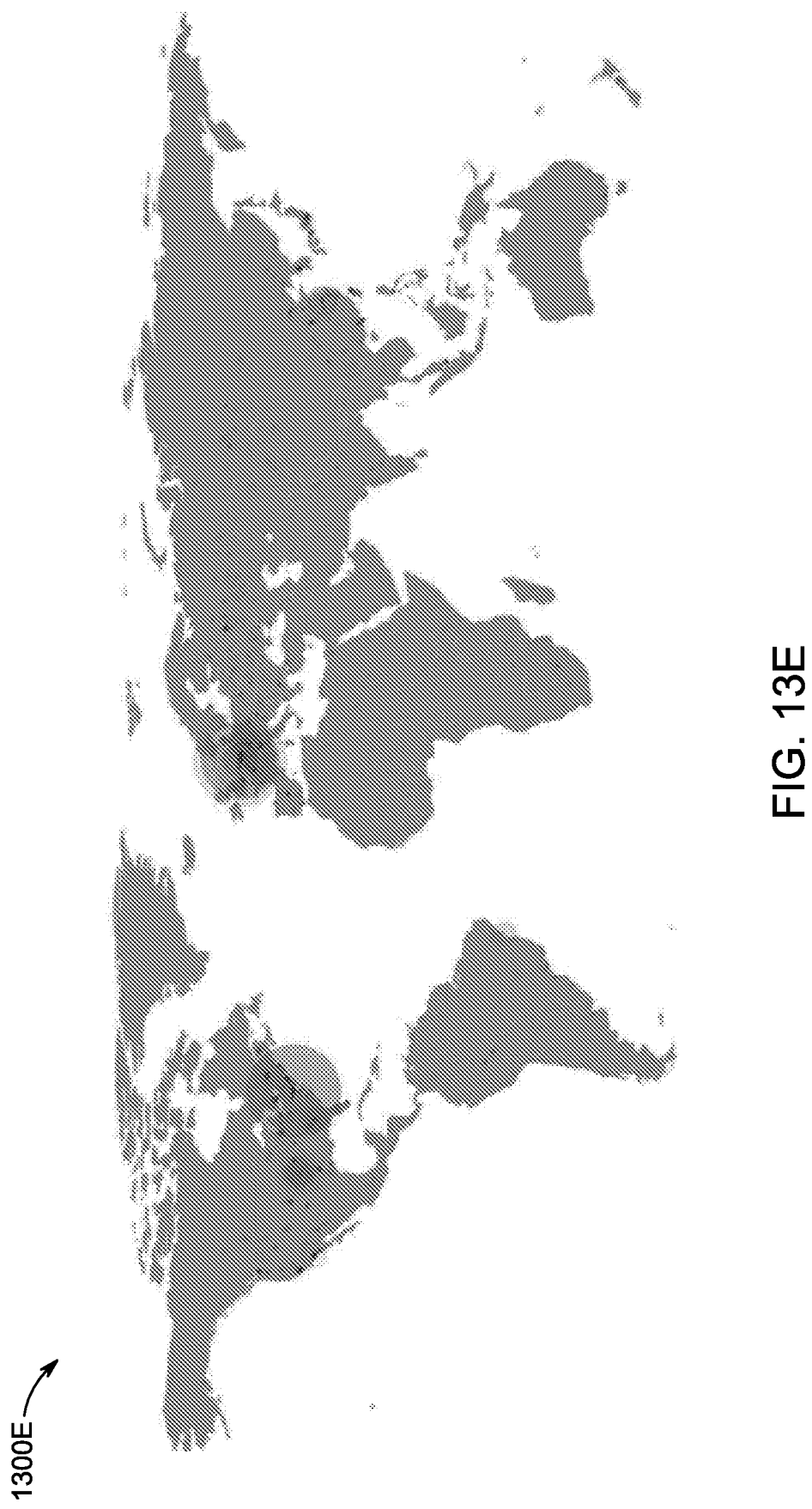

FIG. 1 shows a system 1 in which a network activity monitoring service or a swarm processing service ("SPS") for a peer-to-peer network 80 may be facilitated amongst various client subsystems 70 and an SPS subsystem 100, FIG. 1A shows further details with respect to a particular embodiment of a client subsystem 70 of system 1, FIG. 1B shows further details with respect to a particular embodiment of SPS subsystem 100, FIG. 1C shows details of an illustrative process for swarm activity monitoring for a particular media object, FIG. 2 shows further details with respect to a portion SPS subsystem 100, FIG. 3 shows details of an illustrative process for sampling a swarm for a particular media object, FIG. 4 shows details of an illustrative process for initializing a BTIHA, FIG. 5 shows details of an illustrative process for updating a BTIHA, FIG. 6 shows further details with respect to another portion SPS subsystem 100, FIG. 7 shows details of an illustrative process for coalesce caching for a particular media object, FIG. 8 shows further details with respect to yet another portion SPS subsystem 100, FIG. 9 shows details of an illustrative process for analyzing a particular media object, and FIGS. 10-13E are exemplary visualizations of a swarm processing service of the disclosure.

FIG. 1 and FIG. 1A

FIG. 1 is a schematic view of an illustrative system 1 in which swarm processing may be facilitated utilizing client subsystems of a peer-to-peer network 80. For example, as shown in FIG. 1, system 1 may include a network activity monitoring service or swarm processing service ("SPS") subsystem 100, various client subsystems 70 (e.g., client subsystems 70a-70c) of a peer-to-peer network 80, at least one third party enabler subsystem 90, and at least one communications network 50 through which SPS subsystem 100 and at least one client subsystem 70 and/or at least one third party enabler subsystem 90 may communicate.

As shown in FIG. 1A, and as described in more detail below, a client subsystem 70 may include a processor component 72, a memory component 73, a communications component 74, a sensor 75, an input/output ("I/O") component 76, a power supply component 77, and/or a bus 78 that may provide one or more wired or wireless communication links or paths for transferring data and/or power to, from, or between various other components of client subsystem 70. In some embodiments, one or more components of client subsystem 70 may be combined or omitted. Moreover, client subsystem 70 may include other components not combined or included in FIG. 1A and/or several instances of the components shown in FIG. 1A. For the sake of simplicity, only one of each of the components of client subsystem 70 is shown in FIG. 1A. I/O component 76 may include at least one input component (e.g., button, mouse, keyboard, etc.) to receive information from a user and/or at least one output component (e.g., audio speaker, video display, haptic component, etc.) to provide information to a user, such as a touch screen that may receive input information through a user's touch of a display screen and that may also provide visual information to a user via that same display screen. Memory 73 may include one or more storage mediums, including for example, a hard-drive, flash memory, permanent memory such as read-only memory ("ROM"), semi-permanent memory such as random access memory ("RAM"), any other suitable type of storage component, or any combination thereof. Communications component 74 may be provided to allow client subsystem 70 to communicate with one or more other subsystems 70 or subsystems 90 or servers or SPS subsystem 100 using any suitable communications protocol (e.g., via communications network 50). Communications component 74 can be operative to create or connect to a communications network (e.g., network 50). Communications component 74 can provide wireless communications using any suitable short-range or long-range communications protocol, such as Wi-Fi (e.g., an 802.11 protocol), Bluetooth, radio frequency systems (e.g., 1200 MHz, 2.4 GHz, and 5.6 GHz communication systems), infrared, protocols used by wireless and cellular telephones and personal e-mail devices, or any other protocol supporting wireless communications. Communications component 74 can also be operative to connect to a wired communications network or directly to another data source wirelessly or via one or more wired connections. Sensor 75 may be any suitable sensor that may be configured to sense any suitable data for subsystem 70 (e.g., location-based data via a GPS sensor system, motion data, environmental data, etc.). Power supply 77 can include any suitable circuitry for receiving and/or generating power, and for providing such power to one or more of the other components of client subsystem 70. Client subsystem 70 may also be provided with a housing 71 that may at least partially enclose one or more of the components of client subsystem 70 for protection from debris and other degrading forces external to client subsystem 70. Each component of client subsystem 70 may be included in the same housing 71 (e.g., as a single unitary device, such as a laptop computer or portable media device or server) and/or different components may be provided in different housings (e.g., a keyboard input component may be provided in a first housing that may be communicatively coupled to a processor component and a display output component that may be provided in a second housing). In some embodiments, client subsystem 70 may include other components not combined or included in those shown or several instances of the components shown.

Processor 72 may be used to run one or more applications, such as an application 79 that may be accessible from memory 73 and/or any other suitable source (e.g., from network 50 via SPS subsystem 100 or any other subsystem and an active Internet connection). Application 79 may include, but is not limited to, one or more operating system applications, firmware applications, communication applications (e.g., any suitable peer-to-peer file sharing protocol (e.g., BitTorrent) applications (e.g., for enabling communication of files between client subsystems 70)), internet browsing applications (e.g., for interacting with a website provided by SPS subsystem 100 for enabling client subsystem 70 to interact with an online service), swarm processing applications (e.g., a web application or a native application that may be at least partially produced by SPS subsystem 100 for enabling client subsystem 70 to interact with an online service), or any other suitable applications. For example, processor 72 may load an application 79 as a user interface program to determine how instructions or data received via an input component of I/O component 76 or other component of client subsystem 70 (e.g., sensor 75 and/or communications component 74) may manipulate the way in which information may be stored (e.g., in memory 73) and/or provided to the user via an output component of I/O component 76 and/or to another subsystem via communications component 74. As one example, application 79 may provide a user with the ability to interact with a swarm processing service platform ("SPSP") of SPS subsystem 100, where application 79 may be a third party application that may be running on client subsystem 70 (e.g., an application associated with SPS subsystem 100) that may be loaded on client subsystem 70 (e.g., using communications component 74) via an application market, such as the Apple App Store or Google Play, or that may be accessed via an internet application or web browser (e.g., by Apple Safari or Google Chrome) that may be running on client subsystem 70 and that may be pointed to a uniform resource locator ("URL") whose target or web resource may be managed by or otherwise affiliated with SPS subsystem 100.

SPS subsystem 100 may include a processor component 12 that may be similar to processor 72, a memory component 13 that may be similar to memory component 73, a communications component 14 that may be similar to communications component 74, an I/O component 16 that may be similar to I/O component 76, a power supply component 17 that may be similar to power supply component 77, and/or a bus 18 that may be similar to bus 78. One, some, or each communications component 14 and/or one, some, or each communications component 74 may be a network interface that may include the mechanical, electrical, and signaling circuitry for communicating data over physical links coupled to network 50. Such network interface(s) may be configured to transmit and/or receive any suitable data using a variety of different communication protocols, including, but not limited to, TCP/IP, UDP, ATM, synchronous optical networks ("SONET"), any suitable wireless protocols, Frame Relay, Ethernet, Fiber Distributed Data Interface ("FDDI"), and/or the like. In some embodiments, one, some, or each of such network interfaces may be configured to implement one or more virtual network interfaces, such as for Virtual Private Network ("VPN") access. Moreover, SPS subsystem 100 may include one or more data sources or data structures 15 that may include any suitable data and/or applications (e.g., application 79 of a subsystem 70 and/or an application that may be run by processor 12 of SPS subsystem 100) for facilitating a swarm processing service or SPSP that may be provided by SPS subsystem 100 to one or more client subsystems 70. Some or all portions of SPS subsystem 100 may be operated, managed, or otherwise at least partially controlled by an entity responsible for providing a swarm processing service to one or more users or entities.

SPS subsystem 100 may communicate with one or more client subsystems 70 and/or third party enabler subsystems 90 via one or more communications networks 50 and/or any client subsystem 70 may communicate with any other client subsystem 70 and/or subsystem 90 via one or more communications networks 50. Network 50 may be the Internet or any other network, such that when interconnected, a client subsystem 70 may access information (e.g., from data structure 15 of SPS subsystem 100, as may be provided as a swarm processing service via processor 12 of SPS subsystem 100) as if such information were stored locally at that client subsystem 70 (e.g., in memory component 73). A client may be a user of the platform (e.g., marketplace, online community member, etc.) that can form a peer-to-peer network 80 using various online tools, and the SPSP may be a platform (e.g., online community monitor) that may be configured to provide valuable insights to the clients and/or to any other suitable entities (e.g., media content creators and/or media content rights owners).

SPS subsystem 100 may be operative to provide swarm processing services to participants in any suitable peer-to-peer platform, such as one with participants that may each act as either a peer or a seed for a specific media object. Each participant may use a participant electronic device or client subsystem (e.g., subsystem 70a, subsystem 70b, subsystem 70c, etc.) of any suitable network (e.g., peer-to-peer network 80). One or more third party enabler subsystems 90 may also be provided and communicatively coupled to SPS subsystem 100, where each third party enabler subsystem 90 may be any suitable subsystem (e.g., computer) operated by any suitable third party enabler ("TPE") that may be operative to enable at least partially any suitable operation provided by the SPSP, such as a third party application or service provider that may be operative to process or provide any suitable subject matter that may be used by any other suitable subsystem of system 1 for enabling a swarm processing service using the SPSP (e.g., any suitable demographic data source (e.g., Demographia, The U.S. Census Bureau, the Natural Earth data sets, and/or the like), any suitable cartographic projections data source (e.g., Mercator-inspired UN Maps in the public domain found on Wikipedia, public domain Voroni projections by Visionscarto, public domain Cahill-Keyes projections on Gene Keyes' website (i.e., www.genekeves.com), and/or the like), any suitable Torrent caching services (e.g., https://itorrents.org), any suitable Torrent tracker lists and/or indexes (e.g., https://torrents.io, https://github.com/ngosang/trackerlist, https://opentrackers.org, etc.), any other suitable trackers (e.g., trackers may be used as may be pulled from public records and court orders (e.g., in Peru, India, Ireland, U.S.A., Canada, Singapore, Denmark, Sweden, etc.)), any other suitable BitTorrent management pages (e.g., any suitable indexing web sites, tracker sites/servers, RSS feeds, etc.), and/or the like). Those skilled in the art will understand that any number of client subsystems 70 and/or any number of third party enabler subsystems 90 and/or any number of networks 80 and/or any number of networks 50 may be used in system 1 and that the illustrative diagram of FIG. 1 is provided for simplicity.

The SPSP as may be facilitated by SPS subsystem 100 may be configured to assess and represent regional and global distribution for individual media objects over time. The SPSP may be configured to produce any suitable analysis of the monitored activity, including, but not limited to, analysis that may be operative to compare the distribution of multiple media objects to each other and/or to previous objects, analysis that may be operative to represent peer-to-peer network activity for a given media object over time, analysis that may be operative to synthesize aggregate swarm behavior, analysis that may be operative to model the swarm with any suitable visualization(s), and/or the like.

FIG. 1B

FIG. 1B is a more detailed schematic view of an illustrative SPS subsystem 100 or swarm system 100. As shown, FIG. 1B depicts various possible components of swarm system 100, including a data system 200, a swarm sample computer system 300, a coalesce cache computer system 400, and an analyze visualize computer system 500, one, some, or each of which may include one, some, or each of a processor (e.g., processor 12), memory (e.g., memory 13), communications circuitry (e.g., communications component 14), data structure(s) (e.g., data structure 15), I/O component(s) (e.g., I/O component 16), power supply (e.g., power supply 17), bus (e.g., bus 18), housing(s) (e.g., housing 11), and/or the like. However, it should be noted that swarm system 100, like subsystem 70, may include other components not combined or shown, or several instances of one or more of the components shown, and that a swarm system facilitating one or more concepts of this disclosure is not necessarily limited to the specific architecture depicted by FIG. 1 and/or FIG. 1B or otherwise.

Data system 200 may be configured to be operational before certain other components may be effectively used. Data system 200 may provide storage and shared resources for one, some, or each of the other computer system components (e.g., swarm sample computer system 300, coalesce cache computer system 400, and/or analyze visualize computer system 500) of system 100. As shown, data system 200 may include any suitable components, including, but not limited to, a source code repository 211, a source data repository 212, a raw sample data storage 213, a cached form data storage 220, and/or a visual form data storage 230, one, some, or each of which may be autonomous from each other and the other computer systems of swarm system 100. A subset of the components of data system 200, such as components 211, 212, and 213, may be shared with one, some, or each of the other systems (e.g., subsystems) of swarm system 100 (e.g., systems 300, 400, and/or 500) and may be grouped into a meta component shared data system 210.

An operator of system 100 or otherwise may select embodiments for the components (e.g., subcomponents) of data system 200. For example, source code repository 211 may be any suitable component operative to store source code or any other suitable information, such as a cloud-hosted source code repository (e.g., a source code repository on Git by GitHub of Microsoft Corporation of Redmond, Wash.). Source data repository 212 may be any suitable component operative to store source data or any other suitable information, such as a cloud-hosted source data repository (e.g., a source data repository on Git by GitHub). Raw sample data storage 213 may be any suitable component operative to store raw sample data or any other suitable information, such as a local file server that may include a server of any suitable operating system (e.g., a Linux server) with any suitable file system (e.g., an encrypted ext4 filesystem) and/or that may be equipped with any suitable protocols (e.g., the server message block ("SMB") protocol or any other suitable network protocol and/or the network file system ("NFS") protocol or any other suitable distributed file system protocol) and/or that may be equipped with any suitable networking capabilities. Cached form data storage 220 may be any suitable component operative to store cached form data or any other suitable information, and, in some embodiments, may be similar to or identical to or the same as the component (e.g., local file server) that may be providing raw sample data storage 213. Visual form data storage 230 may be any suitable component operative to store visual form data or any other suitable information, such as a cloud-hosted visual form data storage (e.g., a visual form data storage on Google Drive by Google LLC of Mountain View, Calif.). In some embodiments, at least a portion of system 100 may be configured to use one or more programming languages to implement one or more of the various processes described herein, including, but not limited to, C++ by Bjarne Stroustrup, Python by the Python Software Foundation or any other suitable interpreted, high-level, and/or general-purpose programming language, and/or the like.

FIG. 1C

FIG. 1C is a flowchart of an illustrative process 111 for swarm activity monitoring for a particular media object. For example, process 111 may be carried out by various components of swarm system 100, including data system 200, swarm sample computer system 300, and coalesce cache computer system 400, and an analyze visualize computer system 500. Process 111 may start at operation 110 by defining a media object (e.g., an operator of the system may define a media object in any suitable manner). A defined media object may include any suitable characteristics, including, but not limited to, a title and/or search string, a type, single or multiple episodes or files, a release date, a media file type (e.g., PDF, JPEG, EPUB, MP4, and/or the like), media resolution and/or duration, author, creator, any other suitable identifying characteristics, and/or the like. Each instance of a media object that may exist on any suitable network (e.g., any peer to peer protocol network (e.g., peer-to-peer network 80)) may be referred to herein as a BitTorrent protocol info hash array ("BTIHA") element. At operation 120 (e.g., as described further by the processes of FIGS. 3-5), the defined media object may be used (e.g., by an operator) to create a BTIHA, which may be a collection of all the various instances (e.g., elements) of the media object that may exist and can be found on the network (e.g., peer-to-peer network 80 or the entire internet) and then the network or swarm may be sampled for each element of the BTIHA. The BTIHA may be the main organizing object for swarm system 100, and may be used (e.g., in one, some, or all of the subsystems) to sample, cache, and analyze the media object. The samples of operation 120 may be made at any suitable interval (e.g., every 5 minutes, etc.) for any suitable sample duration (e.g., 4 weeks) across any suitable networks to determine any suitable data (e.g., the number and identity of each node (e.g., each peer and each seed) associated with the BTIHA element. At operation 130 (e.g., as described further by the process of FIG. 7), the swarm samples for each element may be coalesced and cached in any suitable manner for any suitable normalization durations (e.g., hour, day, week, cumulative) in order to determine any suitable data (e.g., unique peers and/or unique seeds and/or fresh (e.g., new) peers and/or fresh seeds for each duration. At operation 140 (e.g., as described further by the process of FIG. 9), the caches may then be analyzed for visualization in any suitable manner, such as by determining a geolocation for each peer and seed of the cache and removing any duplicates or the like. At operation 150, any suitable presentations of the analyzed data may be selected (e.g., any suitable time range(s) and/or geolocation(s) and/or any other suitable metadata characteristic(s) and/or any suitable visualization type (e.g., list, chart, map, etc.) may be selected (e.g., by any suitable operator or end user (e.g., client) of the SPSP). Then, at operation 160, the selected presentations may be generated and presented (see, e.g., FIGS. 10-13E). As just one example, operation 120 may be carried out by swarm sample computer system 300, operation 130 may be carried out by coalesce cache computer system 400, operation 140 may be carried out by analyze visualize computer system 500, operation 150 may be carried out by SPS subsystem 100 (e.g., in coordination with any inputs that may be provided by a client subsystem (e.g., through user input)), while operation 160 may be carried out by SPS subsystem 100 (e.g., in coordination with any outputs that may be provided on a client subsystem (e.g., for presentation to a user)).

FIG. 2

FIG. 2 is a schematic view of an illustrative portion of swarm system 100, which may include data system 200 and swarm sample computer system 300. As shown, swarm sample computer system 300 may include any suitable swarm sample tool 301 that may run on or in conjunction with any suitable swarm sample computer 302 (e.g., a cloud computer), which may be any suitable component or server, such as a cloud storage host (e.g., a dedicated Linux host from any suitable cloud computing provider). Swarm sample computer system 300 may be configured to be fully autonomous of coalesce cache computer system 400 and analyze visualize computer system 500. For example, swarm sample computer system 300 may be configured to have no dependencies except for any suitable data 311d communicated with source code repository 211 and/or any suitable data 312d communicated with source data repository 212 and/or any suitable data 313d communicated with to raw sample data storage 213.

FIG. 3

FIG. 3 is a flowchart of an illustrative process 311 for sampling a swarm for a particular media object. For example, process 311 may be carried out by swarm sample tool 301 of swarm sample computer system 300 of swarm system 100, for example, to observe and archive swarm phenomena for a given media object over fixed time durations, serialize swarm and metadata, and/or transfer such to a data archive. Process 311 may start at operation 310 by defining a media object (e.g., an operator of the system may define a media object in any suitable manner). A defined media object may include any suitable characteristics, including, but not limited to, a title and/or search string, a type, single or multiple episodes or files, a release date, a media file type (e.g., PDF, JPEG, EPUB, MP4, and/or the like), media resolution and/or duration, author, creator, any other suitable identifying characteristics, and/or the like. Each instance of a media object that may exist on any suitable network (e.g., any peer to peer protocol network (e.g., peer-to-peer network 80)) may be referred to herein as a BitTorrent protocol info hash array ("BTIHA") element. An operator may use the defined media object to create a BTIHA, which may be a collection of all the various instances (e.g., elements) of the media object that may exist and can be found on the network (e.g., peer-to-peer network 80 or the entire internet (e.g., any network or subnetwork up to and including the entire internet, not exclusive to peer-to-peer network 80)). The BTIHA may be the main organizing object for swarm system 100, and may be used (e.g., in one, some, or all of the subsystems) to sample, cache, and analyze the media object.

After operation 310, process 311 may proceed to operation 320 for initializing or creating a BTIHA (e.g., as described with respect to process 321 of FIG. 4), which may include using any suitable data 312d as may be communicated with (e.g., from) source data repository 212. Then, process 311 may proceed to operation 340 for provisioning a swarm sample computer of the system. The provisioning of a swarm sample computer at operation 340 may be carried out in any suitable manner. For example, at operation 340, an operator may instantiate a server from a cloud storage host. This server may be swarm sample computer 302 (e.g., a cloud computer) and may be configured with any prerequisite software that may be needed to execute a swarm sample tool (e.g., swarm sample tool 301). For example, the operator may check out an up-to-date version of any suitable source code implementing the tools from source code repository 211 (e.g., at least a portion of data 311d), and/or check out the current version of the source data from source data repository 212 (e.g., at least a portion of data 312d), and/or link raw sample data storage 213 to a mount point on a filesystem of swarm sample computer 302.

Next, at operation 350, an operator or otherwise (e.g., using any suitable data 311d) may configure any suitable source code for the swarm sample tool (e.g., tool 301) (e.g., computer 302), such as for configuring and running a swarm sample tool (e.g., tool 301). There may be any suitable number and type(s) of configuration parameters that may be configured before the source code may be configured to an executable, including, but not limited to, a location parameter, a repetition value parameter, a sample pause value parameter and a sample interval value parameter, an output directory parameter, and/or the like. For example, one or more location parameters may be configured at operation 350 and may include configuration of a geographic location or locations that may be used to sample, if any are to be used besides the physical location of the swarm sample tool running on the swarm sample computer provisioned at operation 340 (e.g., tool 301 on computer 302). The swarm sample tool may be configured to be connected or otherwise communicatively coupled to a virtual private network ("VPN") and sample from that location instead of or in addition to the native network location for the swarm sample computer. The swarm sample tool may be configured to be connected or otherwise communicatively coupled to a series of VPN nodes (e.g., with one sample in each location), or the swarm sample tool can be configured to not use any VPN nodes and rather just sample in the native network location (e.g., as a default configuration). As another example, one or more repetition value parameters (e.g., how many times to sample) may be configured at operation 350 and may include configuration of (e.g., 12 repetitions may be set as a default repetition value parameter or minimum sampling interval (e.g., 12 repetitions per hour or a sample every 5 minute duration, etc.)). As another example, one or more sample pause value parameters and/or one or more sample interval value parameters may be configured at operation 350 and may include configuration of (e.g., pause 1 minute and resample as many times in an hour as possible for 7 days may be set as default sample pause and sample interval value parameters). For example, a sample pause value parameter may be delay (e.g., a parameter (e.g., second parameter) may configure the delay between samples (e.g., if desired to sample every half hour, there may be a 30 minute delay, whereas for continuous sampling, there may be no delay)). For a large BTIHA, it may be efficient to use a delay of 1 minute or 2 minutes or the like so that network delays can time out gracefully. A sample interval value parameter may be the total duration to sample (e.g., this could be one hour or it could be two weeks). In practice, these may combine to a default (e.g., for a certain content provider's shows (e.g., shows on Netflix™), where repetitions may be as many as possible in one hour, pause may be 1 minute, and interval may be one hour, such a configuration may be scheduled (e.g., with chron on Linux) so that it activates every hour, for every day, until the chron job is removed). As another example, one or more output directory parameters may be configured at operation 350 and may include configuration of where (e.g., in system 1) to store the created JSON files or any other suitable files as may be created. (e.g., an output directory may be configured for serialized sample JSON files). Then, once any suitable number and type(s) of configuration parameters have been configured, operation 350 may further include compiling the source code to an executable, such as a swarm sample tool executable (e.g., swarm sample tool 301). The source code may also be compiled to another executable, such as a sanity check torrent tool. The swarm sample tool executable may then be started and configured to repeat via an internal clock and the repetition value of a configured repetition value parameter, or scheduled to run at regular intervals according to the repetition value of a configured repetition value parameter and a scheduler (e.g., an external job scheduler (e.g., a chron daemon on Linux)).

Next, at operation 312, a sampling process of process 311 may be started (e.g., by swarm sample tool 301) and the sampling process may then continue for any suitable duration until operation 370 at which the sampling process may be stopped (e.g., where the sampling process may be terminated (e.g., by an operator) or where the sampling process may terminate itself (e.g., when a swarm sample tool reaches the end of a sampling duration and terminates itself)). During the length of the sampling process between operations 312 and 370, which may be called the sampling duration, two or more sampling subprocesses may be executed independently. For example, a first sampling subprocess that may be executed during the sampling duration may include updating the BTIHA (e.g., the BTIHA may autonomously update itself) at operation 330 (e.g., as described with respect to process 331 of FIG. 5). Additionally, a second sampling subprocess that may be executed during the sampling duration may include sampling specific swarm activity at operation 360 using a current BTIHA obtained from an operation 358 of the second sampling subprocess (e.g., a swarm sample tool associated with a provisioned swarm sample computer of a swarm sample computer system as may be configured (e.g., at operation 350) to sample peer network activity repeatedly (e.g., over a duration of hours, days, weeks, months, or the like) may be executed using a current BTIHA (e.g., most up to date BTIHA (e.g., most recently updated BTIHA (e.g. as updated at the most recent iteration of operation 330 (e.g., as may be obtained at operation 358 (e.g., using any suitable data 312d))))) as input to sample specific swarm activity, with the BTIHA being checked and updated if necessary every hour or otherwise periodically or on an ad-hoc basis as may be defined by an operator (e.g., through the operations 320 and/or 330)).

The first sampling subprocess, as may be executed during the sampling duration, may include updating the BTIHA (e.g., the BTIHA may autonomously update itself) at operation 330 (e.g., as described with respect to process 331 of FIG. 5). After each update of operation 330, it may be determined if the sampling duration is over at operation 370 (e.g., whether or not to stop sampling). If yes, operation 370 may proceed to operation 380, otherwise, such an operation 370 may return to another iteration of operation 330. This first sampling subprocess may be executed independent of the second sampling subprocess described below in more detail.

FIG. 4

FIG. 4 is a flowchart of an illustrative process 321 for initializing or creating a BTIHA, as may be carried out by operation 320 of process 311. Process 321 may start at operation 314 by determining whether a BTIHA of the media object (e.g., the media object of operation 310) is empty/non-existent. If the determination of operation 314 is no (i.e., if it is determined that a BTIHA of the media object exists and is populated), then process 321 may advance to operation 326, at which the already-populated BTIHA may be returned (e.g., for use in any suitable subsequent processes (e.g., process 331 of FIG. 5)). However, if the determination of operation 314 is yes (i.e., if it is determined that a BTIHA of the media object does not exist or is empty), then process 321 may advance to operation 322, either directly, if a BTIHA of the media object exists but is not populated, or via operation 318, if a BTIHA of the media object does not exist, at which an empty BTIHA of the media object may first be created. At operation 322, source data repository 212 may be queried (e.g., by an operator or otherwise) with a media object parameter (e.g., a string literal argument that may identify the media object (e.g., defined at operation 310 (e.g., "stranger-things-02" may identify the second season of the Netflix show Stranger Things))) and the returned result of the query (e.g., data 312d (e.g., as may be provided by source data repository 212)) may be utilized to populate the empty BTIHA. For example, each found torrent file (e.g., each instance of the media object that may be found to exist on any suitable network (e.g., any peer to peer protocol network (e.g., peer-to-peer network 80))) may be referred to herein as a BTIHA element and may be assigned a unique integer value that may be monotonically increasing (i.e., an element_id), with the resulting fully-populated BTIHA including all references to the media object as unique elements, thereby creating a meta-torrent collection. Therefore, for each found BTIHA element, operation 322 may store in the BTIHA any suitable data, including, but not limited to, the BTIHA element's unique numeric identifier (element_id), the BTIHA element's torrent file name, the BTIHA element's Merkle hash (i.e., merkle_id) (e.g., the BTIHA element's torrent BitTorrent Info Hash ("BTIH")), any suitable metadata associated with the BTIHA element (e.g., a Boolean value representing public or private network status, any inferred media properties (e.g., resolution, encoding, size, etc.), or the like), and/or any other suitable data. Then, once the BTIHA has been populated at operation 322, process 321 may advance to operation 326, at which the recently-populated BTIHA may be returned (e.g., for use in any suitable subsequent processes (e.g., process 331 of FIG. 5)).

It is understood that the operations shown in process 321 of FIG. 4 are only illustrative and that existing operations may be modified or omitted, additional operations may be added, and the order of certain operations may be altered.

FIG. 5

FIG. 5 is a flowchart of an illustrative process 331 for updating a BTIHA, as may be carried out by operation 330 of process 311. Process 331 may start at operation 328 by determining whether the BTIHA of the media object (e.g., the media object of operation 310) ought to be updated. The BTIHA may be periodically updated (e.g., automatically or by an operator) at regular intervals throughout the duration of the sampling process. For example, at the beginning of the sampling process, the BTIHA may be updated every five minutes, every hour, or at any other suitable interval, while, towards the end of the sampling process, the BTIHA may be updated every week, or month, or year, or at any other suitable interval. For example, updating the BTIHA may be done ad-hoc. An operator or otherwise may configure an entire sampling run (e.g., over a duration of one week) with a fixed BTIHA that may never be updated. However, in practice, when a media object is defined, the system may then be configured to begin polling tracker sites immediately for torrent files. The first 24-72 hours after a new media object is defined (e.g., premiered or initially made available) may be when most of the torrent files are created and found during the update process, but polling at the one week mark may pick up non-English language translations (e.g. French, or Portuguese from Brazil, Russian, or Mandarin, etc.) of an English media object (e.g., an English Netflix show). After a period of time, there may not be any new torrent files created, so there may be little point in checking for updates. Nevertheless, operation 328 of process 331 may determine whether or not the BTIHA ought to be updated at that moment. If the determination of operation 328 is no (i.e., if it is determined that the BTIHA ought not be updated at that moment), then process 331 may advance to operation 336, at which the already-populated BTIHA may be returned (e.g., for use in any suitable subsequent processes (e.g., operation 360 of process 311 of FIG. 3)). However, if the determination of operation 328 is yes (i.e., if it is determined that the BTIHA ought to be updated), then process 331 may advance to operation 332, at which a search (e.g., manual search (e.g., by an operator)) may be conducted (e.g., on the internet or on any other suitable source (e.g., a swarm/peer to peer network (e.g., peer-to-peer network 80))) for identifying and collecting instances or instantiations of the media object in any suitable manner (e.g., by using search engines, polling a variety of tracker sites with information identifying the media object (e.g., polling a list of internet trackers), subscribing to a messaging service, and/or the like). If it is determined at operation 333 that no new files have been found at operation 332, then process 331 may proceed from operation 333 to operation 335, at which the search may end, and the process 331 may proceed to operation 336. However, if it is determined at operation 333 that at least one new file has been found at operation 332, then process 331 may proceed from operation 333 to operation 334, at which each new file (e.g., each torrent file) found by the search of operation 332 may then be saved in (e.g., checked into) source data repository 212 (e.g., via data 312d) as associated with the particular media object for updating the BTIHA at operation 334. In some embodiments, a torrent sanity check tool may be run (e.g., by an operator) on the proposed new set of torrent files for the media object to detect and discard any damaged torrent files of that set before updating the BTIHA by adding the surviving (e.g., undamaged) torrent files to the BTIHA. Additionally or alternatively, any suitable mechanism(s) may be used to ensure that new files are not added to the BTIHA that already exist therein (e.g., mechanism(s) may be used to ensure that torrent files with the same names are only added once, yet mechanism(s) may enable two torrent files that have different names but that point to the same underlying media file to both exist and be sampled (e.g., two BTIHA elements that each have the same merkel hash or BTIH identifier)). At a later stage (e.g., operation 460 of process 411 of FIG. 7 in a caching operation), a more elaborate de-duplication algorithm may be run, where files that have different names but the same BTIH may be combined, so as to have a synthetic BTIHA where each element has a unique BTIH identifier. Returning to process 331, once the BTIHA has been updated at operation 334 by adding any appropriate new torrent file(s) to the BTIHA (e.g., when an operator goes on to tracker sites and/or RSS feeds and/or wechats and finds individual torrent files, where, if new files are found, the files may be checked in to source data repository 212 for updating the BTIHA), process 331 may advance to operation 335 for ending the search and then onto operation 336, at which the recently-updated BTIHA may be returned (e.g., for use in any suitable subsequent processes (e.g., at a next iteration of operation 358 and operation 360 of process 311 of FIG. 3)).

It is understood that the operations shown in process 331 of FIG. 5 are only illustrative and that existing operations may be modified or omitted, additional operations may be added, and the order of certain operations may be altered.

FIG. 3 (Continued)

The second sampling subprocess, as may be executed during the sampling duration, may include repeatedly over the sampling duration obtaining the most current BTIHA and executing the swarm sample tool for that BTIHA. At operation 360 of this second sampling subprocess, the swarm sample tool may be executed (e.g., repeatedly over the sampling duration), for example, to sample swarm activity. The execution of a swarm sample tool (e.g., tool 301) at operation 360 may be carried out in any suitable manner. For example, at operation 360, the swarm sample tool may be executed as may be required by the current configuration of the configuration parameters (e.g., as may be configured at operation 350). For every execution of the tool, various suboperations may be performed at operation 360, including, but not limited to, the following:

- (360-1) identifying the media object and the most recently updated BTIHA (e.g., as obtained at operation 358 (e.g., via data 312*d* of source data repository 212) as the most recently updated or populated BTIHA for the defined media object (e.g., by the most recent operation 330 of the first sampling subprocess of the sampling duration));
- (360-2) creating, on a filesystem of the swarm sample computer (e.g., computer 302), a new directory (e.g., output directory) that may be named with the current date and timestamp (e.g., according to the swarm sample computer);
- (360-3) for each BTIHA element (e.g., BTIH (e.g., hash id or info hash)) in the identified media object's current BTIHA, carrying out each one of the following:
  - (360-3*a*) carrying out each one of N-times, where N is the repetition value of the repetition parameter of the swarm sample tool, each one of the following:
    - (360-3*a-i*) configuring a session where the peer to peer network swarm for the BTIH is contacted via any suitable network protocol hooks;
    - (360-3*a-ii*) requesting or otherwise searching for all peers and seeds from any BitTorrent protocol trackers and/or from other peers via a distributed sloppy hash table ("DHT") and/or local service discovery ("LSD") and/or peer exchange ("PEX") and/or any other suitable protocol extension(s); and
    - (360-3*a-iii*) pausing the swarm sample tool for any appropriate length associated with a sample pause value and/or a sample interval value of the tool, if any;
  - (360-3*b*) saving (e.g., in the output directory) as a file (e.g., as a serialized JSON file) of swarm sample results any suitable data indicative of the results of the peer and seed requesting of operation 360-3*a-ii* that may contain any suitable information on each found peer and on each found seed with metadata for the media object instance attributes (e.g., name, BTIH (e.g., hash id, info hash, etc.), if using secure sockets layer ("SSL"), if private, if on the invisible internet project ("I2P") network, the location of the server performing the test, the total number of files, the total size, the number and internet protocol ("IP") address or other identifying information of each detected connected peer, the number and IP address or other identifying information of each detected connected seed, date-time stamp, sample number, and/or the like); and
  - (360-3*c*) saving any network errors and protocol messages to a log file (e.g., a TEXT log file);
- (360-4) repeating suboperation (360-3) as may be necessary to match repetition, sample pause, and/or sample interval values of the parameters of the swarm sample tool (e.g., each operation 360-3 may be for a respective single sampling session, which may include pause and repetition parameters, while operation 360-4 may be for the list of each of these sampling durations over the length of the requested interval (e.g., operation 360-3 may be a sample "kernel" while operation 360-4 may be the number of times that sample is repeated to fill out the duration)); and
- (360-5) repeating suboperations 360-1 through 360-4 if the sampling duration has not yet expired (e.g., operation 360 may end when either (a) the operation is manually stopped by an operator (e.g., when removing chron entry or killing the process) or (b) all sampling sessions over the sampling interval have completed). For example, after each execution of operation 360, it may be determined if the sampling duration is over at operation 370 (e.g., whether or not to stop sampling) If yes, operation 370 may proceed to operation 380, otherwise, such an operation 370 may return to another iteration of operation 358. This second sampling subprocess may be executed independent of the first sampling subprocess.

After operation 360, process 311 may advance to operation 370, at which the sampling process may be stopped (e.g., where the sampling process may be terminated (e.g., by an operator) or where the sampling process may terminate itself (e.g., when a swarm sample tool reaches the end of a sampling duration and terminates itself)). At this point, each one of the first and second sampling subprocesses have completed. Next, process 311 may advance to operation 380, at which each saved file of results (e.g., each saved JSON file of swarm sample results (e.g., of each output directory)) created by the swarm sample tool at operation 360 (e.g., at each operation 360-3*b*) may be stored on (e.g., synched with) raw sample data storage 213 (e.g., as data 313*d*) as one or more sample archive files.

For example, each saved file of results (e.g., each saved JSON file of swarm sample results (e.g., of each output directory)) created by the swarm sample tool at operation 360 (e.g., at each operation 360-3*b*) may be created for any suitable minimum sampling interval (e.g., 1 minute, 5 minutes, 10 minutes, 60 minutes, 120 minutes, etc.) of any suitable sampling duration (e.g., 1 day, 1 week, 2 weeks, 6 weeks, 10 weeks, etc.). For example, for a particular media object (e.g., a Netflix show) and swarm sample computer and swarm sample tool, a swarm sample tool may be executed to define a JSON file for each BTIH of the most current BTIHA at each minimum sampling interval of 5 minutes for a sampling duration of 10 weeks (e.g., up to 20,160 JSON files of swarm sample results may be generated for each BTIH of the BTIHA over 10 weeks (e.g., 20,160 JSON files of swarm sample results for a BTIH that may be consistently found in the current BTIHA of each minimum sampling interval of the process)). For example, at every minimum sampling interval (e.g., every 5 minutes) of a sampling duration (e.g., 10 weeks), a current BTIHA may be identified for a defined a media object (e.g., at operation 558) and, for each BTIH of that current BTIHA, a JSON file of swarm sample results may be defined for that minimum sampling interval.

As just one example, the following may be representative of exemplary lines 1-96 of text (e.g., condensed version) of a JSON sample file of swarm sample results for a particular BTIH of a current BTIHA for a particular media object for a particular minimum sampling interval of a sampling duration:

```
01 {
02   "name": "YS 0.2018. S02E10.720p.HEVC.x265-MGu",
03   "private": true,
04   "ssl": false,
05   "i2p": false,
06   "date": "Thu Aug 29 15:04:36 2019\n",
07   "datestamp": "2019-08-29-at-15-04",
08   "ip": "0.0.0.0",
09   "country": " ",
10   "latitude": 0.0,
11   "longitude": 0.0,
12   "region": " ".
13   "city": " ",
14   "size-total": 0.257903007,
15   "files-total": 5,
16   "files": [
17   {
18   "number": 1,
19   "size": 0.003017706,
20   "path": "YS.2018.S02E10.720p.HEVC.x265-MGu/Screens/screen01.png"
21   },
22   {
23   "number": 2,
24   "size": 0.002398633,
25   "path": "YS.2018.S02E10.720p.HEVC.x265-MGu/Screens/screen02.png"
26   },
27   {
28   "number": 3,
29   "size": 0.001679177,
30   "path": "YS.2018.S02E10.720p.HEVC.x265-MGu/Screens/screen03.png"
31   },
32   {
33   "number": 4,
34   "size": 0.250806358,
35   "path": "YS.2018.S02E10.720p.HEVC.x265-MGu/YS.mkv"
36   },
37   {
38   "number": 5,
39   "size": 0.000001133,
40   "path": "YS.2018.S02E10.720p.HEVC.x265-MGu/YS.nfo"
41   }
42   ],
43   "completed": 130,
44   "incomplete": 6,
45   "seeds": 0,
46   "trackers": 3,
47   "connected peers total": 94,
48   "connected seeds total": 12,
49   "connected peer": [
50   {
51   "number": 1,
52   "ip": "46.182.109.141",
53   "country": " ",
54   "latitude": 0.0,
55   "longitude": 0.0,
56   "region": " ",
57   "city": " "
58   },
59
60   . . . through to
61
62   {
63   "number": 94,
64   "ip": "71.186.220.92",
65   "country": " ",
66   "latitude": 0.0
67   "longitude": 0.0,
68   "region": " ",
69   "city": " "
70   },
71
72   and then same for seeds
73
74   "connected seed": [
75   {
76   "number": 1,
77   "ip": "46.182.109.141",
78   "country": " ",
79   "latitude": 0.0,
80   "longitude": 0.0,
81   "region": " ",
82   "city": " "
83   },
84
85   through to
86
87   "connected seed": [
88   {
89   "number": 12,
90   "ip": "47.182.109.1",
91   "country": " ",
92   "latitude": 0.0,
93   "longitude": 0.0,
94   "region": " ",
95   "city": " "
96   }.
```

As shown, such a JSON sample file of swarm sample results for a particular BTIH of a current BTIHA for a particular media object for a particular minimum sampling interval of a sampling duration may include any suitable data indicative of the results of the peer and seed requesting of operation 360-3*a-ii*, including, but not limited to, one, some, or each of the following:

(1) name (see, e.g., line 2);
(2) indication of whether or not the tracker is private for the particular torrent (e.g., whether this torrent is private (e.g., it should not be distributed on the trackerless network (e.g., the kademlia DHT))) (see, e.g., line 3);
(3) indication of whether or not the torrent traffic was encrypted with secure sockets layer ("SSL") (e.g., users trying to download SSL torrents need to provide a valid cert. and if they don't have a cert they won't be allowed to connect to any peers) (see, e.g., line 4);
(4) indication of whether or not the torrent was on the I2P network (see, e.g., line 5);
(5) start time of the sample (see, e.g., line 6);
(6) datestamp of the sample (e.g., date may be 2019-10-08, time may be (e.g., in 24 hour time) 22 h 34 m, and then the datestamp may be date+time, like 2019-10-08-at-22-34) (see, e.g., line 7);
(7) total size of the BTIH (see, e.g., line 14);
(8) number of files (e.g., screen shots, payload media file, text file.nso, etc.) of the BTIH (see, e.g., line 15);
(9) number, size, and path/name of each file of the BTIH (see, e.g., lines 17-21, lines 22-26, lines 27-31, lines 32-36, and lines 37-41, respectively, for each of the files);
(10) number of completed, incomplete, seeds, and trackers (e.g., in pre-DHT/LSD torrent swarms, there was a count of each tracker's reported number of completed, incompleted, and downloads, which is now rendered useless in trackerless p2p scenarios (e.g., contemporary circa 2019 bittorrent), such that these values may be inaccurate and not relied on) (see, e.g., line 43, line 44, line 45, and line 46, respectively);
(11) number of connected peers total of the BTIH (e.g., as detected to be receiving data of the BTIH within the duration of the particular minimum sampling interval) (see, e.g., line 47);
(12) number of connected seeds total of the BTIH (e.g., as detected to be uploading data of the BTIH within the duration of the particular minimum sampling interval) (see, e.g., line 48);
(13) peer number, IP address, country, latitude, longitude, region, city, and/or the like for each connected peer (see, e.g., lines 50-58 and lines 62-70, respectively, for each of the first and last connected peers (it is to be noted that all of the connected peers and not just the first and last connected peers may be included but are not all shown here for brevity purposes) (it is to be noted that the peer number may be a generic/meaningless counting number) (it is to be understood that various geomapping data (e.g., country, latitude, longitude, region, city, and/or the like) for one, some, or each connected peer may not be obtained at operation 360 (e.g., by certain distributed systems) but rather may be obtained later (e.g., in process 411 or process 511) using the IP address of the connected peer that may be obtained at operation 360)); and/or
(14) seed number, IP address, country, latitude, longitude, region, city, and/or the like for each connected seed (see, e.g., lines 75-83 and lines 88-96, respectively, for each of the first and last connected seeds (it is to be noted that all of the connected seeds and not just the first and last connected seeds may be included but are not all shown here for brevity purposes) (it is to be noted that the seed number may be a generic/meaningless counting number) (it is to be understood that various geomapping data (e.g., country, latitude, longitude, region, city, and/or the like) for one, some, or each connected seed may not be obtained at operation 360 (e.g., by certain distributed systems) but rather may be obtained later (e.g., in process 411 or process 511) using the IP address of the connected seed that may be obtained at operation 360)).

The "hash ID" or "info hash" may or may not be listed in the sample JSON file. In some embodiments, as shown in the above listing for the sample JSON file, the SPSP may not list the BTIH in sample files, and may just use the filename. In cache or summary files, there may be a torrent filename and a torrent index. It may be faster to induce the info-hash value from the peer swarm than it is to parse it out of JSON files. So, if the SPSP knows the Torrent File name it may load the torrent (e.g., via libtorrent) and then may get any of the metadata (e.g., info-hash, filenames on disk, etc.) in-memory instead of on-disk via JSON file parsing. In-memory may be much faster. The BTIH may be very long and complex. So, if the SPSP may not have more than 999 of them, the SPSP may shorten each element of the BTIHA into Torrent-index: T010, which is torrent #10, and BTIH #10. It may be shorter and faster to use the compressed index then the full BTIH. It may also be much easier to read.

In some embodiments, each JSON sample file of swarm sample results for each BTIH for each minimum sampling interval of a sampling duration may be transferred as distinct files to raw sample data storage 213. Alternatively or additionally, results may be compressed into a sample archive file or files to save space before being transferred to raw sample data storage 213 (e.g., compressing each one of the 12 JSON files for an hour (e.g., when minimum sampling interval is 5 minutes) into a single sample archive file). In either event, all suitable data of each JSON file for each BTIH of a current BTIHA at each minimum sampling interval of the sampling duration may be transferred to raw sample data storage. When every sample archive is transferred (e.g., independently or as one or more combined/compressed files), swarm sample tool 301 may be finished and process 311 may end. Therefore, as just one example, each JSON file associated with a particular BTIH of a current BTIHA for a particular minimum sampling interval of a sampling duration may include any suitable metadata associated with the BTIH, an IP address and/or geographic data of each connected peer detected during the particular minimum sampling interval for that BTIH, and an IP address and/or geographic data of each connected seed detected during the particular minimum sampling interval for that BTIH.

It is understood that the operations shown in process 311 of FIG. 3 are only illustrative and that existing operations may be modified or omitted, additional operations may be added, and the order of certain operations may be altered.

Therefore, as just one particular example, process 311 may generate and store, for each BTIH element of a media object's BTIHA, a JSON sample file of swarm sample results for each minimum sampling interval of a sampling duration, such that, for example, if the media object's BTIHA includes 100 BTIH elements throughout an entire 4 week sampling duration that includes a minimum sampling interval of 12 samples per hour (e.g., a sample every 5 minutes), the number of JSON sample files that may be generated by process 311 may be 806,400 (i.e., 100*4*7*24*12), where each JSON sample file may include a time stamp associated with the particular sample, various metadata about the particular BTIH element, IP address or other identification information about each detected peer for the particular sample for the particular BTIH element, and IP address or other identification information about each detected seed for the particular sample for the particular BTIH element.

FIG. 6

FIG. 6 is a schematic view of another illustrative portion of swarm system 100, which may include data system 200 and coalesce cache computer system 400. As shown, coalesce cache computer system 400 may include any suitable coalesce cache sample tool 401 that may run on any suitable coalesce cache computer 402 (e.g., a cloud computer), which may be any suitable component or server, such as a cloud storage host (e.g., a dedicated Linux host from any suitable cloud computing provider). Coalesce cache computer system 400 may be configured to be fully autonomous of analyze visualize computer system 500. However, coalesce cache computer system 400 may be configured to depend from swarm sample computer system 300 (e.g., to depend on result files (e.g., JSON sample files of swarm sample results (e.g., of operation 380)) from swarm sample computer system 300). For example, coalesce cache computer system 400 may be configured to be dependent on any suitable data 411d that may be communicated with source code repository 211 and/or any suitable data 412d that may be communicated with source data repository 212 and/or any suitable data 413d that may be communicated with raw sample data storage 213 and/or may be configured to provide any suitable data 420d to cached form data storage 220. Coalesce cache computer system 400 may be configured to run coalesce cache sample tool 401 with sample data found in source data repository 212 (e.g., at least a portion of data 412d) and with input from raw sample data storage 213 (e.g., at least a portion of data 413d), and to store the resulting optimized file(s) in cached form data storage 220 (e.g., as at least a portion of data 420d). Coalesce cache computer system 400 may be configured to depend on swarm sample tool 301 of swarm sample computer system 300 to generate swarm sample results (e.g., as at least a portion of data 313d (e.g., as described with respect to operations 360 and 380 of process 311)) that may be provided as at least a portion of data 413d for input to coalesce cache computer system 400, but coalesce cache computer system 400 may be configured to run coalesce cache sample tool 401 asynchronously or in parallel with respect to swarm sample tool 301. During operation, coalesce cache sample tool 401 may be configured to cache samples incrementally as samples may be created and archived, and/or coalesce cache sample tool 401 may be configured to cache an entire set of samples all at once. Therefore, coalesce cache computer system 400 may be configured to have dependencies on source code data 411d from source code repository 211 and/or on source data 412d from source data repository 212 and/or on raw sample data storage data 413d from raw sample data storage 213 and/or data 420d to cached form data storage 220. In some embodiments, an operator or otherwise may configure coalesce cache computer 402 with any suitable (e.g., prerequisite) software that may be used to execute coalesce cache sample tool 401. For example, the operator may check out an up-to-date version of any source code implementing any or all of the tools from source code repository 211 (e.g., at least a portion of data 411d), and/or check out the current version of the source data from source data repository 212 (e.g., at least a portion of data 412d), and/or link raw sample data storage 213 and cached form data storage 220 to appropriate mount points on a filesystem of coalesce cache computer 402 (e.g., respective input and output mount points). Then, coalesce cache computer system 400 may be ready for operation.

FIG. 7

FIG. 7 is a flowchart of an illustrative process 411 for coalesce caching for a particular media object. For example, process 411 may be carried out by coalesce cache sample tool 401 of coalesce cache computer system 400 of swarm system 100, for example, to organize swarm sample results for a particular media object, prune extraneous information, quantize results for a synthesized swarm of activity and determine node freshness based on the results of each sample, hour, day, week, and cumulative time period on the sampling duration, serialize a cached version of such swarm metadata, and/or transfer such to a data archive. Process 411 may start at operation 410 by defining a media object (e.g., an operator of the system may define a media object in any suitable manner). As mentioned, a defined media object may include any suitable characteristics. In some embodiments, the media object defined at operation 410 of process 411 may be the same as the media object defined at operation 310 of process 311 (e.g., using any suitable data 412d that may be communicated by coalesce cache computer system 400 with source data repository 212).

Next, at operation 416, an operator or otherwise may configure any suitable source code (e.g., using any suitable data 411d that may be communicated by coalesce cache computer system 400 with source code repository 211) for the coalesce cache sample tool (e.g., tool 401). There may be any suitable number and type(s) of configuration parameters that may be configured before the source code may be configured to an executable, including, but not limited to, a media object parameter (e.g., a string literal argument that may identify the media object (e.g., defined at operation 310 (e.g., "stranger-things-02" may identify the second season of the Netflix show Stranger Things))), a duration_types parameter (e.g., to cache, as an array of one or more suitable durations, including, but not limited to, one, some, or each of the following enumerated durations: sample, hour, day, week, and cumulative), a persistent_swarm parameter (e.g., a Boolean flag may be used to compute persistent_swarm values), a parameter related to the output directory for the serialized cache JSON files, and/or the like. Then, once any suitable number and type(s) of configuration parameters have been configured, operation 416 may further include compiling the source code to an executable, such as a coalesce cache tool executable (e.g., coalesce cache sample tool 401). The duration_types parameter may be configured to activate any suitable durations for caching (e.g., sample (e.g., every 5 minutes), hour, day, week, cumulative, etc.), such that, for example, if the system is to cache a duration of days, then the system ought to cache the just smaller duration of hours, or, for example, if the system is to cache a duration of weeks, then the system ought to cache the just smaller duration of days, or, for example, if the system is to cache a duration of hours, then the system ought to cache the just smaller duration of by-sample, and/or the like. As just one example, if initial sampling was for two weeks (e.g., the duration between operations 312 and 370), each one of hours, days, weeks, and cumulative may be cached (e.g., at process 411), but then an additional two weeks of sampling occurs (e.g., the duration between another iteration of operations 312 to 370), just the additional hours of that additional sampling may be cached (e.g., at another iteration of process 411) and then added to the previously cached hours and then the days, weeks, and cumulative may be recomputed for the updated cached hours (e.g., an incremental caching scenario). The persistent_swarm parameter may be configured to be true (e.g., persistent caching mode is on (e.g., fresh cache files (e.g., for nodes that are new for a particular duration) are generated in addition to normal cache files)) or false (e.g., persistent caching mode is off (e.g., fresh cache files are not generated in addition to normal cache files)). Freshness may be a second derivative or indication of velocity of engagement for a particular BTIH element with respect to a particular normalization duration.

Next, at operation 420, an operator or otherwise may prepare the raw samples for caching. For example, at operation 420, any stored swarm sample results of operation 380 for the defined media object (e.g., any sample data archives associated with the media object (e.g., data 313d of process 311)) may be transferred from raw sample data storage 213 (e.g., as data 413d) to coalesce cache computer system 400 (e.g., to coalesce cache sample tool 401). For example, the JSON files may be uncompressed, the total number of samples may be defined as the "raw_sample_set" and the duration of time sampled may be defined as the "sample_range" (e.g., the time from the very first sample to the very last sample). For example, a raw_sample_set may be the total collection of sample JSON files. If, for example, the second season of the show Stranger Things was sampled for one day (e.g., 2018-09-04) and the BTIHA for that media object included 311 elements (e.g., 311 BTIHs throughout that entire day of sampling), then the sampling tool may be configured to sample each one of the 311 elements, 12 times an hour (e.g., every 5 minutes) for the entire day, such that there may be 89,568 samples performed that day, such that there may be 89,568 JSON files in the raw_sample_set. As each JSON file may have a significant size, compression of such a set may be useful.

Next, at operation 422, a caching process of process 411 may be started (e.g., by coalesce cache sample tool 401) and the caching process may then continue for any suitable duration until operation 450 at which the caching process may be stopped (e.g., where the caching process may be terminated (e.g., by an operator) or where the caching process may terminate itself (e.g., when a coalesce cache sample tool reaches the end of a caching duration and terminates itself)). During the length of the caching process between operations 422 and 450, which may be called the cache duration or the caching duration, two or more caching subprocesses may be executed (e.g., sequentially), where each caching subprocess may be for a particular duration_type. Each caching subprocess for a particular duration_type may include a particular quantizing operation 430 (e.g., a respective one of quantizing operations 430a-430e) and a particular caching operation 440 (e.g., a respective one of caching operations 440a-440e). For example, for each duration_type, a respective quantizing (e.g., coalescing) operation 430 may include quantizing the sample_range for the duration_type into sample_duration elements. For example, consider when a raw_sample_set includes 168 hours, or 7 days, or 1 week worth of samples. Each hour in the sample_range may be represented by a respective numbered hour sample_duration element (e.g., hour-001, hour-002, and so on up to hour-168). The other duration_type values may be handled similarly (e.g., each day in the sample_range may be represented by a respective numbered day sample_duration element (e.g., day-001, day-002, and so on up to day-7), and so on). Then, for each duration_type, after its respective quantizing operation 430, process 411 may advance to a respective caching operation 440. For example, for each quantized sample_duration element of a particular duration_type, a respective caching operation 440 for that particular duration_type may include carrying out any suitable suboperations, including, but not limited to, the following:

(440-1) for each BTIH element in the media object's BTIHA, carrying out each one of the following:

(440-1a) querying the prepared raw samples for JSON files that match the BTIH and the particular quantized sample_duration element;

(440-1b) deserializing matching JSON files and constructing an in-memory representation of the sample data;

(440-1c) computing the number of unique peers and the number of unique seeds found during the particular quantized sample_duration element (e.g., if a peer node with an IP address of 177.22.222.1 was found as a peer in four different samples over the particular quantized sample_duration element (e.g., in four samples over a particular hour sample_duration element or in four hours over a particular day sample_duration element or in four days over a particular week sample_duration element), this peer node would be represented by one unique_peer with an IP address of 177.22.222.1 for that entire particular quantized sample_duration element);

(440-1d) computing the number and identity of unique peers in this particular quantized sample_duration element as compared to the quantized sample_duration element that immediately preceded the particular quantized sample_duration element (e.g., if for a particular hour-002 quantized sample_duration element, three unique_peers with IP addresses of 177.22.222.5, 177.22.222.6, and 177.22.222.7 are determined (e.g., at operation 440-1c for that hour-002), and if for an immediately preceding hour-001 quantized sample_duration element, three unique_peers with IP addresses of 177.22.222.3, 177.22.222.4, and 177.22.222.5 are determined (e.g., at operation 440-1c for that immediately preceding hour-001), then the fresh_peer(s) for particular hour-002 would be the peers with IP addresses 177.22.222.6 and 177.22.222.7 (e.g., not the peer with IP address 177.22.222.5 as common to hour-001 and hour-002)) and computing the number and identity of unique seeds that are new (e.g., fresh) in this particular quantized sample_duration element as compared to the quantized sample_duration element that immediately preceded the particular quantized sample_duration element (e.g., if for a particular hour-002 quantized sample_duration element, two unique_seeds with IP addresses of 177.22.221.5 and 177.22.221.6 are determined (e.g., at operation 440-1c for that hour-002), and if for an immediately preceding hour-001 quantized sample_duration element, three unique_seeds with IP addresses of 177.22.221.4, 177.22.221.5, and 177.22.221.6 are determined (e.g., at operation 440-1c for that immediately preceding hour-001), then there would be no fresh_seeds for particular hour-002 (e.g., each unique_seed of hour-002 was also a unique_seed of hour-001));

(440-1e) comparing the number of unique peers and the number of unique seeds to previous numbers from other quantized sample_duration elements and finding maxima and minima (e.g., maxima and minima may help to schedule and estimate the hardware resources needed for continued sampling, such that if it's doing 2-3 million upeers a day, then sampling may require a 4-core machine dedicated to it. IF it's a big torrent, like for the season finale of the most popular television show on Earth, then it may do 6-10 million a day and may needs an 8-core box, where such maxima and minima may let an operator know at a glance what to expect from this media object over the sample duration, early in the sample process); and (440-1*f*) save the in-memory cached representation as one or more files (e.g., a serialized JSON file) that may contain any suitable information (e.g., IP address) for each unique peer (unique_peer) and each unique seed (unique_seed) and each fresh peer (fresh_peer) and each fresh seed (fresh_seed) for the particular quantized sample_duration element along with any suitable metadata for the media object instance attributes (e.g., name, BTIH, if using SSL, if private, if on the I2P network, the location of the server performing the test, the total number of files, the total size, the number and IP address of all connected peers, the number and IP address of all connected seeds, date-time stamp, sample number, and/or the like) of the particular BTIH element; and (440-2) saving a summary of the cached results as a file (e.g., a serialized JSON file) that may contain any suitable attributes in metadata, including, but not limited to, the media object, the duration_type, the quanta of the duration_type element, the date and time stamp of the quanta on the sample_range, the size of the BTIHA used for sampling, the number of total peers and seeds sampled, the number of unique peers and seeds sampled, the number of unique peers that are new (e.g., fresh) since the previous quanta, the number of seeds sampled that are new (e.g., fresh) since the previous quanta, the number of samples in the duration quanta, the interchange version of the summary data file (e.g., a file that may be useful for maintenance of the data files, such as when a new capability is added, this may be used to migrate data between versions, such that if it is known that an old version doesn't have the BTIH in it, it can be added to the new version or induced via the swarm, as BTIH could be in the files but may be too slow and lead to too much input/output contention, so may be removed as an optimization), and/or the like.

After the last caching operation (e.g., caching operation 440*e* for the cumulative duration_type), process 411 may advance to operation 450, at which the caching process may be stopped (e.g., where the caching process may be terminated (e.g., by an operator) or where the caching process may terminate itself (e.g., when a coalesce cache sample tool reaches the end of a caching duration and terminates itself)). At this point, each duration_type has been quantized and cached by a respective caching subprocess. Next, process 411 may advance to operation 460, at which the previous caches (e.g., of operations 440) may be used to synthesize a unique BTIHA ("UBTIHA") for the media object, coalesce duplicates, and generate coalesced cache files for the UBTIHA via any suitable suboperations, including, but not limited to, the following:

(460-1) for each element in the media object's BTIHA, determining if any other element in the media object's BTIHA has the same merkle_id; and (460-1*a*) if not, putting the element into the media object's UBTIHA; or (460-1*b*) if so, saving the merkle_id and storing the element in a duplicated BTIHA ("DBTIHA") for the media object; and (460-2) for each element in the media object's DBTIHA, carrying out each one of the following:

(460-2*a*) determining the set of all elements in the DBTIHA that have the same merkle_id;

(460-2*b*) synthesizing a new composite element with a new unique id and the shared merkle_id; and (460-2*c*) for each duration_type, carrying out each one of the following:

(460-2*c-i*) coalescing all original element results into the composite element such that it may contain all the unique peers and the unique seeds for all the elements in the shared set;

(460-2*c-ii*) adding the resulting composite or synthetic element to the UBTIHA; and (460-2*c-iii*) saving (e.g., in the output directory) the in-memory cached representation of the UBTIHA as a file (e.g., a serialized JSON file) that may contain any suitable information on each unique peer an each unique seed with metadata for the media object instance attributes (e.g., name, BTIH, if using SSL, if private, if on the I2P network, the location of the server performing the test, the total number of files, the total size, the number and IP address of all connected peers, the number and IP address of all connected seeds, date-time stamp, sample number, and/or the like).

When each duration_type has been processed at operation 460, such unique UBTIHA caching may end.

Next, process 411 may advance to operation 470, at which each saved file of results (e.g., each saved JSON file of coalesce caching results (e.g., of each output directory)) created by the coalesce cache sample tool (e.g., at each one of operations 440*a*-440*e* and/or operation 460) may be stored on (e.g., synched with) cached form data storage 220 (e.g., as data 420*d* (e.g., as normal cache files and fresh cache files)). In some embodiments, all such results may be compressed into a single cache archive file before being transferred to cached form data storage 220. When every cache archive is transferred, coalesce cache sample tool 401 may be finished and process 411 may end.

It is understood that the operations shown in process 411 of FIG. 7 are only illustrative and that existing operations may be modified or omitted, additional operations may be added, and the order of certain operations may be altered. For example, operation 460 may be carried out before operation 422, such that operations 430/440 may be carried out for each BTIH element in the media object's UBTIHA rather than for each BTIH element in the media object's BTIHA.

Therefore, as just one particular example, process 411 may generate and store, for each BTIH element of a media object's UBTIHA, both a "normal cache file" and a "fresh cache file" for each quantized sample_duration element of each particular duration_type, such that, for example, if the media object's UBTIHA includes 100 BTIH elements throughout an entire 4 week sampling duration that includes a minimum sampling interval of 12 samples per hour (e.g., a sample every 5 minutes), the number of normal cache files that may be generated by process 411 may be 806,400 (i.e., 100*4*7*24*12) normal sample cache files (e.g., which may be similar to each one of the 806,400 JSON sample files but with any redundant detected peer nodes removed and any redundant detected seed nodes removed) and 67,200 (i.e., 100*4*7*24) normal hour cache files and 2,800 (i.e., 100*4*7) normal day cache files and 400 (i.e., 100*4) normal week cache files and 100 normal cumulative cache files (i.e., 876,900 total normal cache files), where each normal cache file may include a time stamp or label associated with the particular sample_duration element (e.g., sample-754,399, hour-113, day-19, week-03, cumulative, etc.), various metadata about the particular BTIH element, IP address or other identification information about each unique detected peer for the particular quantized sample_duration element for the particular BTIH element, and IP address or other identification information about each unique detected seed for the quantized particular sample_duration element for the particular BTIH element, while the number of fresh cache files that may be generated by process 411 may be 806,399 (i.e., (100*4*7*24*12)−1) fresh sample cache files and 67,199 (i.e., (100*4*7*24)−1) fresh hour cache files and 2,799 (i.e., (100*4*7)−1) fresh day cache files and 399 (i.e., (100*4)−1) fresh week cache files (i.e., 876,796 total fresh cache files (i.e., an initial sample_duration element of each duration_type may not have a fresh cache file generated as it would not have an immediately preceding sample_duration element)), where each fresh cache file may include a time stamp or label associated with the particular sample_duration element of a particular duration_type (e.g., sample-754,399, hour-113, day-19, week-03, etc.), various metadata about the particular BTIH element, IP address or other identification information about each unique detected peer for the particular quantized sample_duration element for the particular BTIH element that is fresh (e.g., not detected in the immediately preceding quantized sample_duration element for a particular duration_type (e.g., sample-754,398, hour-112, day-18, week-02, etc.)), and IP address or other identification information about each unique detected seed for the particular quantized sample_duration element for the particular BTIH element that is fresh (e.g., not detected in the immediately preceding quantized sample_duration element for a particular duration_type (e.g., sample-754,398, hour-112, day-18, week-02, etc.)). In some embodiments, process 411 may instead break up each type of normal cache file into a peer normal cache file for each particular sample_duration element for each particular BTIH element and a seed normal cache file for each particular sample_duration element for each particular BTIH element, and/or may break up each type of fresh cache file into a peer fresh cache file for each particular sample_duration element for each particular BTIH element and a seed fresh cache file for each particular sample_duration element for each particular BTIH element. Alternatively, in some embodiments, process 411 may instead combine each type of normal cache file and each fresh cache file into a single cache file for each particular sample_duration element for each particular BTIH element.

As just one example, the following may be representative of text of the data format of a cache file (e.g., JSON cache file) for a particular media object (e.g., Black Monday, Season 1, Episode 10, for day 30 (Apr. 30, 2019)):

```
{
    "collection-name": "Black Monday",
    "collection-id": "110",
    "torrent-index": 10,
    "torrent-name": "Black-Monday-S01E10-0-720p-
        AMZN-WEBRip-DDP5-1-x264-monkee[rarbg]",
    "summary-type": "day",
    "summary-index": 30,
    "sample-type": "hour",
    "sample-size": 24,
    "datestamp": "2019-04-30",
    "upeers-total": 2735,
    "useeds-total": 34,
    "sub-sample-peers-total": 6868,
    "sub-sample-seeds-total": 386,
    "sub-sample-size": 336,
    "peers": [
        {
            "number": 1,
            "ip": "37.3.93.195",
            "country": "SWE",
            "latitude": 59.32469940185547,
            "longitude": 18.055999755859376,
            "region": " "
            "city": " "
        },
        {
            "number": 2,
            "ip": "116.54.173.103",
            "country": "CHN",
            "latitude": 25.03890037536621,
            "longitude": 102.71829986572266,
            "region": "29",
            "city": "Kunming"
        },
        {
            "number": 3
            "ip": "129.5.186.53",
            "country": "USA",
            "latitude": 41.78799819946289,
            "longitude": -72.66729736328125,
            "region": "CT",
            "city": "Hartford"
        },
        {
            "number": 4,
            "ip": "249.65.50.113",
            "country": " ",
            "latitude": 0.0,
            "longitude": 0.0,
            "region": " ",
            "city": " "
        },
        {
            "number": 5,
            "ip": "170.20.226.197",
            "country": "USA",
            "latitude": 40.37099838256836,
            "longitude": -80.00789642333985,
            "region": "PA",
            "city": "Pittsburgh"
        },
        {
            "number": 6,
            "ip": "183.51.239.243",
            "country": "CHN",
            "latitude": 23.11669921875,
            "longitude": 113.25,
            "region": "30",
            "city": "Guangzhou"
        },
        {
            "number": 7,
            "ip": "22.18.78.193",
            "country": "USA",
            "latitude": 37.7509994506836,
```

```
    "longitude": -97.8219985961914,
    "region": " ",
    "city": " "
},
{
    "number": 8,
    "ip": "32.99.89.35",
    "country": "USA",
    "latitude": 37.7509994506836,
    "longitude": -97.8219985961914,
    "region": " ",
    "city": " "
},
{
    "number": 9.
    "ip": "88.83.145.147",
    "country": "SWE",
    "latitude": 59.32469940185547,
    "longitude": 18.055999755859376,
    "region": " ",
    "city": " "
},
{
    "number": 10,
    "ip": "49.38.105.213",
    "country": "IND",
    "latitude": 22.299999237060548,
    "longitude": 73.19999694824219,
    "region": "09",
    "city": "Vadodara"
},
{
    "number": 11,
    "ip": "105.81.162.1",
    "country": "EGY",
    "latitude": 30.035499572753908,
    "longitude": 31.222999572753908,
    "region": " ",
    "city": " "
},
{
    "number": 12,
    "ip": "50.50.106.225",
    "country": "USA",
    "latitude": 43.19459915161133,
    "longitude": -89.20249938964844,
    "region": "WI",
    "city": "Sun Prairie"
},
{
    "number": 13,
    "ip": "196.2.252.195",
    "country": "ZAF",
    "latitude": -29.0,
    "longitude": 24.0,
    "region": " ",
},
{
    "number": 14
    "ip": "238.33.39.81",
    "country": " ",
    "latitude": 0.0,
    "longitude": 0.0,
    "region": " ",
    "city": " "
},
{
    "number": 15,
    "ip": "239.37.40.101",
    "country": " ",
    "latitude": 0.0,
    "longitude": 0.0,
    "region": " ",
    "city": " "
},
{
    "number": 16,
    "ip": "185.49.242.97",
    "country": "RUS",
    "latitude": 47.28189849853516,
    "longitude": 39.61750030517578,
    "region": "61",
    "city": "Rostov-on-don"
},
{
    "number": 17,
    "ip": "185.118.242.167",
    "country": "BGR",
    "latitude": 42.70000076293945,
    "longitude": 23.33329963684082,
    "region": " ",
    "city": " "
},
{
    "number": 18,
    "ip": "101.67.157.243",
    "country": "CHIN",
    "latitude": 30.29360008239746,
    "longitude": 120.1613998413086,
    "region": "02",
    "city": "Hangzhou"
},
{
    "number": 19,
    "ip": "171.86.228.135",
    "country": "CHN",
    "latitude": 39.928901672363280,
    "longitude": 116.38829803466796,
    "region": "22",
    "city": "Beijing"
},
. . . (redacted)
{
    "number": 2735,
    "ip": "140.4.196.181",
    "country": "USA",
    "latitude": 37.7509994506836,
    "longitude": -97.8219985961914,
    "region": " ",
    "city": " "
},
],
"seeds": [
{
    "number": 1,
    "ip": "184.173.3.39",
    "country": "USA",
    "latitude": 29.77020072937012,
    "longitude": -95.36280059814452,
    "region": "TX",
    "city": "Houston"
},
```

```
{
  "number": 2.
  "ip": "184.23.190.208",
  "country": "USA",
  "latitude": 38.45819854736328,
  "longitude": -122.59369659423828,
  "region": "CA",
  "city": "Santa Rosa"
},
{
  "number": 3,
  "ip": "184.23.191.131",
  "country": "USA",
  "latitude": 38.10319900512695,
  "longitude": -122.62989807128906,
  "region": "CA",
  "city": "Novato"
},
{
  "number": 4,
  "ip": "184.173.25.89",
  "country": "USA",
  "latitude": 29.77020072937012,
  "longitude": -95.36280059814452,
  "region": "TX",
  "city": "Houston"
},
{
  "number": 5,
  "ip": "38.1.2.68",
  "country": "USA",
  "latitude": 37.7509994506836,
  "longitude": -97.8219985961914,
  "region": " ",
  "city": " "
},
{
  "number": 6,
  "ip": "35.163.167.32",
  "country": "USA",
  "latitude": 45.86959838867188,
  "longitude": -119.68800354003906,
  "region": "OR",
  "city": "Boardman"
},
{
  "number": 7,
  "ip": "160.225.12.5",
  "country": "AGO",
  "latitude": -12.5,
  "longitude": 18.5,
  "region": " ",
  "city": " "
},
{
  "number": 8,
  "ip": "175.214.39.175",
  "country": "KOR",
  "latitude": 37.5984992980957,
  "longitude": 126.97830200195313,
  "region": "11",
  "city": "Seoul"
},
{
  "number": 9,
  "ip": "90.115.12.91",
  "country": "FRA",
  "latitude": 48.85820007324219,
  "longitude": 2.33870005607605,
  "region": " "
  "city": " "
},
{
  "number": 10,
  "ip": "34.212.227.81",
  "country": "USA",
  "latitude": 45.86959838867188,
  "longitude": -119.68800354003906,
  "region": "OR",
  "city": "Boardman"
},
{
  "number": 11,
  "ip": "34.221.185.168",
  "country": "USA",
  "latitude": 45.86959838867188,
  "longitude": -119.68800354003906,
  "region": "OR",
  "city": "Boardman"
},
{
  "number": 12,
  "ip": "50.23.50.111",
  "country": "USA",
  "latitude": 29.77020072937012,
  "longitude": -95.36280059814452,
  "region": "TX",
  "city": "Houston"
},
{
  "number": 13,
  "ip": "173.193.113.253",
  "country": "USA",
  "latitude": 29.77020072937012,
  "longitude": -95.36280059814452,
  "region": "TX",
  "city": "Houston"
},
{
  "number": 14,
  "ip": "127.0.0.1",
  "country": " ",
  "latitude": 0.0,
  "longitude": 0.0,
  "region": " ",
  "city": " "
},
{
  "number": 15,
  "ip": "18.197.195.199",
  "country": "DEU",
  "latitude": 50.11669921875,
  "longitude": 8.683300018310547,
  "region": "05",
  "city": "Frankfurt"
},
{
  "number": 16,
  "ip": "77.19.134.83",
  "country": "NOR",
  "latitude": 59.95000076293945,
  "longitude": 10.75,
```

```
          "region": " ",
          "city": " "
    },
    {
          "number": 17,
          "ip": "178.162.215.200",
          "country": "DEU",
          "latitude": 51.29930114746094,
          "longitude": 9.491000175476076,
          "region": " ",
          "city": " "
    },
    {
          "number": 18,
          "ip": "35.165.193.23",
          "country": "USA",
          "latitude": 45.86959838867188,
          "longitude": -119.68800354003906,
          "region": "OR",
          "city": "Boardman"
    },
    {
          "number": 19,
          "ip": "137.59.252.222",
          "country": "AUS",
          "latitude": -33.86119842529297,
          "longitude": 151.1981964111328,
          "region": "02",
          "city": "Sydney"
    },
    {
          "number": 20,
          "ip": "18.202.55.41",
          "country": "USA",
          "latitude": 37.7509994506836,
          "longitude": -97.8219985961914,
          "region": " ",
          "city": " "
    },
    {
          "number": 21
          "ip": "112.69.70.4",
          "country": "JPN",
          "latitude": 34.766700744628909,
          "longitude": 135.4167022705078,
          "region": "13",
          "city": "Itami"
    },
    {
          "number": 22,
          "ip": "63.35.212.210",
          "country": "USA",
          "latitude": 47.54199981689453,
          "longitude": -122.3123016357422,
          "region": "WA",
          "city": "Seattle"
    },
    {
          "number": 23,
          "ip": "178.87.144.176",
          "country": "SAU",
          "latitude": 26.485200881958009,
          "longitude": 50.04050064086914,
          "region": "06",
          "city": "Saihat"
    },
    {
          "number": 24,
          "ip": "173.193 113.249",
          "country": "USA",
          "latitude": 29.77020072937012,
          "longitude": -95.36280059814452,
          "region": "TX",
          "city": "Houston"
    },
    {
          "number": 25,
          "ip": "52.28.246.5",
          "country": "DEU",
          "latitude": 50.11669921875,
          "longitude": 8.683300018310547,
          "region": "05",
          "city": "Frankfurt"
    },
    {
          "number": 26,
          "ip": "77.18.133.195",
          "country": "NOR",
          "latitude": 59.21149826049805,
          "longitude": 11.190299987792969,
          "region": "13",
          "city": "Skjeberg"
    },
    {
          "number": 27,
          "ip": "61.239.116.68",
          "country": "HKG",
          "latitude": 22.283300399780278,
          "longitude": 114.1500015258789,
          "region": "00",
          "city": "Central District"
    },
    {
          "number": 28,
          "ip": "114.84.225.150",
          "country": "CHN",
          "latitude": 31.04560089111328,
          "longitude": 121.39969635009766,
          "region": "23",
          "city": "Shanghai"
    },
    {
          "number": 29,
          "ip": "1.172.215.210",
          "country": "TWN",
          "latitude": 22.616300582885747,
          "longitude": 120.31330108642578,
          "region": "02",
          "city": "Kaohsiung"
    },
    {
          "number": 30,
          "ip": "182.48.238.241",
          "country": "IND",
          "latitude": 18.975000381469728,
          "longitude": 72.82579803466797,
          "region": "16",
          "city": "Mumbai"
    },
    {
          "number": 31,
          "ip": "35.158.130.52",
          "country": "DEU",
```

```
        "latitude": 50.11669921875,
        "longitude": 8.683300018310547,
        "region": "05",
        "city": "Frankfurt"
    },
    {
        "number": 32,
        "ip": "63.32.46.217",
        "country": "USA",
        "latitude": 47.54199981689453,
        "longitude": -122.3123016357422,
        "region": "WA",
        "city": "Seattle"
    },
    {
        "number": 33
        "ip": "95.219.165.96",
        "country": "SAU",
        "latitude": 26.279399871826173,
        "longitude": 50.20830154418945,
        "region": "06",
        "city": "Khobar"
    },
    {
        "number": 34,
        "ip": "18.185.104.219",
        "country": "DEU",
        "latitude": 50.11669921875,
        "longitude": 8.683300018310547,
        "region": "05",
        "city": "Frankfurt"
    }
  ]
}.
```

FIG. 8

FIG. 8 is a schematic view of yet another illustrative portion of swarm system 100, which may include data system 200 and analyze visualize computer system 500. As shown, analyze visualize computer system 500 may include any suitable analyze visualize sample tool 501 that may run on any suitable analyze visualize computer 502 (e.g., a cloud computer), which may be any suitable component or server, such as a cloud storage host (e.g., a dedicated Linux host from any suitable cloud computing provider). Analyze visualize computer system 500 may be configured to depend from swarm sample computer system 300 and from coalesce cache computer system 400. For example, analyze visualize computer system 500 may be configured to be dependent on any suitable data 511d that may be communicated with source code repository 211 and/or any suitable data 512d that may be communicated with source data repository 212 and/or any suitable data 513d that may be communicated with raw sample data storage 213 and/or any suitable data 520d communicated with cached form data storage 220 and/or to any suitable output data 530o to visual form data storage 230. Analyze visualize computer system 500 may be configured to run analyze visualize sample tool 501 with optimized files that may be found in cached form data storage 220 (e.g., at least a portion of data 520d) and to output the results of such analysis as any suitable output (e.g., as at least a portion of output(s) 5300), such as a visual form and/or text form and/or any other suitable form (e.g., as any suitable vector image format files (e.g., scalable vector graphics ("SVG") vector files), any suitable portable document format (e.g., the portable document format ("PDF") by Adobe Systems Incorporated of San Jose, Calif.), any suitable raster graphics files (e.g., portable network graphics "PNG" raster files), any suitable open standard files (e.g., JavaScript Object Notation ("JSON") summary result files), any suitable text files (e.g., comma separated values ("CSV") summary result files), and/or the like that may be stored on visual form data storage 230). Analyze visualize computer system 500 may be configured to depend on swarm sample tool 301 of swarm sample computer system 300 to generate raw sample results (e.g., as at least a portion of data 313d) that may be provided as at least a portion of data 413d for input to coalesce cache computer system 400 (e.g., JSON sample files) and/or as at least a portion of data 513d for input to analyze visualize computer system 500, and/or analyze visualize computer system 500 may be configured to depend on coalesce cache sample tool 401 of coalesce cache computer system 400 to generate cached sample results or form data (e.g., as at least a portion of data 420d) that may be provided as at least a portion of data 520d for input to analyze visualize computer system 500 (e.g., normal cache files and/or fresh cache files), but analyze visualize computer system 500 may be configured to run analyze visualize sample tool 501 asynchronously or in parallel with respect to swarm sample tool 301 of swarm sample computer system 300 and/or asynchronously or in parallel with respect to coalesce cache sample tool 401 of coalesce cache computer system 400. During operation, analyze visualize sample tool 501 may be configured to use cache samples or form data incrementally as they may be created and archived, and/or analyze visualize sample tool 501 may be configured to process an entire set of samples and/or form data all at once. As one example, analyze visualize sample tool 501 may be configured to depend on sampled data of process 311 and cached data of process 411. Incremental use case may include tool 301 sampling away for a month, tool 401 caching the first week of that month, and tool 501 receiving as input samples from tool 301 and caches from tool 401 to make an initial analysis pass. Tool 301 and tool 401 may be kept running while an incremental analysis may be done by tool 501 (e.g., at process 511 of FIG. 9). Alternatively or additionally, multiple computers (e.g., different ones of computer 502) may be used to carry out different parts of analysis (e.g., a first computer to handle day analysis, another computer to handle week analysis, etc.). Analyze visualize computer system 500 may be configured to have dependencies on source code input data 511d from source code repository 211 and/or on source data input data 512d from source data repository 212 and/or on raw sample data storage input data 513d from raw sample data storage 213 and/or on cached form data 520d from cached form data storage 220 and/or output(s) 530o to visual form data storage 230. In some embodiments, an operator or otherwise may configure analyze visualize computer 502 with any suitable (e.g., prerequisite) software that may be used to execute analyze visualize sample tool 501. For example, the operator may check out an up-to-date version of any source code implementing any or all of the tools from source code repository 211, and/or check out the current version of the source data from source data repository 212 (e.g., at least a portion of data 512d), and/or link raw sample data storage 213 and/or cached form data storage 220 and/or visual form data storage 230 to appropriate mount points on a filesystem of analyze visualize computer 502 (e.g., respective input and output mount points). Then, analyze visualize computer system 500 may be ready for operation.

FIG. 9

FIG. 9 is a flowchart of an illustrative process 511 for analyzing a particular media object. For example, process 511 may be carried out by analyze visualize sample tool 501 of analyze visualize computer system 500 of swarm system 100, for example, to process results (e.g., sort, sample, and cache results) for a media object, compute a visual form for the quantized results on a defined geographic region for swarm of activity per duration of (e.g., sample, hour, day, week, and/or cumulative time period), compute any suitable number of top (e.g., top 40 or top 100) swarm nodes, correspondence with Tor network exit nodes, find anomalies and unresolvable geographic locations, provide swarm activity into urban/rural or sparse/dense population density, generate per-geography slices of the same, generate per-country geography slices of the same, generate visual and text version(s) of this swarm metadata, and/or transfer such to a data archive. For example, with respect to correspondence with Tor network exit nodes, every tor exit node may have an associated IP address, such that the SPSP may scrape all the known tor exit nodes that are active during a sample, and look to see if any of the IP addresses returned in the sample files match tor exit nodes. If they match, that means some unknown Tor user is using the tor Network to download things from the peer swarm. This has been a historical problem with the Tor network, and one of the chief culprits of slowdowns. This is of interest to Tor network engineers, because if you can associate a bittorrent file with a tor node you can "de anonymize" tor users. The SPSP may provide robust research data on this phenomena. Process 511 may start at operation 510 by defining a media object (e.g., an operator of the system may define a media object in any suitable manner). As mentioned, a defined media object may include any suitable characteristics (e.g., identifying characteristics). In some embodiments, the media object defined at operation 510 of process 511 may be the same as the media object defined at operation 410 of process 411 and/or may be the same as the media object defined at operation 310 of process 311 (e.g., using any suitable data 512d that may be communicated by computer system 500 with source data repository 212).

Next, at operation 516, an operator or otherwise may configure any suitable source code (e.g., using any suitable data 511d that may be communicated by computer system 500 with source code repository 211) for the analyze visualize sample tool (e.g., tool 501). There may be any suitable number and type(s) of configuration parameters that may be configured before the source code may be configured to an executable, including, but not limited to, a media object parameter (e.g., a string literal argument that may identify the media object (e.g., defined at operation 310 (e.g., "stranger-things-02" may identify the second season of the Netflix show Stranger Things))), a duration_types parameter (e.g., to analyze, as an array of one or more suitable durations, including, but not limited to, one, some, or each of the following enumerated durations: sample, hour, day, week, and cumulative (e.g., at operation 516 tool 501 may be configured to select one or more durations to analyze (e.g., if only "week" is selected, then analysis may be generated for week swarms (e.g., week by week analysis, but not also day by day and hour by hour analysis)))), a persistent_swarm parameter (e.g., a Boolean flag may be used to compute persistent_swarm values), a parameter related to the partition or subset of the BTIHA to analyze, if any (e.g., a default of this parameter may be all of the BTIHA to analyze), a cartographic_projection parameter that may be used (e.g., alone or along with any raster map files and/or any suitable associated transformation algorithms) to transform longitude and latitude coordinates to planar (x,y) coordinates, and/or any additional subdivisions of the cartographic_projection into slice elements, a parameter related to display_frame size (e.g., to use when generating output files), a parameter related to the output directory for generated files, and/or the like. Then, once any suitable number and type(s) of configuration parameters have been configured, operation 516 may further include compiling the source code to an executable, such as an analyze visualize tool executable (e.g., analyze visualize sample tool 501). The persistent_swarm parameter may be configured to be true (e.g., persistent analysis mode is on (e.g., fresh cache files may be used in addition to or as an alternative to normal cache files)) or false (e.g., persistent analysis mode is off (e.g., fresh cache files are not used in addition to or as an alternative to normal cache files)). A cartographic_projection parameter type may be any suitable type, such as Mercator or Cahill-Keyes, as may be selected by compile time switch (e.g., a C++ macro definition), and, then, after the system may have a base whole-earth projection, the system may configure any slices (if any), where common slices may be per-country (e.g., USA, Canada, etc.) or per-region (e.g., Americas, Asia, etc.) and/or the like, and a map may be selected to be tiled on to one or more pages or display interfaces (e.g., if so, then for the "Americas" slice above, the North American continent may be presented on page 1 (top) and the South American continent may be presented on page 2 (bottom)). A display_frame size parameter may be used to define a page size or other suitable UI presentation characteristic size (e.g., A4, or USA letter (8.5×11), or it could be map-size (e.g., quad letter so 17×22)) or the "page size" could be a television screen (e.g., 1920× 1080 pixels for a 1080p display) and/or various other presentation parameter characteristics may be suitable, such as default spacing (e.g., large for print, small for video), default scale (e.g., small, medium, large) of visualization, where this may depends on the measured swarm size (e.g., smaller swarms can use larger scales and still be legible, where larger swarms may have to reduce sizes for many visualizations).

Next, at operation 520, an operator or otherwise may prepare the raw samples and archived cache files. For example, at operation 520, any stored swarm sample results of operation 380 for the defined media object (e.g., any compressed data archives associated with the media object) may be transferred from raw sample data storage 213 (e.g., as data 513d) to analyze visualize computer system 500 (e.g., to analyze visualize sample tool 501). Moreover, at operation 520, any stored coalesced cached results of operation 470 for the defined media object (e.g., any compressed data archives associated with the media object) may be transferred from cached form data storage 220 (e.g., as data 520d) to analyze visualize computer system 500 (e.g., to analyze visualize sample tool 501). For example, the JSON files may be uncompressed, the total number of samples may be defined as the "raw_sample_set" and the duration of time sampled may be defined as the "sample_range".

Next, at operation 522, an analyzing process of process 511 may be started (e.g., by analyze visualize sample tool 501) and the analyzing process may then continue for any suitable duration until operation 550 at which the analyzing process may be stopped (e.g., where the analyzing process may be terminated (e.g., by an operator) or where the analyzing process may terminate itself (e.g., when an analyze visualize sample tool reaches the end of the supplied input and/or reaches the end of an analyzing duration and terminates itself)). During the length of the analyzing process between operations 522 and 550, which may be called the analysis duration or the analyze duration or the analyzing duration, two or more analyzing subprocesses may be executed (e.g., in parallel or sequentially), where each analyzing subprocess may be for a particular duration_type. Each analyzing subprocess for a particular duration_type may include a particular quantizing operation 530 (e.g., a respective one of quantizing operations 530a-530e) and a particular analyzing operation 540 (e.g., a respective one of analyzing and/or visualizing operations 540a-540e). For example, for each duration_type, a respective quantizing operation 530 may include quantizing the sample_range for the duration_type into sample_duration elements. For example, consider when a raw_sample_set includes 168 hours, or 7 days, or 1 week worth of samples. Each hour in the sample_range may be represented by a numbered hour element (e.g., hour-001, hour-002, and so on up to hour-168). The other duration_type values may be handled similarly (e.g., each day in the sample_range may be represented by a numbered day element (e.g., day-001, day-002, and so on up to day-7), and so on). Moreover, for each duration_type, after its respective quantizing operation 530, process 511 may advance to a respective analyzing and/or visualizing operation 540. For example, for each quantized sample_duration element of a particular duration_type, a respective analyzing and/or visualizing operation 540 for that particular duration_type may include carrying out any suitable suboperations, including, but not limited to, the following:

- (540-1) for each BTIH element in the media object's UBTIHA, carrying out any suitable suboperations, including, but not limited to, the following:
  - (540-1a) assigning a generated color or shade or other suitable UI distinguishing characteristic to represent the element (e.g., based on any suitable metadata of the element (e.g., censorship, resolution, language, etc. (e.g., blue may be used to represent a censored element and red may be used to represent an uncensored element)));
  - (540-1b) querying the prepared JSON cache files that match the BTIH and the sample_duration element;
  - (540-1c) deserializing matching JSON files and constructing an in-memory representation of each peer in the cache data;
  - (540-1d) for each peer (e.g., unique peer and/or fresh peer), carrying out any suitable suboperations, including, but not limited to, the following
    - (540-1d-i) converting found internet IP address for each peer to a geographic location (e.g., latitude and longitude value, or city, or country) using a geolocation database or utility (e.g., any suitable software (e.g., MaxMind geolocation software) may be used for this suboperation), where a peer found in the geographic location specified may be defined as a geo_peer (it is to be noted that such conversion of IP address to geographic information may be carried out during any suitable portion of process 311 or process 411 rather than during process 511);
    - (540-1d-ii) noting any unique peer that matches a known Tor Protocol Exit Node and saving the IP address to a separate log file (e.g., to see what is being pirated on Tor, like what is being pirated with SSL, or I2P, it may be just another cloaking device/network protocol, where the SPSP may be used to ask and determine whether certain tor nodes have a lot of pirate activity? Are there regions of the world that use Tor exit nodes for piracy, and others that do not?); and/or
    - (540-1d-iii) noting any unique peer that cannot be associated with a specific latitude and longitude value, or cannot be located by country or otherwise associated with a geographic location, and defining this peer as an anomaly, and saving this IP address to a separate log file;
  - (540-1e) weighing all found geo_peers by location (e.g., two unique peers found in common location A over the particular quantized sample_duration element (e.g., a peer with IP address 177.22.222.4 and a peer with IP address 195.41.456.2 over a particular hour, where each IP address translates to the same location A (e.g., Paris, France)) may be represented by unique geo_peer from location A with weight 2 for that entire particular quantized sample_duration element);
  - (540-1f) assigning any suitable UI style characteristics (e.g., size and opacity) based on weight of each geo_peer (e.g., greater size for greater weight);
  - (540-1g) transforming geographic location to (x,y) coordinates on a raster projection for the specified cartography; and/or
  - (540-1h) saving the in-memory visual representation as a serialized SVG file or series of SVG files containing information on each unique weighted geo_peer and/or each fresh weighted geo_peer with any suitable metadata for the media object, including, but not limited to, total peers sampled, unique peers found, new unique peers found (e.g., fresh), duration, unique or geo_peer persistence (e.g., freshness with respect to immediately preceding sample_duration element), date stamp, resolution and media codec, Tor exit node proximity, city or country name proximity, weight, opacity, color, cartographic projection, top 100 swarms by size, top 100 swarms by demographic urban split, top 100 swarms by demographic rural split, and/or the like;
- (540-2) repeating suboperation (540-1) for seeds instead of peers (e.g., operations 540-id through 540-1h);
- (540-3) repeating suboperation (540-1) for any selected range (or ranges) of latitude and longitude values (e.g., three slices (e.g., Americas, Eurasia, Asia Pacific), each of which may have a distinct latitude/longitude range)), or on a per-country basis, or the like (e.g., operations 540-1d through 540-1h);
- (540-4) rendering the SVG files to PNG and PDF files or other suitable raster formats (e.g., TIFF or webm) or other suitable vector formats (e.g., postscript); and/or
- (540-5) collating the PDF files into a single PDF for the media object and converting the PNG files into a single MKV movie file for the media object (e.g., PNG to MP4/AVC, PNG to MKV/HEVC, PNG to MKV/Avl, etc.).

When each duration_type has been processed, at block 550, the analyzing process may end.

Next, process 511 may advance to operation 560, at which each visualized output file of analyze visualize results (e.g., each collated PDF and each MKV movie) created by the analyze visualize sample tool at each operation 540 may be stored on (e.g., synched with) visual form data storage 230 (e.g., as output data 530o). In some embodiments, all such results may be compressed into a single archive file before being transferred to cached visual form data storage 230.

When every archive is transferred, analyze visualize sample tool 501 may be finished and process 511 may end.

It is understood that the operations shown in process 511 of FIG. 9 are only illustrative and that existing operations may be modified or omitted, additional operations may be added, and the order of certain operations may be altered.

Therefore, as just one particular example, process 511 may generate and store, for each BTIH element of a media object's UBTIHA, both a "normal visualize file" and a "fresh visualize file" for each quantized sample_duration element of each particular duration_type, such that, for example, if the media object's UBTIHA includes 100 BTIH elements throughout an entire 4 week sampling duration that includes a minimum sampling interval of 12 samples per hour (e.g., a sample every 5 minutes), the number of normal visualize files that may be generated by process 511 may be 806,400 (i.e., 100*4*7*24*12) normal sample visualize files (e.g., which may be similar to each one of the 806,400 normal sample cache files but with IP address or other peer node identification translated to geography and any a common geography between two different peer nodes may be combined and weighted) and 67,200 (i.e., 100*4*7*24) normal hour visualize files and 2,800 (i.e., 100*4*7) normal day visualize files and 400 (i.e., 100*4) normal week visualize files and 100 normal cumulative visualize files (i.e., 876,900 total normal visualize files), where each normal visualize file may include a time stamp or label associated with the particular sample_duration element (e.g., sample-754,399, hour-113, day-19, week-03, cumulative, etc.), various metadata about the particular BTIH element, geographical characteristic(s) about each unique detected peer for the particular quantized sample_duration element for the particular BTIH element (e.g., different peers with common geography may be combined and weighted), and geographical characteristic(s) about each unique detected seed for the particular quantized sample_duration element for the particular BTIH element (e.g., different seeds with common geography may be combined and weighted), while the number of fresh visualize files that may be generated by process 511 may be 806,399 (i.e., (100*4*7*24*12)−1) fresh sample visualize files and 67,199 (i.e., (100*4*7*24)−1) fresh hour visualize files and 2,799 (i.e., (100*4*7)−1) fresh day visualize files and 399 (i.e., (100*4)−1) fresh week visualize files (i.e., 876,796 total fresh visualize files (i.e., an initial sample_duration element of each duration_type may not have a fresh visualize file generated as it would not have an immediately preceding sample_duration element)), where each fresh visualize file may include a time stamp or label associated with the particular sample_duration element of a particular duration_type (e.g., sample-754,399, hour-113, day-19, week-03, etc.), various metadata about the particular BTIH element, geographical characteristic(s) about each unique detected peer for the particular quantized sample_duration element for the particular BTIH element that is fresh (e.g., not detected in the immediately preceding quantized sample_duration element for a particular duration_type (e.g., sample-754,398, hour-112, day-18, week-02, etc.)) (e.g., where different unique peers with common geography may be combined and weighted), and geographical characteristic(s) about each unique detected seed for the particular quantized sample_duration element for the particular BTIH element that is fresh (e.g., not detected in the immediately preceding quantized sample_duration element for a particular duration_type (e.g., sample-754,398, hour-112, day-18, week-02, etc.)) (e.g., where different unique seeds with common geography may be combined and weighted). In some embodiments, process 511 may instead break up each type of normal visualize file into a peer normal visualize file for each particular sample_duration element for each particular BTIH element and a seed normal visualize file for each particular sample_duration element for each particular BTIH element, and/or may break up each type of fresh cache file into a peer fresh visualize file for each particular sample_duration element for each particular BTIH element and a seed fresh visualize file for each particular sample_duration element for each particular BTIH element. Alternatively, in some embodiments, process 511 may instead combine each type of normal visualize file and each fresh visualize file into a single visualize file for each particular sample_duration element for each particular BTIH element.

Therefore, the SPSP may be operative to sample, quantify (e.g., count), and map peer to peer file sharing (e.g., file sharing that may rely on the BitTorrent protocol). For example, the SPSP may sample BitTorrent swarms, tally unique peers and unique seeds, and create outputs that may include rankings and geo-visualizations, from the collected data. As just one example, the SPSP may generate a video that may present, on a minimum sampling interval by minimum sampling interval basis (e.g., minute by minute or every 5 minutes by every 5 minutes), the downloading activity of a media object for any suitable duration of time (e.g., 4 weeks). The activity of the video may be presented as features over any suitable map, where the position of each feature with respect to the map may be representative of a geolocation associated with the downloading (e.g., weighted peer or node geolocation) and various characteristics of each feature may be determined based on any suitable metadata or weighting (e.g., size of feature (e.g., circumference of ring about geolocation or font size of geolocation name) associated with the weight of the geolocation, the color of the feature associated with resolution or censorship or language or other suitable metadata characteristic of the specific instance element of the media object represented by the feature, etc.). Such a video may be associated with a time frame that starts right when the media object was first premiered to the world (e.g., if the media object is a Netflix show that was released at the start of the time frame). For example, the video may be operative to show any suitable trends or user activity, such as when certain locations wake up, and/or how there is a stronger preference for hi-resolution files in the Global North than in the Global South.

Various types of useful information may be gleaned from or presented by such a video or any other deliverable result of the SPSP from analysis of a media object's network sharing. For example, one type of information may be "discovery leaps" or when do people download the particular media object. Another exemplary visualization that may be provided by the SPSP may be shown by graph 1000 of FIG. 10, which may plot unique peers over weeks for various media objects, including plot 1001 for Season 2, Episode 13 of the Handmaids Tale (e.g., the first 8 weeks starting from its premiere), plot 1002 for Season 7, Episode 7 of Game of Thrones (e.g., the first 14 weeks starting from its premiere), plot 1003 for Season 2, Episode 10 of Westworld (e.g., the first 6 weeks starting from its premiere), plot 1004 for Season 1, Episode 1 of Altered Carbon (e.g., the first 9 weeks starting from its premiere), plot 1005 for Season 1, Episode 2 of Luke Cage (e.g., the first 12 weeks starting from its premiere), plot 1006 for Season 7, Episode 6 of Game of Thrones (e.g., the first 5 weeks starting from its premiere), plot 1007 for Season 2, Episode 2 of Stranger Things (e.g., the first 10 weeks starting from its premiere), plot 1008 for Season 2, Episode 3 of Narcos (e.g., the first 5 weeks starting from its premiere), plot 1009 for Black Panther (e.g., the first 8 weeks starting from its premiere), and plot 1010 for Season 8, Episode 16 of Walking Dead (e.g., the first 3 weeks starting from its premiere). As shown, every one of these objects sees its strongest discovery leap right at the beginning of its release, as each plot shows its largest spike in week 1. Many objects may also show delayed discovery leaps, such as plot 1007 for Season 2, Episode 2 of Stranger Things that shows a second discovery leap in its week 6, while plot 1009 for Black Panther that shows a second discovery leap happening in its week 7, and while plot 1005 for Season 1, Episode 2 of Luke Cage that shows several discovery leaps in addition to the initial leap including ones happening in weeks 5, 6, 9, and 12 (e.g., it may be deemed remarkable that as late as 3 months after a media title becomes available, there are these spikes in people's discovery of them).

Another type of information that may be gleaned from or presented by any suitable visualization or any other deliverable result of the SPSP may be how long a "tail" a media object has, which may indicate when people stop downloading that media object. As may be seen by many of the plots of graph 1000, many media objects may have very long tails (e.g., many of these media objects may have unique peers (e.g., download counts) numbering between at least a few hundred thousand and four million many weeks (e.g., 12) after debuting). Unique peers may be assumed to have downloaded the file (at least) once, while fresh peers may be assumed to have downloaded it once in the specified time period, while total download count may be unique peers. It may be determined from graph 1000 that media objects with delayed discoveries (e.g., later discovery leaps) may also have longer tails (see, e.g., plots 1005, 1007, and 1009). Additionally or alternatively, it may be determined from graph 1000 that media objects with higher overall downloads may also have longer tails (see, e.g., plot 1002 for Season 7, Episode 7 of Game of Thrones, which may have been downloaded 14 million times in its first week and still over 1 million times in its fourteenth week).

Another type of information that may be gleaned from or presented by any suitable visualization or any other deliverable result of the SPSP may be the resolution preferences for a media object (e.g., what image quality, file size, and file type do people download for the media object). For example, over an entire sampling duration (e.g., 14 weeks), any suitable information may be presented in any suitable form (e.g., bar chart, ring chart, list, etc.) that may be indicative of what percentage or number out of the total downloads for a media object were of a particular type (e.g., 1080p, 720p, SD, etc.). Any other suitable metadata associated with each sample of each BTIH element of each UBITHA of each media object may be used to generate any suitable visualization (e.g., censorship status, subtitle language, overdub language, etc.).

Yet another type of information that may be gleaned from or presented by any suitable visualization or any other deliverable result of the SPSP may be the geographical peer rankings and maps for a media object (e.g., where are the downloaders located and which locations show the most download activity). For example, over an entire sampling duration (e.g., 14 weeks), any suitable information may be presented in any suitable form (e.g., bar chart, ring chart, list, map overlay, etc.) that may be indicative of what percentage or number out of the total downloads for a media object were made at a particular location (e.g., city level, country level, continent level, etc.). Another exemplary visualization that may be provided by the SPSP may be shown by map 1200 of FIG. 12, which may show a dot at each unique longitude and latitude of each download (whole earth) for a particular media object over an entire sampling duration (e.g., 4 weeks), which may indicate that the media object was downloaded across most of the United States and Europe and Russia and much of the Australian coast but not across the interior of Australia or much of Africa. Although not discernable in FIG. 12, each dot may be presented by a color associated with the resolution type or any other suitable metadata type of the object instance download. In some embodiments, the dot size or darkness may be determined based on the weight of that geolocation (e.g., how many unique downloads occurred at that location). Alternatively or additionally to a dot, text indicative of the name of the geolocation may be provided over the map and the size and/or color and/or other characteristics of the text may be varied based on various metadata associated with the download(s). Yet another exemplary visualization that may be provided by the SPSP may be shown by maps 1300A-1300E of FIGS. 13A-13E, which may rings of various diameter centered at each download location, where each ring's diameter may vary based on the weight of its location (e.g., how many downloads per location), and where map 1300A may be for a first week of a sampling duration for the media object (e.g., week-001 with a torrent collection size of 8 and 263 to 1771 samples over 2 to 7 days, varies by torrent), map 1300B may be for a second week of the sampling duration for the media object (e.g., week-002 with a torrent collection size of 8 and 1802 to 1803 samples over 7 days), map 1300C may be for a third week of the sampling duration for the media object (e.g., week-003 with a torrent collection size of 8 and 1847 samples over 7 days), map 1300D may be for a fourth week of the sampling duration for the media object (e.g., week-004 with a torrent collection size of 10 and 990 to 1848 samples over 4-7 days, varies by torrent), and map 1300E may be for a fifth and final week of the sampling duration for the media object (e.g., week-005 with a torrent collection size of 10 and 792 samples over 3 days). Although not discernable in FIGS. 13A-13E, each ring may be presented by a color associated with the resolution type or any other suitable metadata type of the object instance download. In some embodiments, when the SPSP has a cumulative unique peer count, and geo locations all over the globe, then sub-sets and partitions of the collected data may be generated. For example, specific slices can be a geographic range (e.g., longitudes from −175 to −30 (e.g., the Americas)), or by three-letter country code (e.g., BRA is Brazil). Slicing may reduce the total data size, meaning that the remaining data can be visualized in higher resolution/with more detail. A top 100 world may only have 34 or so in the Americas slice, while a top 100 Americas slice will have 100 regions in either USA, Canada, Mexico, or Brazil and the rest of North, South, and Central America.

As just one example, the following may be representative of text of the data format of a summary file (e.g., BON summary file) for a particular media object (e.g., the Stormy Daniels Interview, between Dec. 22, 2017 and Mar. 31, 2018):

{
   "data-version": "20191004",
   "duration": "2017-12-22-to-2018-03-31",
   "collection-name": "Stormy Daniels",
   "collection-id": "20172018",
   "collection-tag-genre": " ",
   "collection-tag-production": " ",
   "collection-tag-distribution": " ",
   "collection-all-btiha":

```
    "btiha-size": 48,
    "upeers-total": 355721,
    "useeds-total": 96341,
    "anomaly-total": 14396,
    "anomaly-percentage": "4.05"
},
"collection-unique-btiha": {
    "btiha-size": 52,
    "upeers-total": 2425190,
    "useeds-total": 548573,
    "anomaly-total": 11979,
    "anomaly-percentage": "0.49"
},
"transfer-units": "terabyte",
"transfer-size": 4647.995893447462,
"transfer-cost": " ",
"resolution-partitions": [
    {
        "number": 1,
        "name": "1080",
        "total-percentage-upeers": "45.68",
        "total-percentage-bytes": "65.03",
        "upeers-total": 1107763
    },
    {"number": 2, "name": "720", "total-percentage-upeers": "42.17", "total-percentage-bytes": "28.51", "upeers-total": 1022764
    },
    {"number": 3, "name": "sd-other", "total-percentage-upeers": "11.52", "total-percentage-bytes": "6.17", "upeers-total": 279412
    },
    {"number": 4, "name": "sd-264", "total-percentage-upeers": "0.63", "total-percentage-bytes": "0.29", "upeers-total": 15176
    },
    {"number": 5, "name": "sd-xvid", "total-percentage-upeers": "0.00", "total-percentage-bytes": "0.00", "upeers-total": 75
    },
    {
        "number": 6,
        "name": "2160",
        "total-percentage-upeers": "0.00",
        "total-percentage-bytes": "0.00",
        "upeers-total": 0
    }
],
"geo-slices-3-longitude-regions": [
    {
        "number": 1,
        "name": "AfroEurAsia",
        "total-percentage-upeers": "38.15"
    },
    {
        "number": 2,
        "name": "AsiaPacifica",
        "total-percentage-upeers": "34.21"
    },
    {
        "number": 3,
        "name": "Americas",
        "total-percentage-upeers": "27.63"
    }
],
"geo-country-top-10": [
    {
        "number": 1,
        "country-code": "USA",
        "country-name": "United States of America",
        "total-percentage-upeers": "9.35",
        "upeers-total": 226780
    },
    {
        "number": 2,
        "country-code": "IND",
        "country-name": "India",
        "total-percentage-upeers": "8.31",
        "upeers-total": 201458
    },
    {
        "number": 3,
        "country-code": "PHL",
        "country-name": "Philippines",
        "total-percentage-upeers": "4.34",
        "upeers-total": 105210
    },
    {
        "number": 4,
        "country-code": "GBR",
        "country-name": "United Kingdom of Great Britain and Northern Ireland",
        "total-percentage-upeers": "2.95",
        "upeers-total": 71619
    },
    {
        "number": 5,
        "country-code": "CAN",
        "country-name": "Canada",
        "total-percentage-upeers": "2.31",
        "upeers-total": 55962
    },
    {
        "number": 6,
        "country-code": "BRA",
        "country-name": "Brazil",
        "total-percentage-upeers": "1.96",
        "upeers-total": 47595
    },
    {
        "number": 7,
        "country-code": "AUS",
        "country-name": "Australia",
        "total-percentage-upeers": "1.86",
        "upeers-total": 45163
    },
    {
        "number": 8,
        "country-code": "RUS",
        "country-name": "Russian Federation",
        "total-percentage-upeers": "1.71",
        "upeers-total": 41375
    },
    {
        "number": 9,
        "country-code": "PAK",
        "country-name": "Pakistan",
        "total-percentage-upeers": "1.47",
        "upeers-total": 35679
    },
    {
        "number": 10,
        "country-code": "ZAF",
        "country-name": "South Africa",
```

```
      "total-percentage-upeers": "1.30",
      "upeers-total": 31583
    }
  ],
  "geo-country-region-city-top-30": [
    {
      "number": 1,
      "country-code": "USA",
      "country-name": "United States of America",
      "total-percentage-upeers": "0.98",
      "upeers-total": 23715
    },
    {
      "number": 2,
      "country-code": "IND",
      "country-name": "India, Bangalore, 19",
      "total-percentage-upeers": "0.74",
      "upeers-total": 17989
    },
    {
      "number": 3,
      "country-code": "IND",
      "country-name": "India, Kolkata, 28",
      "total-percentage-upeers": "0.67",
      "upeers-total": 16210
    },
    {
      "number": 4.
      "country-code": "IND",
      "country-name": "India, Mumbai, 16",
      "total-percentage-upeers": "0.61",
      "upeers-total": 14750
    },
    {
      "number": 5,
      "country-code": "PHL",
      "country-name": "Philippines",
      "total-percentage-upeers": "0.54",
      "upeers-total": 13131
    },
    {
      "number": 6,
      "country-code": "NLD",
      "country-name": "Netherlands",
      "total-percentage-upeers": "0.52",
      "upeers-total": 12650
    },
    {
      "number": 7,
      "country-code": "GRC",
      "country-name": "Greece, Athens, 35",
      "total-percentage-upeers": "0.49",
      "upeers-total": 11921
    },
    {
      "number": 8.
      "country-code": "PHL",
      "country-name": "Philippines, Quezon City, F2",
      "total-percentage-upeers": "0.49",
      "upeers-total": 11901
    },
    {
      "number": 9,
      "country-code": "IND",
      "country-name": "India, Delhi, 07",
      "total-percentage-upeers": "0.48",
      "upeers-total": 11703
    },
    {
      "number": 10,
      "country-code": "IND",
      "country-name": "India, Chennai, 25",
      "total-percentage-upeers": "0.44",
      "upeers-total": 10629
    },
    {
      "number": 11,
      "country-code": "IND",
      "country-name": "India, Pune, 16",
      "total-percentage-upeers": "0.43",
      "upeers-total": 10310
    },
    {
      "number": 12,
      "country-code": "EGY",
      "country-name": "Egypt, Cairo, 11",
      "total-percentage-upeers": "0.37",
      "upeers-total": 8897
    },
    {
      "number": 13,
      "country-code": "USA",
      "country-name": "United States of America, Ashburn, Va.",
      "total-percentage-upeers": "0.36",
      "upeers-total": 8703
    },
    {
      "number": 14,
      "country-code": "LKA",
      "country-name": "Sri Lanka, Colombo, 36",
      "total-percentage-upeers": "0.35",
      "upeers-total": 8403
    },
    {
      "number": 15,
      "country-code": "PAK",
      "country-name": "Pakistan, Lahore, 04",
      "total-percentage-upeers": "0.34",
      "upeers-total": 8366
    },
    {
      "number": 16,
      "country-code": "SGP",
      "country-name": "Singapore, Singapore, 00",
      "total-percentage-upeers": "0.33",
      "upeers-total": 8060
    },
    {
      "number": 17,
      "country-code": "IDN",
      "country-name": "Indonesia, Jakarta, 04",
      "total-percentage-upeers": "0.32",
      "upeers-total": 7750
    },
    {
      "number": 18,
      "country-code": "CAN",
      "country-name": "Canada, Toronto, ON",
      "total-percentage-upeers": "0.31",
      "upeers-total": 7534
    },
```

```
{
  "number": 19,
  "country-code": "ZAF",
  "country-name": "South Africa, Johannesburg, 06",
  "total-percentage-upeers": "0.31",
},
{
  "upeers-total": 7494
  "number": 20,
  "country-code": "SAU",
  "country-name": "Saudi Arabia, Riyadh, 10",
  "total-percentage-upeers": "0.30",
  "upeers-total": 7257
},
{
  "number": 21,
  "country-code": "MYS",
  "country-name": "Malaysia, Kuala Lumpur, 14",
  "total-percentage-upeers": "0.29",
  "upeers-total": 7075
},
{
  "number": 22,
  "country-code": "USA",
  "country-name": "United States of America, Los Angeles, Calif.",
  "total-percentage-upeers": "0.28",
  "upeers-total": 6760
},
{
  "number": 23,
  "country-code": "IND",
  "country-name": "India, Hyderabad, 02",
  "total-percentage-upeers": "0.28",
  "upeers-total": 6672
},
{
  "number": 24,
  "country-code": "ARE",
  "country-name": "United Arab Emirates, Dubai, 03",
  "total-percentage-upeers": "0.26",
  "upeers-total": 6236
},
{
  "number": 25,
  "country-code": "IND",
  "country-name": "India",
  "total-percentage-upeers": "0.25",
  "upeers-total": 6148
},
{
  "number": 26,
  "country-code": "KOR",
  "country-name": "Korea (Republic of)",
  "total-percentage-upeers": "0.25",
  "upeers-total": 6126
},
{
  "number": 27,
  "country-code": "ZAF",
  "country-name": "South Africa, Cape Town, 11",
  "total-percentage-upeers": "0.25",
  "upeers-total": 6046
},
{
  "number": 28,
  "country-code": "IND",
  "country-name": "India, New Delhi, 07",
  "total-percentage-upeers": "0.25",
  "upeers-total": 6007
},
{
  "number": 29,
  "country-code": "BRA",
  "country-name": "Brazil, Sao Paulo, 27",
  "total-percentage-upeers": "0.23",
  "upeers-total": 5684
},
{
  "number": 30,
  "country-code": "SRB",
  "country-name": "Serbia, Belgrade, 00",
  "total-percentage-upeers": "0.23",
  "upeers-total": 5636
}
]
},
```

As just one other example, the following may be representative of text of the data format of a summary file (e.g., JSON summary file) for another particular media object (e.g., season 2 of the show Stranger Things, between Oct. 27, 2017 and Dec. 31, 2017):

```
{
  "data-version": "20191004",
  "duration": "2017-10-27-to-2017-12-31",
  "collection-name": "Stranger Things",
  "collection-id": "2",
  "collection-tag-genre": " ",
  "collection-tag-production": " ",
  "collection-tag-distribution": " ",
  "collection-all-btiha": {
    "btiha-size": 274,
    "upeers-total": 33765789,
    "useeds-total"13814398,
    "anomaly-total": 625848,
    "anomaly-percentage": "1.85"
  },
  "collection-unique-btiha": {
    "btiha-size": 209,
    "upeers-total": 20555123,
    "useeds-total": 9632217,
    "anomaly-total": 241874,
    "anomaly-percentage": "1.18"
  },
  "transfer-units": "terabyte",
  "transfer-size": 43089.66182721779,
  "transfer-cost": " ",
  "resolution-partitions": [
    {
      "number": 1,
      "name": "sd-264",
      "total-percentage-upeers": "39.71",
      "total-percentage-bytes": "9.28",
      "upeers-total": 8161820
    },
    {
      "number": 2,
      "name": "720",
      "total-percentage-upeers": "36.74",
      "total-percentage-bytes": "28.26",
      "upeers-total": 7551087
    },
```

```
{
    "number": 3,
    "name": "1080",
    "total-percentage-upeers": "15.11",
    "total-percentage-bytes": "42.65",
    "upeers-total": 3106228
},
{
    "number": 4,
    "name": "sd-xvid",
    "total-percentage-upeers": "6.17",
    "total-percentage-bytes": "11.92",
    "upeers-total": 1268477
},
{
    "number": 5,
    "name": "sd-other",
    "total-percentage-upeers": "2.27",
    "total-percentage-bytes": "7.89",
    "upeers-total": 467511
},
{
    "number": 6,
    "name": "2160",
    "total-percentage-upeers": "0.00",
    "total-percentage-bytes": "0.00",
    "upeers-total": 0
}
],
"geo-slices-3-longitude-regions": [
{
    "number": 1,
    "name": "AfroEurAsia",
    "total-percentage-upeers": "43.93"
},
{
    "number": 2,
    "name": "AsiaPacifica",
    "total-percentage-upeers": "30.11"
},
{
    "number": 3,
    "name": "Americas",
    "total-percentage-upeers": "25.96"
}
],
"geo-country-top-10": [
{
    "number": 1,
    "country-code": "USA",
    "country-name": "United States of America",
    "total-percentage-upeers": "11.81",
    "upeers-total": 2428213
},
{
    "number": 2,
    "country-code": "IND",
    "country-name": "India",
    "total-percentage-upeers": "9.92",
    "upeers-total": 2038353
},
{
    "number": 3,
    "country-code": "BRA",
    "country-name": "Brazil",
    "total-percentage-upeers": "6.74",
    "upeers-total": 1385845
},
{
    "number": 4,
    "country-code": "CHN",
    "country-name": "China",
    "total-percentage-upeers": "3.73",
    "upeers-total": 767709
},
{
    "number": 5,
    "country-code": "PHL",
    "country-name": "Philippines",
    "total-percentage-upeers": "3.71",
    "upeers-total": 763608
},
{
    "number": 6,
    "country-code": "GBR",
    "country-name": "United Kingdom of Great Britain and Northern Ireland",
    "total-percentage-upeers": "3.50",
    "upeers-total": 719537
},
{
    "number": 7,
    "country-code": "ESP",
    "country-name": "Spain",
    "total-percentage-upeers": "3.27",
    "upeers-total": 671278
},
{
    "number": 8,
    "country-code": "GRC",
    "country-name": "Greece",
    "total-percentage-upeers": "3.23",
    "upeers-total": 663822
},
{
    "number": 9.
    "country-code": "AUS",
    "country-name": "Australia",
    "total-percentage-upeers": "2.27",
    "upeers-total": 465907
},
{
    "number": 10,
    "country-code": "FRA",
    "country-name": "France",
    "total-percentage-upeers": "2.02",
    "upeers-total": 414909
}
],
"geo-country-region-city-top-30": [
{
    "number": 1,
    "country-code": "USA",
    "country-name": "United States of America",
    "total-percentage-upeers": "2.98",
    "upeers-total": 612502
},
{
    "number": 2.
    "country-code": "IND",
    "country-name": "India",
    "total-percentage-upeers": "1.81",
    "upeers-total": 371599
},
```

```
{
  "number": 3,
  "country-code": "GRC",
  "country-name": "Greece, Athens, 35",
  "total-percentage-upeers": "1.47",
  "upeers-total": 302886
},
{
  "number": 4,
  "country-code": "IND",
  "country-name": "India, Bangalore, 19",
  "total-percentage-upeers": "1.08",
  "upeers-total": 222943
},
{
  "number": 5,
  "country-code": "PHL",
  "country-name": "Philippines",
  "total-percentage-upeers": "1.01",
  "upeers-total": 207994
},
{
  "number": 6.
  "country-code": "IND",
  "country-name": "India, Mumbai, 16",
  "total-percentage-upeers": "0.92",
  "upeers-total": 190080
},
{
  "number": 7,
  "country-code": "GRC",
  "country-name": "Greece",
  "total-percentage-upeers": "0.69",
  "upeers-total": 142810
},
{
  "number": 8.
  "country-code": "NLD",
  "country-name": "Netherlands",
  "total-percentage-upeers": "0.69",
  "upeers-total": 142259
},
{
  "number": 9,
  "country-code": "USA",
  "country-name": "United States of America, Ashburn, Va.",
  "total-percentage-upeers": "0.69",
  "upeers-total": 141002
},
{
  "number": 10,
  "country-code": "BRA",
  "country-name": "Brazil, Sao Paulo, 27",
  "total-percentage-upeers": "0.64",
  "upeers-total": 132202
},
{
  "number": 11,
  "country-code": "BRA",
  "country-name": "Brazil",
  "total-percentage-upeers": "0.64",
  "upeers-total": 130926
},
{
  "number": 12,
  "country-code": "FRA",
  "country-name": "France",
  "total-percentage-upeers": "0.61",
  "upeers-total": 126180
},
{
  "number": 13,
  "country-code": "IND",
  "country-name": "India, Delhi, 07",
  "total-percentage-upeers": "0.61",
  "upeers-total": 125620
},
{
  "number": 14,
  "country-code": "IND",
  "country-name": "India, Chennai, 25",
  "total-percentage-upeers": "0.60",
  "upeers-total": 124327
},
{
  "number": 15,
  "country-code": "GBR",
  "country-name": "United Kingdom of Great Britain and Northern Ireland",
  "total-percentage-upeers": "0.59",
  "upeers-total": 121352
},
{
  "number": 16,
  "country-code": "POL",
  "country-name": "Poland",
  "total-percentage-upeers": "0.55",
  "upeers-total": 113671
},
{
  "number": 17,
  "country-code": "IND",
  "country-name": "India, Kolkata, 28",
  "total-percentage-upeers": "0.52",
  "upeers-total": 107449
},
{
  "number": 18,
  "country-code": "IND",
  "country-name": "India, Pune, 16",
  "total-percentage-upeers": "0.51",
  "upeers-total": 105857
},
{
  "number": 19,
  "country-code": "ESP",
  "country-name": "Spain, Madrid, 29",
  "total-percentage-upeers": "0.51",
  "upeers-total": 105775
},
{
  "number": 20,
  "country-code": "HRV",
  "country-name": "Croatia, Zagreb, 21"
  "total-percentage-upeers": "0.49",
  "upeers-total": 99789
},
{
  "number": 21,
  "country-code": "CHN",
  "country-name": "China, Beijing, 22",
```

```
    "total-percentage-upeers": "0.47",
    "upeers-total": 97078
},
{
    "number": 22,
    "country-code": "HRV",
    "country-name": "Croatia",
    "total-percentage-upeers": "0.44",
    "upeers-total": 91217
},
{
    "number": 23,
    "country-code": "ISR",
    "country-name": "Israel",
    "total-percentage-upeers": "0.43",
    "upeers-total": 89198
},
{
    "number": 24,
    "country-code": "IRL",
    "country-name": "Ireland, Dublin, 07",
    "total-percentage-upeers": "0.42",
    "upeers-total": 87115
},
{
    "number": 25,
    "country-code": "KOR",
    "country-name": "Korea (Republic of)",
    "total-percentage-upeers": "0.40",
    "upeers-total": 81914
},
{
    "number": 26,
    "country-code": "SGP",
    "country-name": "Singapore, Singapore, 00",
    "total-percentage-upeers": "0.38",
    "upeers-total": 78695
},
{
    "number": 27,
    "country-code": "JPN",
    "country-name": "Japan",
    "total-percentage-upeers": "0.38",
    "upeers-total": 78593
},
{
    "number": 28,
    "country-code": "CHN",
    "country-name": "China, Guangzhou, 30",
    "total-percentage-upeers": "0.38",
    "upeers-total": 77372
},
{
    "number": 29,
    "country-code": "ZAF",
    "country-name": "South Africa, Cape Town, 11",
    "total-percentage-upeers": "0.37",
    "upeers-total": 76970
},
{
    "number": 30,
    "country-code": "PHL",
    "country-name": "Philippines, Quezon City, F2",
    "total-percentage-upeers": "0.37",
    "upeers-total": 75619
}
]
}.
```

As mentioned, various peer-to-peer systems facilitate the sharing of a lot of different types of files, such as not just pirate files of film and television and music and books, but of objects that can be fabricated in the home, including quite dangerous objects (e.g., files for 3D printable firearms). It's possible, even likely, that the SPSP will see more and more diversity of what is being distributed via file sharing networks in the future. The SPSP is configured to capture, quantify, and visualize data of all types about an increasingly decentralized Web.

Further Description of FIGS. 1-13E

In use, an operator may initiate any process by setting up any or all of the components of data system 200 (e.g., repository 211, repository 212, storage 213, storage 220, and/or storage 230). Such components may be persistent and may remain available for use over the entire operation of swarm system 100. Then, a media object may be defined and a BTIHA may start to be built (e.g., from found torrent files). Defining the media object may be operative to narrow the scope of media to one instance, such as a particular film, a particular television serial season or episode, a particular book, a particular software release, or the like. Once the media object has been defined, a process (e.g., manual process) of collecting instantiations of the media object may begin. For example, an operator may poll a variety of tracker sites with information identifying the media object and may then store any found torrents in source data repository 212. Any suitable tracker site(s) may be used, including, for example, one, some, or each tracker site that may be listed on the internet site https://opentrackers.org, and/or that can be found by examining court orders and written proceedings as found in India, Peru, Denmark, Ireland, and/or the like, and/or that can be revealed to an operator by other unrelated and autonomous operators. As soon as one or more torrent files have been found and entered into the repository, the swarm system may be considered initialized and ready to begin processing the media object. Processing such a media object may occur in three or more processes. For example, in a first process, a swarm that may be generated by peer to peer traffic for the media object may be sampled for a pre-defined duration, while in a second process, the sample results may be processed and transformed into unique cache results, while in a third process, the cache results may be processed and transformed (e.g., with details of various characteristics of the generated swarm model being rendered into any suitable text and/or visual form(s) and/or audible form(s) and/or any other suitable presentable form(s)).

A swarm that may be generated by peer to peer traffic for a media object may be sampled for a pre-defined duration. For example, an operator may provision swarm sample computer 302 (e.g., a cloud computer) on swarm sample computer system 300 (e.g., at operation 340), check out a source code for swarm sample tool 301, configure a duration and frequency of source code for swarm sample tool 301, and compile or interpret the configured source code to build source code for swarm sample tool 301 as a runnable task on swarm sample computer 302 (e.g., at operation 350). Next, swarm sample tool 301 may then be invoked with any suitable (e.g., operator-defined) media object and a scheduler utility that may execute swarm sample tool 301, which may be configured to use the media object argument to initialize a BTIHA (e.g., at operation 320), and then use the BTIHA to sample a peer to peer swarm with the configured repetition frequency and duration (e.g., at operation 360).

Each time swarm sample tool 301 probes the peer to peer swarm, it may be configured to save any found peer metadata in a file. Such files may then be collected and archived (e.g., at operation 380) in raw sample data storage 213 (e.g., as data 313*d*). An operator can periodically check in on swarm sample computer system 300 and observe metadata collection, yet the sample collection may be configured automatically by swarm sample tool 301. At the end of the defined duration, swarm sample tool 301 may be finished, and may no longer sample the peer-to-peer network for the media property unless invoked again at a later time. Once swarm sample tool 301 is finished, the operator may de-provision swarm sample computer 302.

Sample results may then be processed and transformed into unique cache results. For example, an operator may provision coalesce cache computer 402 on coalesce cache computer system 400, check out a source code for coalesce cache sample tool 401, configure output duration resolutions (e.g., per-sample, aggregate hour, aggregate day, aggregate week, cumulative, etc.) to output from coalesce cache sample tool 401, and compile or interpret the configured source code to build coalesce cache sample tool 401 as a runnable task on coalesce cache computer 402 (e.g., at operation 416). Next, raw sample data may be prepared (e.g., at operation 420), where it may be decompressed from the archive, processed to remove log files, and/or any incomplete or damaged sample files may be removed. Finally, coalesce cache sample tool 401 may then be invoked with the same operator-defined media object that was used with swarm sample tool 301 and run (e.g., at operations 430/440) until one, some, or all the prepared samples have been processed and new cache files have been stored (e.g., at operation 470) in cached form data storage 220 (e.g., as data 420*d*). Once coalesce cache sample tool 401 is finished, the operator may de-provision coalesce cache computer 402.

Cache results may then be processed and transformed (e.g., with details of various characteristics of the generated swarm model being rendered into any suitable text and/or visual form(s) and/or audible form(s) and/or any other suitable presentable form(s)). For example, an operator may provision analyze visualize computer 502 on analyze visualize computer system 500, check out a source code for analyze visualize sample tool 501, configure output duration resolutions (e.g., per-sample, aggregate hour, aggregate day, aggregate week, cumulative, etc.) to output from analyze visualize sample tool 501, set any defaults or parameters for output size, resolution, cartography, configure visualization passes, and/or the like, and compile or interpret the configured source code to build analyze visualize sample tool 501 as a runnable task on analyze visualize computer 502 (e.g., at operation 516). Next, raw sample data may be prepared (e.g., at operation 520), where the sample duration may be queried from raw sample data storage 213, log files may be examined to fill in extra metadata for the media object, and cached forms may be prepared, where files may be decompressed from cached form data storage 220. Then, analyze visualize sample tool 501 may be invoked with the same operator-defined media object that was used with swarm sample tool 301 and/or that was used by coalesce cache sample tool 401 and run (e.g., at operations 530/540) until one, some, or each desired visual form has been instantiated and any generated files have been stored (e.g., at operation 560) in visual form data storage 230 (e.g., as output(s) 530*o*). Once analyze visualize sample tool 501 is finished, the operator may de-provision analyze visualize computer 502.

For each media object, each of these processes may depend on the previous process, where, for example, the first process starts before the second process may begin. However, it is possible to start sampling a media process, and then start the second process and third process before the first process has completed sampling over the entire duration, results generated from this process may be valid only on the duration sampled, and may be referred to as intermediate results.

In use, these processes may be configured to operate on multiple media objects at the same time. For example, a swarm system could be embodied as defining six media objects (e.g., media objects 1, 2, 3, 4, 5, and 6), and, at a particular moment, the swarm sample tool may be operating on media objects 4, 5, and 6, the coalesce cache sample tool may be operating on media object 3, and the analyze visualize sample tool may be operating on media objects 1 and 2.

In some embodiments, a computing system used can vary between what is currently specified as a swarm sample computer 302, coalesce cache computer 402, and analyze visualize computer 502. For example, all three of these computing systems (302, 402, 502) may be a server, a minicomputer, a mainframe, a blade or dedicated slice on a virtualized computer, a provisioned cloud instance, a workstation, a personal computer, a mobile telephone, a tablet computing device, all of which can be either physically present and manipulated in person or virtually present in a cloud and manipulated remotely, or the like. Regardless of the instance, these computing systems may include one or more central processing units ("CPUs") and or graphical processing units ("GPUs"), each with an instruction set that may run both an operating system ("OS") that manages available hardware resources and provides functions such as interprocess communication, scheduling, virtual memory management, and/or application programs written in a programming language (e.g., C, C++, Python, JavaScript), along with: memory, cache, and/or secondary memory, one or more storage devices, a display device, and network capability that may make it accessible to other computer systems, and any required power, networking, or otherwise required cabling and/or accessories.

Memory and cache and secondary memory can include volatile memory devices, such as random access memory ("RAM"), dynamic random access memory ("DRAM"), non-volatile memory (e.g., flash memory), L1/L2 caches on CPU, and/or other semiconductor memory caches on CPU or GPU. Instruction sets for the CPU or GPU units may include complex instruction set computers ("CISCs"), reduced instruction set computers ("RISCs"), very long instruction word computers ("VLIWs"), scalar execution, stream processor, and/or a processor implementing other instruction sets or processors implementing a combination of instruction sets. It should further be noted that although multiple CPUs may be depicted or described as components in one or more computer systems, this is merely illustrative, and that, in some embodiments, computer 302, computer 402, and computer 502 may include a single CPU and/or a single computer system.

Storage devices can include a magnetic hard disk, a solid state drive, a removable Secure Digital ("SD") non-volatile memory card, a Universal Serial Bus ("USB") external drive, a Redundant Array of Independent Disks ("RAID") system, a network attached storage ("NAS") device, automated tiered storage, cloud storage systems (e.g., Google Drive, AWS, and Dropbox), and combinations of two or more storage devices.

Source and Data repositories can include version control software, a file server, a database system, local storage, cloud storage, and/or the like. Data file storage can be embodied in a flat file database served on a network file server with data files in JSON, XML, CSV, protocol buffers, or other formats for data interchange. Source code repositories may hold versions of source code and group versions in changes that may be related to each other, and can be embodied in software implementations, such as git, subversion, mercurial, or any other forms that may store programming language source code and may be accessible to computer systems, such as computer 302, computer 402, and computer 502. It should be noted that, in some alternative embodiments, some or each component of data system 200 (e.g., source code repository 211, source data repository 212, raw sample data storage 213, cached form data storage 220, visual form data storage 230, etc.) may be part of the computer system (e.g., stored on swarm sample computer 302 (e.g., rather than external to swarm sample computer 302)).

In some embodiments, computer 402 may include an Intel Core i7 8550U CPU, an Intel UHD Graphics 620 GPU, a 512 gigabyte (GB) solid state drive, 16 GB RAM, a Samsung 1080p LCD display device, a gigabit ethernet network, a 20 terabyte ("TB") network attached storage (NAS) device, and/or the like. Such a system may be running the Linux OS, source code repository 211 may be a git repository hosted at github.com, and the programming languages that may be used to implement swarm sample tool 301, coalesce cache sample tool 401, and analyze visualize sample tool 501 may be C++ and/or Python.

The network protocols used can vary between what is currently specified at BitTorrent and other Merkle-tree based peer to peer protocols, such as WebRTC, Bitcoin, Direct Connect, FastTrack, eDonkey, Gnutella, Libp2p, Rshare, and/or the like. Alternatively, geolocation software used can vary from MaxMind's GeoIP2 and/or other processes or software can be used, including GeoSurf, IP2Location, and/or other proprietary databases.

The demographic data used can be from any suitable source(s) (e.g., any suitable third party enabler subsystem 90), including, but not limited to, Demographia, The U.S. Census Bureau, the Natural Earth data sets, and/or the like. Cartographic projections used can be from any suitable source(s) (e.g., any suitable third party enabler subsystem 90), including, but not limited to, Mercator-inspired UN Maps in the public domain found on Wikipedia, public domain Voroni projections by Visionscarto, public domain Cahill-Keyes projections on Gene Keye's website (i.e., www.genekeyes.com), and/or the like. A job scheduler, as may be specified by swarm sample tool 301, can have alternative embodiments besides a cron scheduler, including, but not limited to, chronos, anacron, fcron, hcron, jobber, ApScheduler, bcron, mcron, Jenkins, and/or the like.

One, some, or all of the processes described with respect to FIGS. 1-13E may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 13 and/or data structure 15 of FIG. 1 and/or memory 73 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from a SPS subsystem to a client subsystem, from a client subsystem to a SPS subsystem, and/or from one client subsystem to another client subsystem using any suitable communications protocol (e.g., the computer-readable medium may be communicated to a client subsystem 70 via communications component 14/74 (e.g., as at least a portion of an application 79)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of the disclosure may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

Various source files are being filed concurrently herewith (i.e., as forty-one (41) distinct .txt files) that further describe various embodiments of the SPSP, and each of these source files is hereby incorporated by reference herein in its entirety. An additional source file listing may be as follows:

// alpha60 cartography projection UN -*- mode: C++-*-
// alpha60
// cartography projections
// Copyright (c) 2016-2018, Benjamin De Kosnik
    <b.dekosnik@gmail.com>
// This file is part of the alpha60 library. This library is free
// software; you can redistribute it and/or modify it under
    the terms
// of the GNU General Public License as published by the
    Free Software
// Foundation; either version 3, or (at your option) any
    later
// version.
// This library is distributed in the hope that it will be
    useful, but
// WITHOUT ANY WARRANTY; without even the
    implied warranty of

```
// MERCHANTABILITY or FITNESS FOR A PARTICU-
    LAR PURPOSE. See the GNU
// General Public License for more details.
#ifndef a60_CARTOGRAPHY_PROJECTION_UN_H
#define a60_CARTOGRAPHY_PROJECTION_UN_H 1
namespace a60::carto
{
  /**
    United Nations (UN) Map of the World, 4170, revi-
        sions 11-13.
    This is a CC image file that has been subsequently
        tweaked to come up with the base .svg file in use
        here.
    Base SVG image:
    un-world-map-4170r12-meridians-22x17-2013.svg
    The current approach is to assume an equirectangular
        projection, with the standard parallel at the equa-
        tor (plate carrée).
  */
  struct unproj: public projection_data, public projection-
      _base
  {
    /// Fudge constants for each plane.
    double k_x;
    double k_y;
    unproj(const projection_data d, double x, double y)
    : projection_data(d), k_x(x), k_y(y) { }
    string
    image_filename(const variant v) const
    {
      const string cartodata="united-nations-map";
      auto& rtr=io::get_run_time_resources( )
      string   ret(io::end_path(rtr.data)+cartodata+"/"+base-
          _name);
      if (v==outline)
      ret+="-outline";
      if (v==inverse)
      ret+="-outline-inverse";
      return ret+".png";
    }
    /// Assumes projection with no distortion, which is most
        certainly
    /// not correct.
    a60::point_2t
    meridians_to_point_2d(double lt, double lng)
    {
      bool ltp=lt>=0.0;
      bool lngp=lng>=0.0;
      // Position point on map.
      double x0=this→longitude_zero_x;
      double xdelta=std::abs((width/360)*lng);
      double y0=this→latitude_zero_y;
      double ydelta=std::abs((height/180)*lt);
      if (ltp)
      y0-=ydelta;
      else
      y0+=ydelta;
      if (lngp)
      x0+=xdelta;
      else
      x0-=xdelta;
      x0+=k_x;
      y0+=k_y;
      return std::make_tuple(x0, y0);
    }
  };

/// 1x
  /// 22×17 map
  /// un-world-map-4170r13, longitude range (−180 to 180)
  const unproj unworld96={1892, 949, 874, 475,
      "un-world-map-4170r13-w1892-h949"},
      11.5, −0.5};
  const unproj unworld300={1892, 949, 874, 475,
      "un-world-map-4170r13-w6306-h3164"},
      11.5, −0.5};
  /// 2.5x
  /// 44×34 map
  /// un-world-map-4170r13, 96 dpi, longitude range [−180
      to 180]
  const unproj unworlde96={5046, 2532, 2340, 1267,
      "un-world-map-4170r13-2.5x-w5046-h2532"},
      20, −1};
  const unproj unworlde300={{5046, 2532, 2340, 1267,
      "un-world-map-4170r13-2.5x-w7884-h3956"},
      20, −1};
  /// UN Slice Offsets.
  namespace unprojslices
  {
    double fyoff=542;
    double fxoff1=−3084;
    double fxoff2=100;
    double fxoff3=−1550;
  }
}// namespace carto
#endif
```

While there have been described systems, methods, and computer-readable media for providing a network activity monitoring service or swarm processing service for a peer-to-peer network, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for visualizing swarm activity for a media object, the method comprising:
   populating a BitTorrent protocol info hash array ("BTIHA") with a plurality of BitTorrent protocol info hash ("BTIH") elements for the media object;
   sampling, from a swarm, sample data for each BTIH element of the BTIHA during each minimum sampling interval of a sampling duration;
   quantizing the sampled sample data for each BTIH element of the BTIHA for each normalization duration of a plurality of normalization durations of the sampling duration;
   caching the quantized sample data for each BTIH element of the BTIHA for each normalization duration of the plurality of normalization durations of the sampling duration;
   analyzing the cached sample data for each BTIH element of the BTIHA for each normalization duration of the plurality of normalization durations of the sampling duration; and presenting a visualization based on the analyzed sample data for every BTIH element of the BTIHA for at least one normalization duration of the plurality of normalization durations of the sampling duration.

2. The method of claim 1, further comprising:
during a first minimum sampling interval of the sampling duration searching for new BTIH elements for the media object; and
when a new BTIH element is found during the searching, further populating the BTIHA with the new BTIH element, wherein the sampling during each minimum sampling interval of the sampling duration that follows the first minimum sampling interval comprises sampling, from the swarm, sample data for each BTIH element of the further populated BTIHA.

3. The method of claim 1, wherein the minimum sampling interval is less than 30 minutes.

4. The method of claim 1, wherein the minimum sampling interval is less than 10 minutes.

5. The method of claim 1, wherein the minimum sampling interval is 5 minutes.

6. The method of claim 5, wherein the plurality of normalization durations comprises the minimum sampling interval and at least one of the following:
an hour;
a day;
a week; or
the sampling duration.

7. The method of claim 5, wherein:
the minimum sampling interval is less than 30 minutes;
the sampling duration is at least two weeks; and
the plurality of normalization durations comprises:
the minimum sampling interval;
an hour;
a day;
a week; and
the sampling duration.

8. The method of claim 1, wherein the plurality of normalization durations comprises the minimum sampling interval and at least two of the following:
an hour;
a day;
a week; or
the sampling duration.

9. The method of claim 1, wherein the plurality of normalization durations comprises:
the minimum sampling interval;
an hour;
a day;
a week; and
the sampling duration.

10. The method of claim 1, wherein the sampled sample data for each particular BTIH element of the BTIHA for each particular minimum sampling interval of the sampling duration comprises at least one of the following:
identification of each node of the swarm acting as a peer for the particular BTIH element during the particular minimum sampling interval; or
identification of each node of the swarm acting as a seed for the particular BTIH element during the particular minimum sampling interval.

11. The method of claim 10, wherein the cached sample data for each particular BTIH element of the BTIHA for each particular normalization duration of the plurality of normalization durations of the sampling duration comprises at least one of the following:
identification of each unique node of the swarm acting as a peer for the particular BTIH element during the particular normalization duration; or
identification of each unique node of the swarm acting as a seed for the particular BTIH element during the particular normalization duration.

12. The method of claim 11, wherein the cached sample data for each particular BTIH element of the BTIHA for each particular normalization duration of the plurality of normalization durations of the sampling duration comprises at least one of the following:
identification of each fresh unique node of the swarm acting as a peer for the particular BTIH element during the particular normalization duration that was not acting as a peer for the particular BTIH element during the normalization duration immediately preceding the particular normalization duration; or
identification of each fresh unique node of the swarm acting as a seed for the particular BTIH element during the particular normalization duration that was not acting as a seed for the particular BTIH element during the normalization duration immediately preceding the particular normalization duration.

13. The method of claim 1, wherein the cached sample data for each particular BTIH element of the BTIHA for each particular normalization duration of the plurality of normalization durations of the sampling duration comprises at least one of the following:
identification of each unique node of the swarm acting as a peer for the particular BTIH element during the particular normalization duration; or
identification of each unique node of the swarm acting as a seed for the particular BTIH element during the particular normalization duration.

14. The method of claim 1, wherein the cached sample data for each particular BTIH element of the BTIHA for each particular normalization duration of the plurality of normalization durations of the sampling duration comprises at least one of the following:
identification of each fresh unique node of the swarm acting as a peer for the particular BTIH element during the particular normalization duration that was not acting as a peer for the particular BTIH element during the normalization duration immediately preceding the particular normalization duration; or
identification of each fresh unique node of the swarm acting as a seed for the particular BTIH element during the particular normalization duration that was not acting as a seed for the particular BTIH element during the normalization duration immediately preceding the particular normalization duration.

15. The method of claim 1, wherein the sampled sample data for each particular BTIH element of the BTIHA for each particular minimum sampling interval of the sampling duration comprises:
identification of each node of the swarm acting as a peer for the particular BTIH element during the particular minimum sampling interval; and
identification of each node of the swarm acting as a seed for the particular BTIH element during the particular minimum sampling interval.

16. The method of claim 15, wherein the cached sample data for each particular BTIH element of the BTIHA for each particular normalization duration of the plurality of normalization durations of the sampling duration comprises:

identification of each unique node of the swarm acting as a peer for the particular BTIH element during the particular normalization duration; and identification of each unique node of the swarm acting as a seed for the particular BTIH element during the particular normalization duration.

17. The method of claim 16, wherein the cached sample data for each particular BTIH element of the BTIHA for each particular normalization duration of the plurality of normalization durations of the sampling duration comprises:

identification of each fresh unique node of the swarm acting as a peer for the particular BTIH element during the particular normalization duration that was not acting as a peer for the particular BTIH element during the normalization duration immediately preceding the particular normalization duration; and identification of each fresh unique node of the swarm acting as a seed for the particular BTIH element during the particular normalization duration that was not acting as a seed for the particular BTIH element during the normalization duration immediately preceding the particular normalization duration.

18. The method of claim 1, wherein the analyzed sample data for every BTIH element of the BTIHA for a particular normalization duration of the plurality of normalization durations of the sampling duration comprises at least one of the following:

a weighted identification of each geolocation associated with the unique nodes of the swarm acting as peers for the BTIH elements during the particular normalization duration;

a weighted identification of each geolocation associated with the unique nodes of the swarm acting as seeds for the BTIH elements during the particular normalization duration;

a weighted identification of each geolocation associated with the fresh unique nodes of the swarm acting as peers for the BTIH elements during the particular normalization duration that were not acting as peers for the BTIH elements during the normalization duration immediately preceding the particular normalization duration; or a weighted identification of each geolocation associated with the fresh unique nodes of the swarm acting as seeds for the BTIH elements during the particular normalization duration that were not acting as seeds for the BTIH elements during the normalization duration immediately preceding the particular normalization duration.

19. The method of claim 1, wherein the analyzed sample data for each particular BTIH element of the BTIHA for a particular normalization duration of the plurality of normalization durations of the sampling duration comprises at least one of the following:

a weighted identification of each geolocation associated with the unique nodes of the swarm acting as peers for the particular BTIH element during the particular normalization duration;

a weighted identification of each geolocation associated with the unique nodes of the swarm acting as seeds for the particular BTIH element during the particular normalization duration;

a weighted identification of each geolocation associated with the fresh unique nodes of the swarm acting as peers for the particular BTIH element during the particular normalization duration that were not acting as peers for the particular BTIH element during the normalization duration immediately preceding the particular normalization duration; or a weighted identification of each geolocation associated with the fresh unique nodes of the swarm acting as seeds for the particular BTIH element during the particular normalization duration that were not acting as seeds for the particular BTIH element during the normalization duration immediately preceding the particular normalization duration.

20. A method for visualizing swarm activity for a media object, the method comprising:

populating a BitTorrent protocol info hash array ("BTIHA") with a plurality of BitTorrent protocol info hash ("BTIH") elements for the media object;

sampling, from a swarm, sample data for each BTIH element of the BTIHA during each minimum sampling interval of a sampling duration, wherein the sampled sample data for each particular BTIH element of the BTIHA for each particular minimum sampling interval of the sampling duration comprises:

identification of each node of the swarm acting as a peer for the particular BTIH element during the particular minimum sampling interval; and identification of each node of the swarm acting as a seed for the particular BTIH element during the particular minimum sampling interval;

analyzing the sampled sample data for each BTIH element of the BTIHA for each normalization duration of a plurality of normalization durations of the sampling duration, wherein the analyzed sample data for each BTIH element of the BTIHA for a particular normalization duration of the plurality of normalization durations of the sampling duration comprises at least one of the following:

identification of each geolocation associated with the unique nodes of the swarm acting as peers for the particular BTIH element during the particular normalization duration;

identification of each geolocation associated with the unique nodes of the swarm acting as seeds for the particular BTIH element during the particular normalization duration;

identification of each geolocation associated with the fresh unique nodes of the swarm acting as peers for the particular BTIH element during the particular normalization duration that were not acting as peers for the particular BTIH element during the normalization duration immediately preceding the particular normalization duration; or identification of each geolocation associated with the fresh unique nodes of the swarm acting as seeds for the particular BTIH element during the particular normalization duration that were not acting as seeds for the particular BTIH element during the normalization duration immediately preceding the particular normalization duration; and presenting a visualization based on the analyzed sample data for at least one BTIH element of the BTIHA for at least one normalization duration of the plurality of normalization durations of the sampling duration.

* * * * *